US012235526B2

(12) United States Patent
Li et al.

(10) Patent No.: US 12,235,526 B2
(45) Date of Patent: Feb. 25, 2025

(54) PHASE-CHANGE METASURFACE FOR PROGRAMMABLE WAVEGUIDE MODE CONVERSION

(71) Applicant: University of Washington, Seattle, WA (US)

(72) Inventors: Mo Li, Seattle, WA (US); Changming Wu, Seattle, WA (US)

(73) Assignee: University of Washington, Seattle, WA (US)

( * ) Notice: Subject to any disclaimer, the term of this patent is extended or adjusted under 35 U.S.C. 154(b) by 151 days.

(21) Appl. No.: 17/904,787

(22) PCT Filed: Apr. 7, 2021

(86) PCT No.: PCT/US2021/026126
§ 371 (c)(1),
(2) Date: Aug. 23, 2022

(87) PCT Pub. No.: WO2021/216282
PCT Pub. Date: Oct. 28, 2021

(65) Prior Publication Data
US 2023/0051113 A1 Feb. 16, 2023

Related U.S. Application Data

(60) Provisional application No. 63/013,478, filed on Apr. 21, 2020.

(51) Int. Cl.
G02F 1/035 (2006.01)
(52) U.S. Cl.
CPC .................... G02F 1/035 (2013.01)
(58) Field of Classification Search
CPC ...................................... G02F 1/035
(Continued)

(56) References Cited

U.S. PATENT DOCUMENTS 6,731,829 B2 * 5/2004 Ionov ..................... H04B 10/11
398/201
10,591,802 B2 * 3/2020 Sun ........................ G02F 1/2955
(Continued)

FOREIGN PATENT DOCUMENTS

AU 2020101434 A4 8/2020
CN 109445132 A 3/2019
(Continued)

OTHER PUBLICATIONS

Written Opinion of the International Searching Authority mailed on Jul. 27, 2021, issued in corresponding International Application No. PCT/US2021/026126, filed on Apr. 7, 2021, 9 pages.
(Continued)

Primary Examiner — Kaveh C Kianni
(74) Attorney, Agent, or Firm — Christensen O'Connor Johnson Kindness PLLC

(57) ABSTRACT

Phase-change metasurface waveguide mode converters and photonic computing systems including a phase-change metasurface waveguide mode converter are described. In an embodiment, the phase-change metasurface waveguide mode converter include a plurality of phase-change antennas comprising a phase-change material and protruding from a surface, wherein each phase-change antenna of the plurality of phase-change antennas is configured to scatter an optical waveguide mode and cause a phase shift of light travelling through an optical waveguide optically coupled thereto. In an embodiment, the phase-change metasurface waveguide mode converter includes the plurality of phase-change antennas configured to alternate between a crystalline phase and an amorphous phase.

11 Claims, 48 Drawing Sheets

(58) Field of Classification Search
USPC .......................................................... 385/3
See application file for complete search history.

(56) References Cited

U.S. PATENT DOCUMENTS

| | | | | |
|---|---|---|---|---|
| 10,884,312 | B2* | 1/2021 | Watts | G02B 6/29331 |
| 11,513,289 | B1* | 11/2022 | Lin | G01S 7/4816 |
| 11,726,262 | B2* | 8/2023 | Albrechtsen | G02B 6/14 385/16 |
| 11,782,139 | B2* | 10/2023 | Wagner | G01S 7/4818 356/4.01 |
| 11,796,644 | B2* | 10/2023 | Sarkissian | G01S 7/4916 |
| 11,885,887 | B1* | 1/2024 | Mazed | G01S 17/89 |
| 11,892,746 | B1* | 2/2024 | Mazed | G02F 1/225 |
| 2006/0140535 | A1* | 6/2006 | Tsuda | G02F 1/293 385/16 |
| 2017/0116515 | A1* | 4/2017 | Abel | G06N 3/0675 |
| 2017/0307810 | A1* | 10/2017 | Inoue | G02B 6/021 |
| 2017/0371227 | A1* | 12/2017 | Skirlo | G02F 1/2955 |
| 2018/0102847 | A1* | 4/2018 | Kim | G02F 1/025 |
| 2018/0224327 | A1* | 8/2018 | Abel | G01N 15/00 |
| 2019/0219888 | A1* | 7/2019 | Sun | G02F 1/2955 |
| 2019/0265574 | A1* | 8/2019 | Skirlo | G02F 1/3136 |
| 2020/0081318 | A1* | 3/2020 | Rios | G02F 1/0126 |
| 2020/0110432 | A1* | 4/2020 | Scofield | G02B 6/122 |
| 2020/0249543 | A1* | 8/2020 | Bienstman | G02B 6/125 |
| 2020/0319340 | A1* | 10/2020 | Sun | G01S 17/46 |
| 2020/0379504 | A1* | 12/2020 | Carolan | G06E 3/003 |
| 2021/0063842 | A1* | 3/2021 | Byun | H01S 5/4075 |

FOREIGN PATENT DOCUMENTS

| | | |
|---|---|---|
| CN | 110096781 A | 8/2019 |
| CN | 111399125 A | 7/2020 |
| WO | 2020240623 A1 | 12/2020 |

OTHER PUBLICATIONS

International Search Report of the International Searching Authority mailed on Jul. 27, 2021, issued in corresponding International Application No. PCT/US2021/026126, filed on Apr. 7, 2021, 5 pages.

Raeis-Hosseini, N. and J. Rho, "Metasurfaces Based on Phase-Change Material as a Reconfigurable Platform for Multifunctional Devices," Materials 2017, Sep. 6, 2017, vol. 10, No. 9, pp. 1-26.

Li, Z., Kim, MH., Wang, C. et al. "Controlling propagation and coupling of waveguide modes using phase-gradient metasurfaces," Nature Nanotech 12, 675-683 (2017). https://doi.org/10.1038/nnano.2017.50.

Atabaki, A. H. et al. Integrating photonics with silicon nanoelectronics for the next generation of systems on a chip. Nature 556, 349-354 (2018).

Athale, R. & Psaltis, D. Optical Computing: Past and Future. Optics and Photonics News 27, 32-39, doi:10.1364/OPN.27.6.000032 (2016).

Bangari, V. et al. Digital Electronics and Analog Photonics for Convolutional Neural Networks (DEAP-CNNs). Ieee J Sel Top Quant 26, 1-13, doi:10.1109/JSTQE.2019.2945540 (2020).

Bocker, R. P. Matrix multiplication using incoherent optical techniques. Appl. Opt. 13, 1670-1676, doi:10.1364/AO.13.001670 (1974).

Briggs, R. M., Pryce, I. M. & Atwater, H. A. Compact silicon photonic waveguide modulator based on the vanadium dioxide metal-insulator phase transition. Opt. Express 18, 11192-11201 (2010).

Carrillo, S. G.-C. et al., "Behavioral modeling of integrated phase-change photonic devices for neuromorphic computing applications," APL Materials; APL Mater. 7, 091113 (2019); https://doi.org/10,1063/1,5111840.

Caulfield, H. J. & Dolev, S. Why future supercomputing requires optics. Nat. Photon. 4, 261-263, doi:10.1038/nphoton.2010.94 (2010).

Caulfield, H. J., Kinser, J. & Rogers, S. K. Optical neural networks. Proc. IEEE 77, 1573-1583, doi:10.1109/5.40669 (1989).

Chakraborty, I., Saha, G. & Roy, K. Photonic In-Memory Computing Primitive for Spiking Neural Networks Using Phase-Change Materials. Physical Review Applied 11, 014063, doi:10.1103/PhysRevApplied.11.014063 (2019).

Chakraborty, I. et al., "Toward Fast Neural Computing using All-Photonic Phase Change Spiking Neurons," Scientific Reports, (2018) 8:12980; doi:10.1038/s41598-018-31365-x.

Cheng, Z. et al. Device-Level Photonic Memories and Logic Applications Using Phase-Change Materials. Adv. Mater., 1802435, doi:10.1002/adma.201802435 (2018).

Choi, C. et al., :Metasurface with Nanostructured Ge2Sb2Te5 as a Platform for Broadband-Operating Wavefront Switch, Advanced Optical Materials; 2019, 7, 1900171, pp. 1-8.

Chu, C.H. et al., "Active dielectric metasurface based on phase-change medium," Laser & Photonics Reviews 10, No. 6, 1600106 (2016) / DOI 10.1002/lpor.201600106, pp. 986-994.

De Galarreta, C. R. et al. Nonvolatile Reconfigurable Phase-Change Metadevices for Beam Steering in the Near Infrared. Adv. Funct. Mater. 28, 1704993, doi:10.1002/adfm.201704993 (2018).

Delaney, M. et al., "A New Family of Ultralow Loss Reversible Phase-Change Materials for Photonic Integrated Circuits: Sb2S3 and Sb2Se3," Advanced Functional Materials 2020, 30, 2002447, pp. 1-10.

Dong, W. et al., "Tunable Mid-Infrared Phase-Change Metasurface," Advanced Optical Materials 2018, 6, 1701346, pp. 1-6.

Farmakidis, N. et al. Plasmonic nanogap enhanced phase-change devices with dual electrical-optical functionality. Science Advances 5, eaaw2687, doi:10.1126/sciadv.aaw2687 (2019).

Feldmann, J. et al. Parallel convolution processing using an integrated photonic tensor core. arXiv preprint arXiv:2002.00281 (2020).

Feldmann, J., Youngblood, N., Wright, C. D., Bhaskaran, H. & Pernice, W. H. P. All-optical spiking neurosynaptic networks with self-learning capabilities. Nature 569, 208-214, doi:10.1038/s41586-019-1157-8 (2019).

Ferreira de Lima, T. et al., "Machine Learning With Neuromorphic Photonics," Journal of Lightwave Technology, vol. 37, No. 5, Mar. 1, 2019, pp. 1515-1534.

Gayen, D. K., Chattopadhyay, T., Pal, R. K. & Roy, J. N. All-optical Multiplication with the help of Semiconductor Optical Amplifier-assisted Sagnac Switch. Journal of Computational Electronics 9, 57-67, doi:10.1007/s10825-010-0305-z (2010).

George, J. K. et al. Neuromorphic photonics with electro-absorption modulators. Opt. Express 27, 5181-5191, doi:10.1364/OE.27.005181 (2019).

Giannopoulos, I. et al. in 2018 IEEE International Electron Devices Meeting (IEDM) 27.27.21-27.27.24 (IEEE, 2018).

Goi, E. et al., "Perspective on photonic memristive neuromorphic computing," PhotoniX (2020) 1:3; https://doi.org/10,1186,s43074-020-0001-6, pp. 1-26.

Hamerly, R., Bernstein, L., Sludds, A., Soljačić, M. & Englund, D. Large-scale optical neural networks based on photoelectric multiplication. Physical Review X 9, 021032 (2019).

Jones, N. How to stop data centres from gobbling up the world's electricity. Nature 561, 163-166, doi:10.1038/d41586-018-06610-y (2018).

Le Gallo, M. et al. Mixed-precision in-memory computing. Nature Electronics 1, 246-253, doi:10.1038/s41928-018-0054-8 (2018).

Li, X. et al. Fast and reliable storage using a 5 bit, nonvolatile photonic memory cell. Optica 6, 1-6 (2019).

Liu Y., Aziz, M. M., Shalini, A., Wright, C. D. & Hicken, R. J. Crystallization of Ge2Sb2Te5 films by amplified femtosecond optical pulses. J. Appl. Phys. 112, doi:10.1063/1.4770359 (2012).

Marr, B., Degnan, B., Hasler, P. & Anderson, D. Scaling Energy per Operation via an Asynchronous Pipeline. IEEE Transactions on Very Large Scale Integration (VLSI) Systems 21, 147-151, doi:10.1109/TVLSI.2011.2178126 (2013).

Convolution Neural Network—simple code—simple to use (MATLAB Central File Exchange, 2020).

Moazeni, S. et al. A 40-Gb/s PAM-4 transmitter based on a ring-resonator optical DAC in 45-nm SOI CMOS. IEEE Journal of Solid-State Circuits 52, 3503-3516 (2017).

(56) References Cited

OTHER PUBLICATIONS

Park, J.-W. et al. Optical properties of pseudobinary GeTe, Ge2Sb2Te5, GeSb2Te4, GeSb4Te7, and Sb2Te3 from ellipsometry and density functional theory. Phys. Rev. B 80, 115209, doi:10.1103/PhysRevB.80.115209 (2009).
Prucnal, P. R. & Shastri, B. J. Neuromorphic photonics. (CRC Press, 2017).
Ribeiro, A., Ruocco, A., Vanacker, L. & Bogaerts, W. Demonstration of a 4×4-port universal linear circuit. Optica 3, 1348-1357, doi:10.1364/OPTICA.3.001348 (2016).
Rios, C. et al. In-memory computing on a photonic platform. Science Advances 5, eaau5759, doi:10.1126/sciadv.aau5759 (2019).
Rios, C. et al. Integrated all-photonic non-volatile multi-level memory. Nat. Photon. 9, 725-732, doi:10.1038/nphoton.2015.182 (2015).
Rodriguez-Hernandez, G., Hosseini, P., Ríos, C., Wright, C. D. & Bhaskaran, H. Mixed-Mode Electro-Optical Operation of Ge2Sb2Te5 Nanoscale Crossbar Devices. Advanced Electronic Materials 3, 1700079, doi:10.1002/aelm.201700079 (2017).
Shen, Y. et al. Silicon Photonics for Extreme Scale Systems. J. Lightwave Technol. 37, 245-259 (2019).
Shen, Y. et al. Deep learning with coherent nanophotonic circuits. Nat. Photon. 11, 441-446, doi:10.1038/nphoton.2017.93 (2017).
Solli, D. R. & Jalali, B. Analog optical computing. Nat. Photon. 9, 704-706, doi:10.1038/nphoton.2015.208 (2015).
Stegmaier, M., Ríos, C., Bhaskaran, H., Wright, C. D. & Pernice, W. H. P. Nonvolatile All-Optical 1×2 Switch for Chipscale Photonic Networks. Advanced Optical Materials 5, 1600346, doi:10.1002/adom.201600346 (2017).
Sun, J., Timurdogan, E., Yaacobi, A., Hosseini, E. S. & Watts, M. R. Large-scale nanophotonic phased array. Nature 493, 195-199, doi:10.1038/nature11727 (2013).
Tait, A. N. et al. Silicon Photonic Modulator Neuron. Physical Review Applied 11, 064043, doi:10.1103/PhysRevApplied.11.064043 (2019).
Wade, M. et al. in 2018 European Conference on Optical Communication (ECOC). 1-3.
Wang, Q. et al. Optically reconfigurable metasurfaces and photonic devices based on phase change materials. Nat. Photon. 10, 60-U75, doi:10.1038/Nphoton.2015.247 (2016).
Wang, L. et al., "Recent Advances on Neuromorphic Systems Using Phase-Change Materials," Nanoscale Research Letters (2017) 12:347; pp. 1-22.
Wu, C. et al. Low-Loss Integrated Photonic Switch Using Subwavelength Patterned Phase Change Material. ACS Photonics 6, 87-92, doi:10.1021/acsphotonics.8b01516 (2018).
Wu, C. et al., "Programmable Phase-change Metasurface for Multimode Photonic Convolutional Neural Network," IEEE Xplore 2020, 2 pages.
Wu, C. et al., "Programmable phase-change metasurfaces on waveguides for multimode photonic convolutional neural network," Nature Communications (2021) 129:6; https://doi.org/10.1038/s41467-020-20365-z, pp. 1-8.
Wuttig, M., Bhaskaran, H. & Taubner, T. Phase-change materials for non-volatile photonic applications. Nat. Photon. 11, 465-476, doi:10.1038/nphoton.2017.126 (2017).
Kiong, C. et al. Monolithic 56 Gb/s silicon photonic pulse-amplitude modulation transmitter. Optica 3, 1060-1065, doi:10.1364/OPTICA.3.001060 (2016).
Xu, P., Zheng, J., Doylend, J. K. & Majumdar, A. Low-Loss and Broadband Nonvolatile Phase-Change Directional Coupler Switches. ACS Photonics 6, 553-557, doi:10.1021/acsphotonics.8b01628 (2019).
Yang, Z. & Ramanathan, S. Breakthroughs in photonics 2014: phase change materials for photonics. IEEE Photonics Journal 7, 1-5 (2015).
Zhang, C., Zhang, S., Peters, J. D. & Bowers, J. E. 8×8×40 Gbps fully integrated silicon photonic network on chip. Optica 3, 785-786, doi:10.1364/OPTICA.3.000785 (2016).
Zhang, Q. et al. Broadband nonvolatile photonic switching based on optical phase change materials: beyond the classical figure-of-merit. Opt. Lett. 43, 94, doi:10.1364/OL.43.000094 (2018).
Zhang, Y. et al. Broadband transparent optical phase change materials for high-performance nonvolatile photonics. Nat. Commun. 10, 4279, doi:10.1038/s41467-019-12196-4 (2019).
Zhang, W., Mazzarello, R., Wuttig, M. & Ma, E. Designing crystallization in phase-change materials for universal memory and neuro-inspired computing. Nature Reviews Materials 4, 150-168 (2019).
Zhang, H. et al. Miniature Multilevel Optical Memristive Switch Using Phase Change Material. ACS Photonics 6, 2205-2212, doi:10.1021/acsphotonics.9b00819 (2019).
Zheng, J. et al. Nonvolatile electrically reconfigurable integrated photonic switch. arXiv preprint arXiv:1912.07680 (2019).
International Preliminary Report on Patentability mailed on Oct. 25, 2022, issued in corresponding International Application No. PCT/US2021/026126, filed on Apr. 7, 2021, 6 pages.

\* cited by examiner

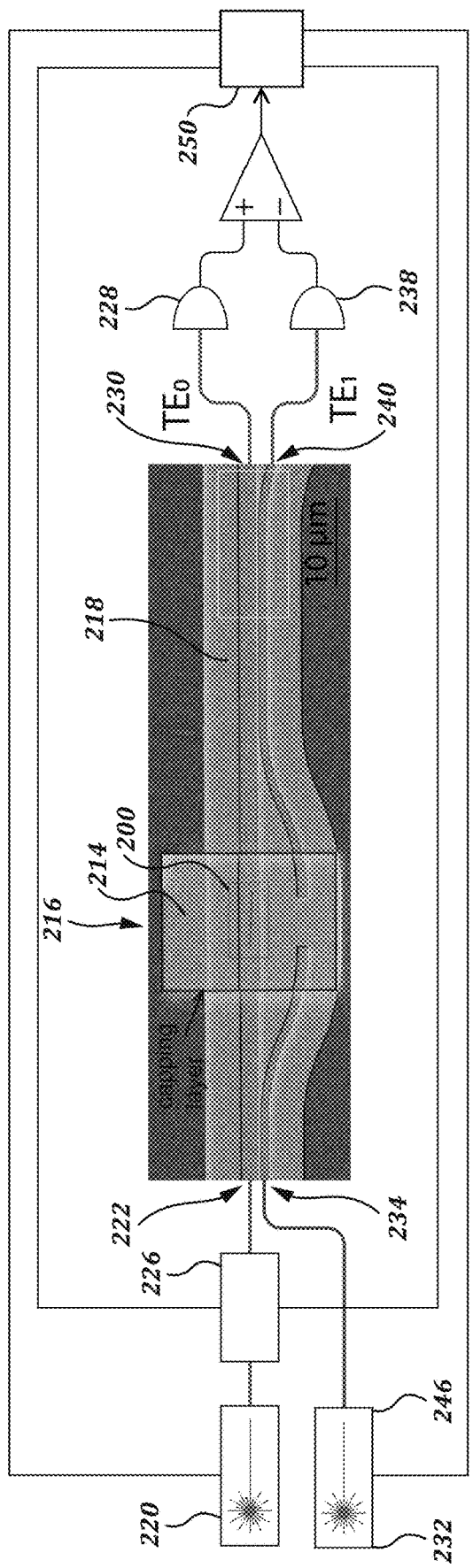
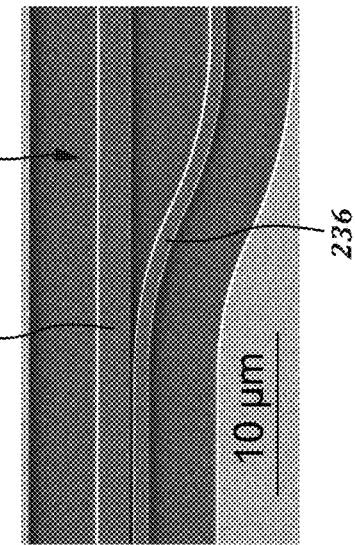
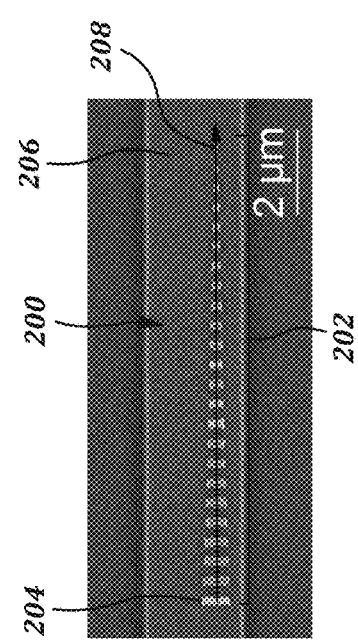
FIG. 2A
FIG. 2C
FIG. 2B

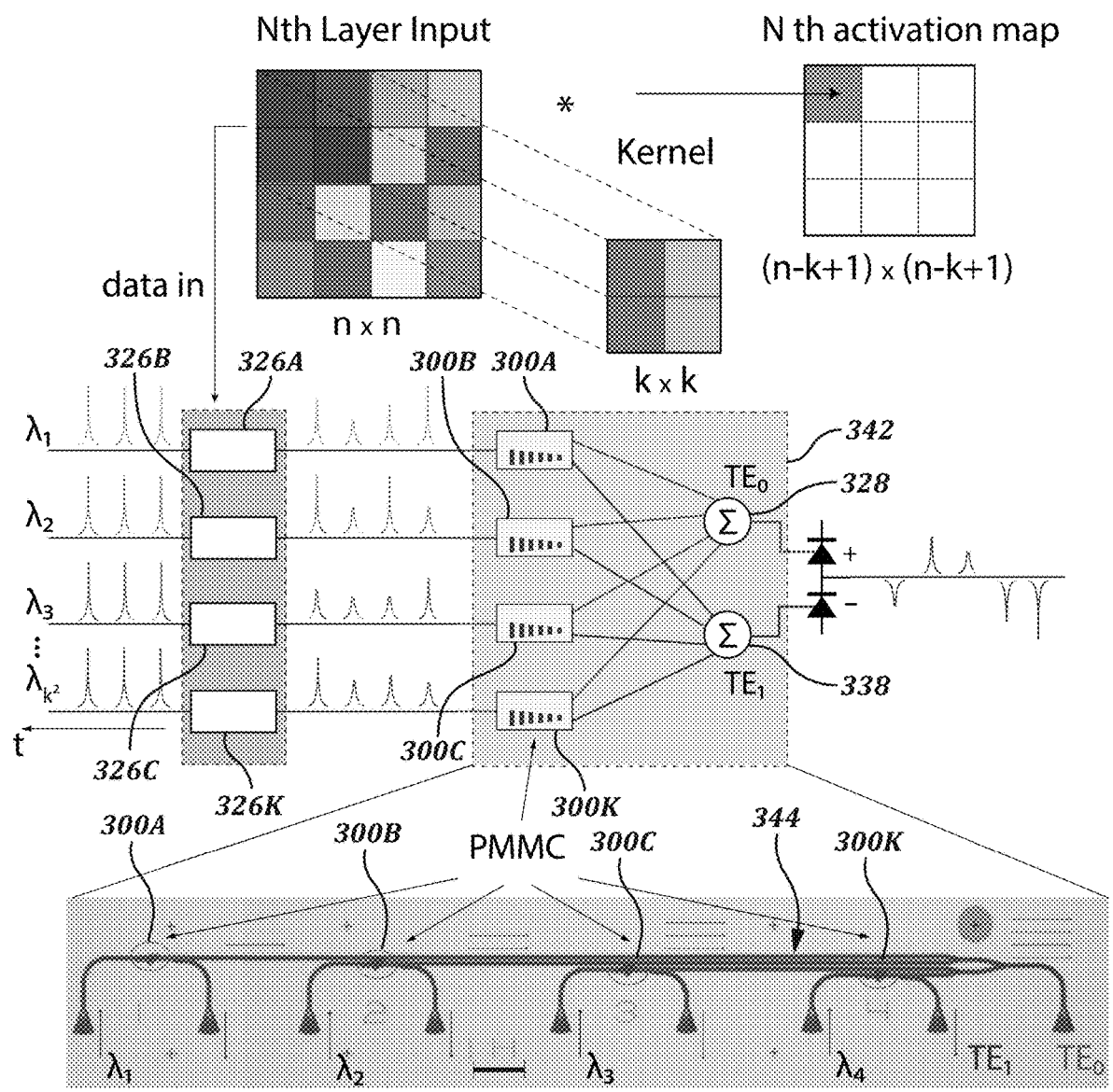

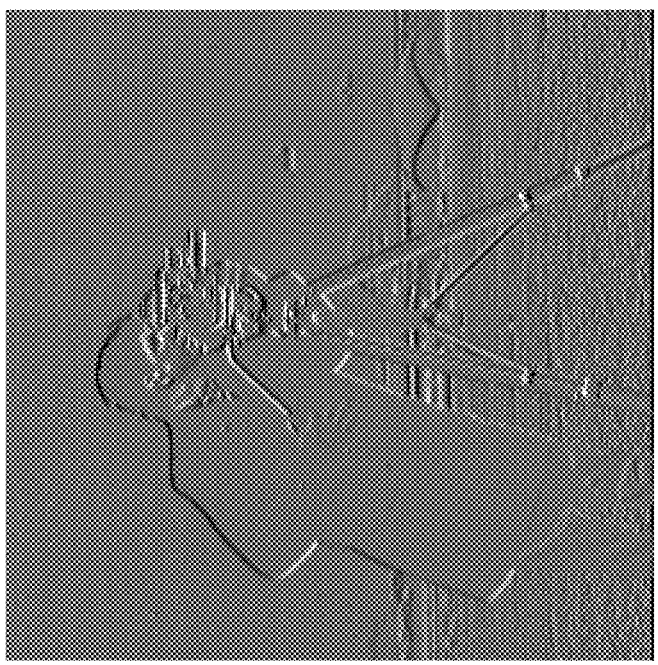
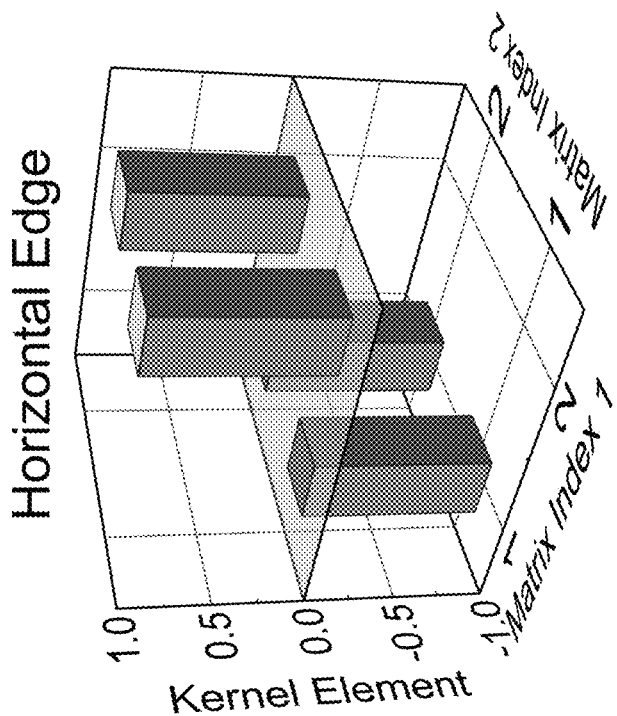
FIG. 3D

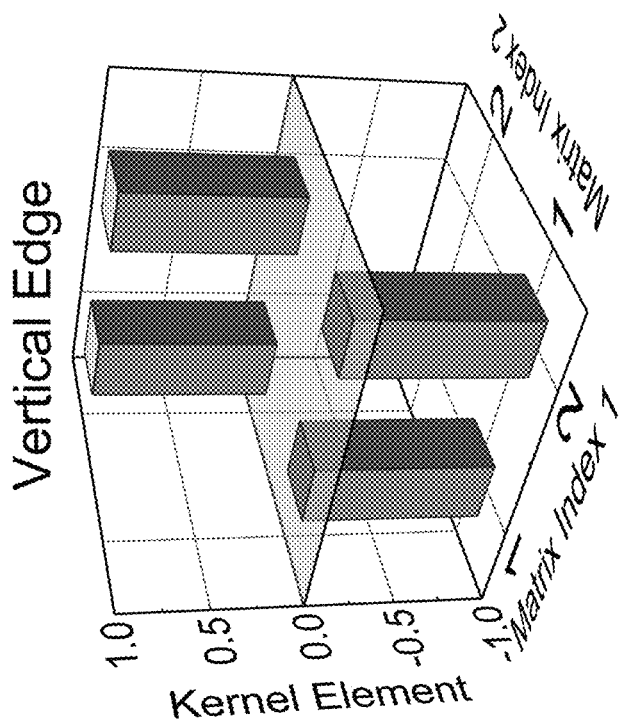
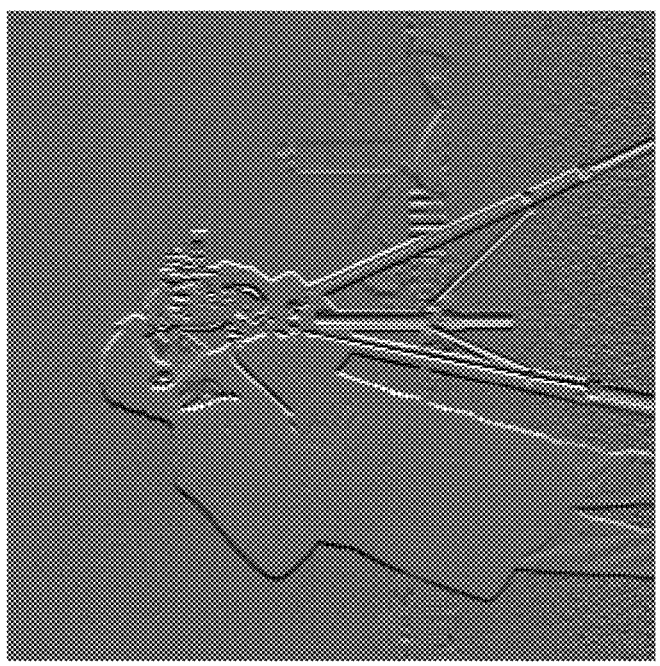
FIG. 3E

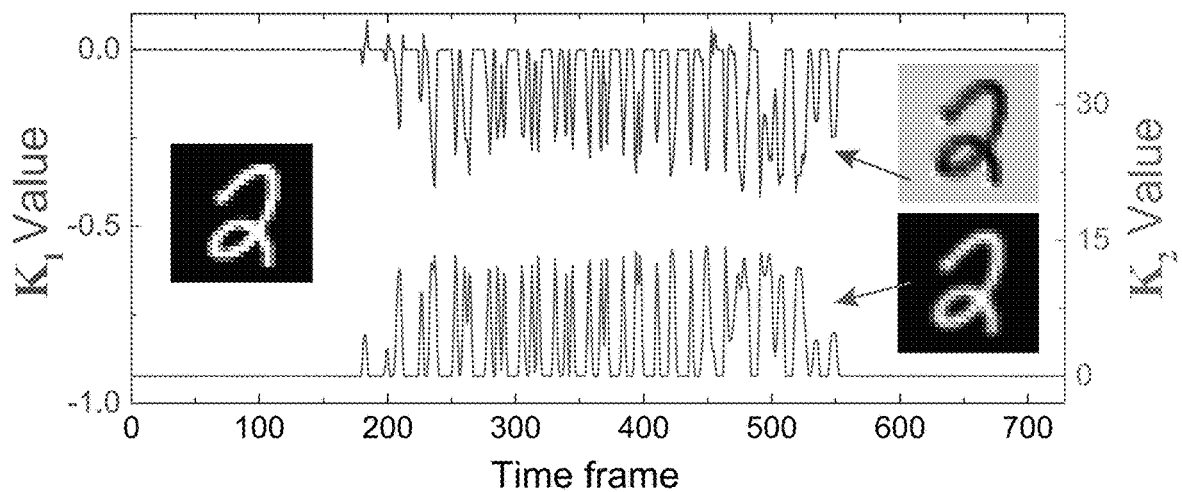
*FIG. 4C*
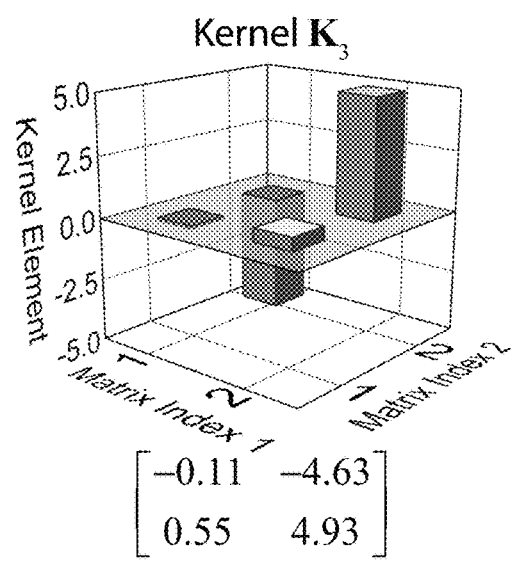
$$\begin{bmatrix} -0.11 & -4.63 \\ 0.55 & 4.93 \end{bmatrix}$$
*FIG. 4D*
| lable | identified 1 | 2 |
|---|---|---|
| 1 | 52 | 3 |
| 2 | 6 | 39 |
Experiment
| lable | identified 1 | 2 |
|---|---|---|
| 1 | 52 | 3 |
| 2 | 7 | 38 |
Calculated
*FIG. 4E*

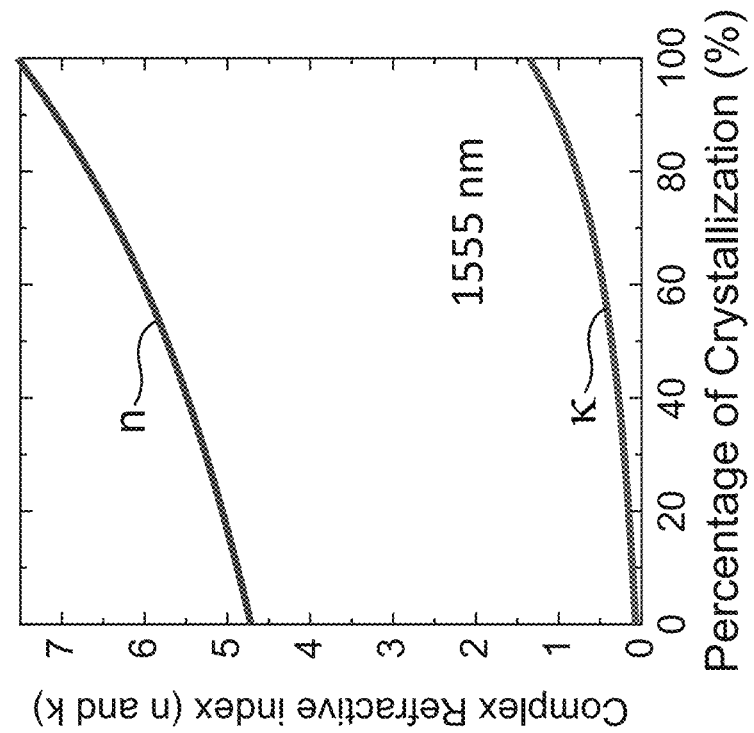
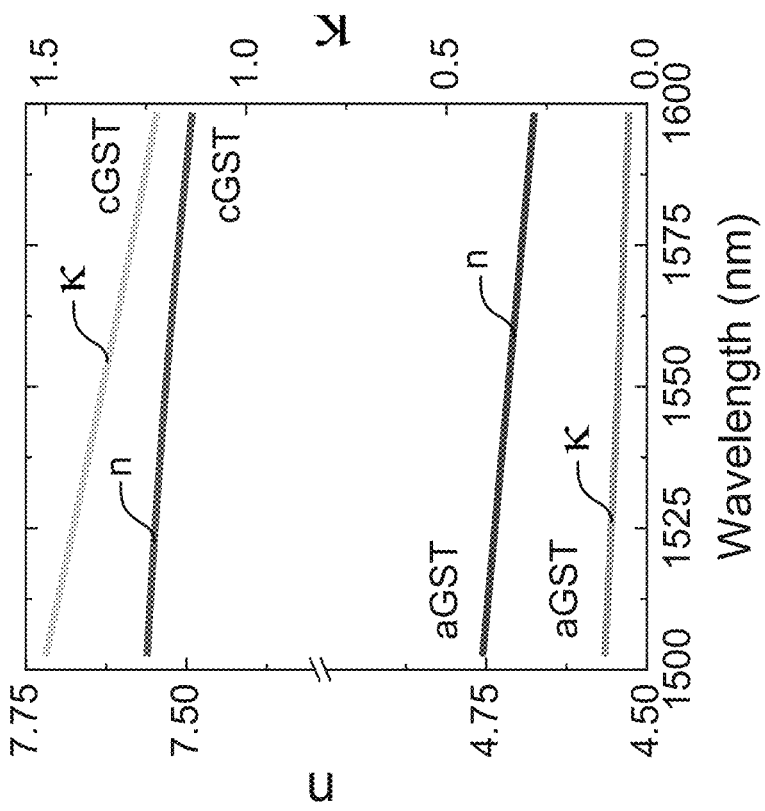
FIG. 5A
FIG. 5B

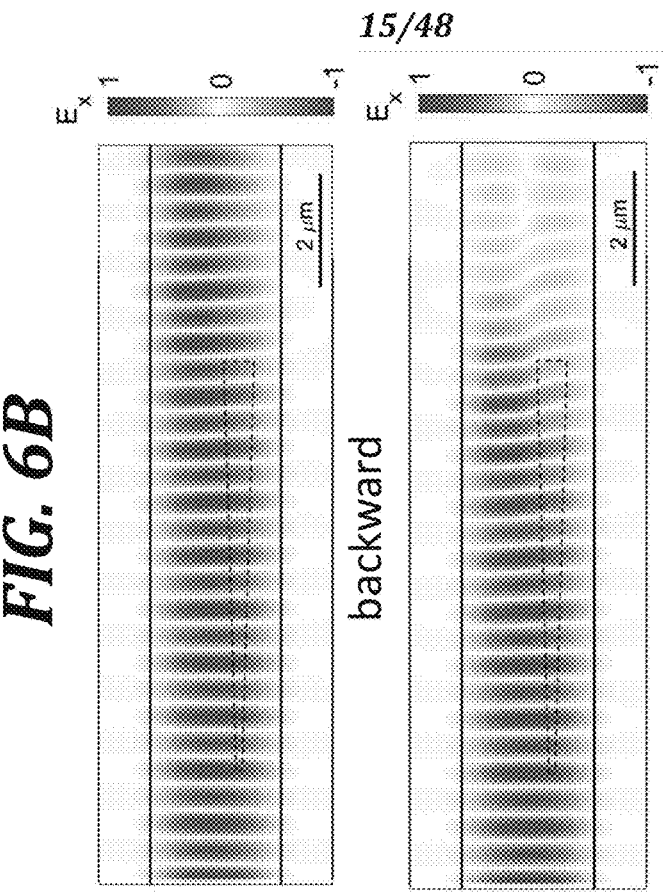

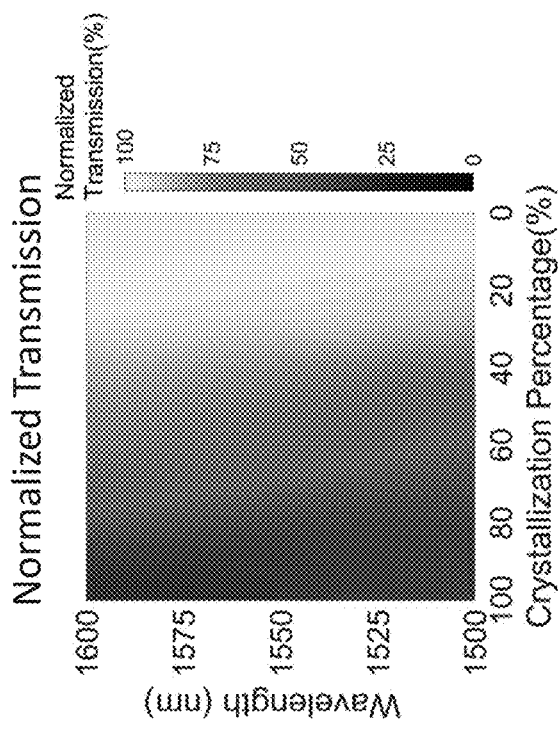
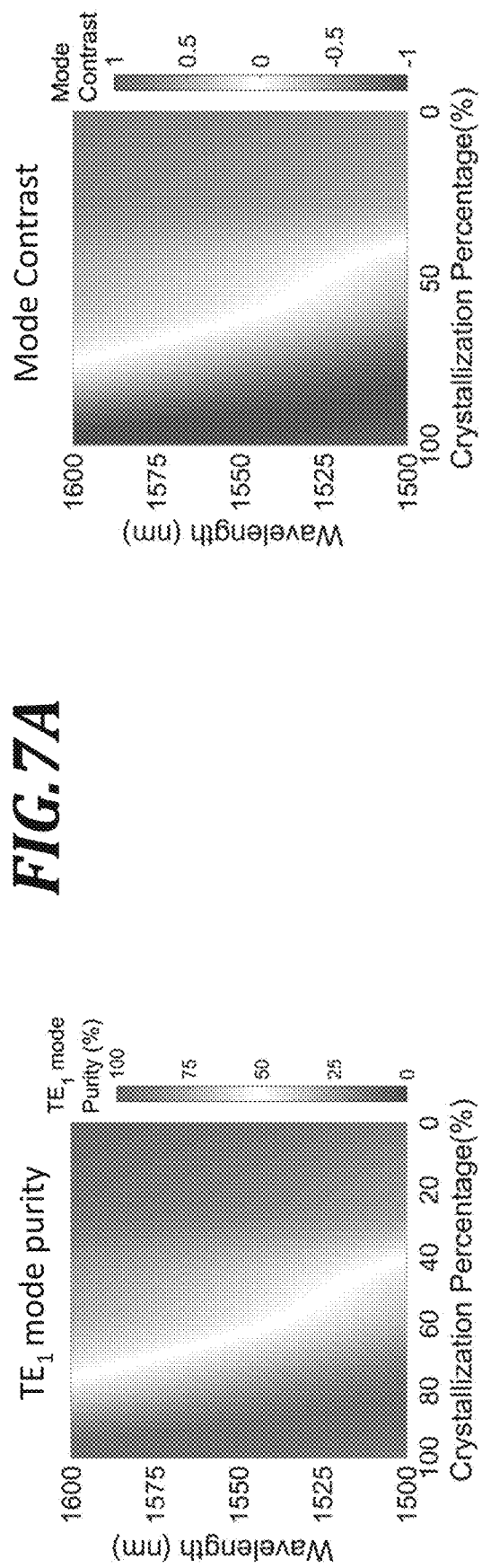
FIG. 7A   FIG. 7B   FIG. 7C

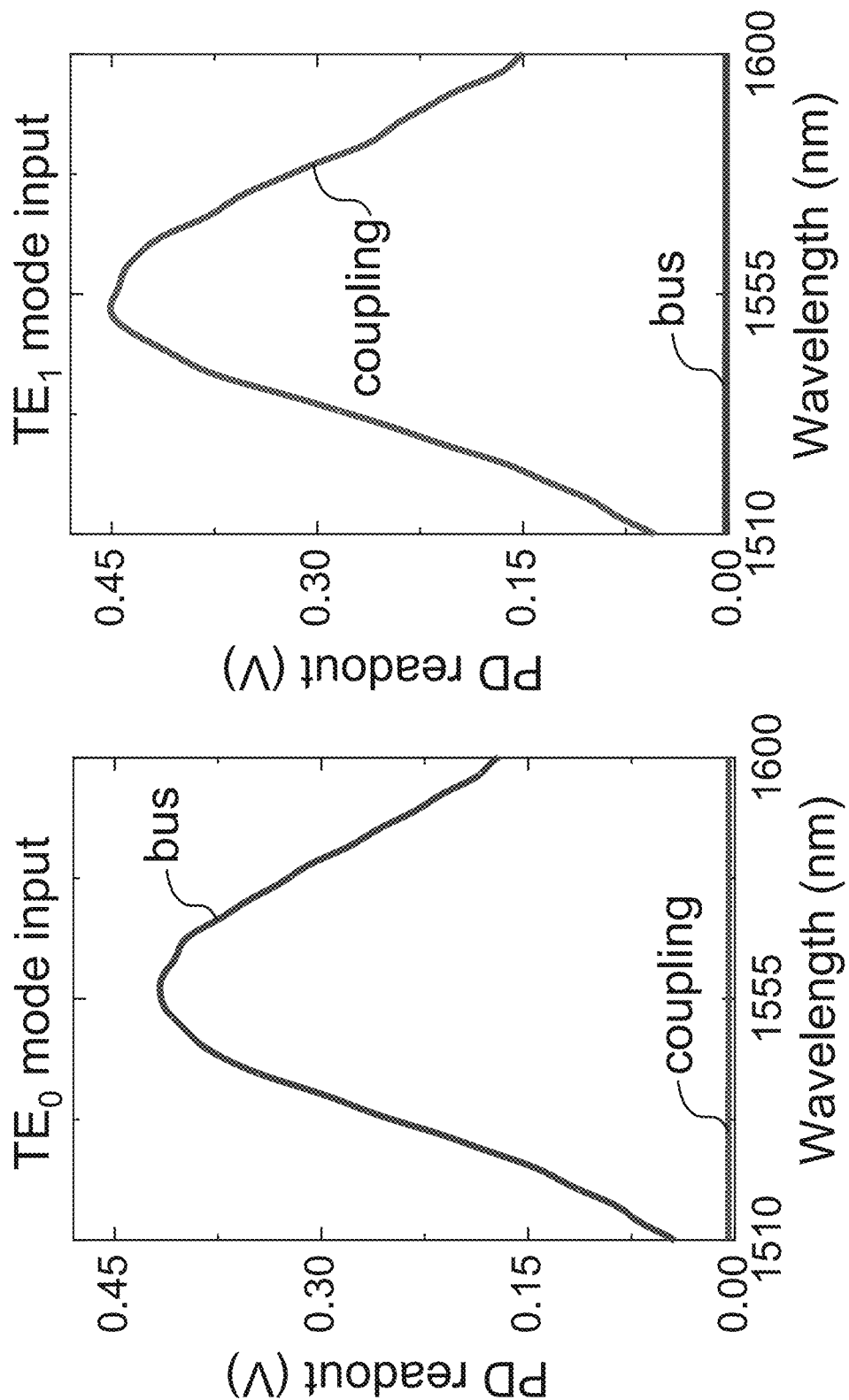

| # | Design (μm) | Fabrication (μm) | %Diff |
|---|---|---|---|
| 1 | 0.510 | 0.576 | 12.94 |
| 2 | 0.480 | 0.525 | 9.38 |
| 3 | 0.447 | 0.505 | 12.98 |
| 4 | 0.425 | 0.484 | 13.88 |
| 5 | 0.398 | 0.433 | 8.79 |
| 6 | 0.380 | 0.428 | 12.63 |
| 7 | 0.358 | 0.398 | 11.17 |
| 8 | 0.341 | 0.358 | 4.99 |
| 9 | 0.323 | 0.353 | 9.29 |
| 10 | 0.308 | 0.336 | 9.09 |
| 11 | 0.290 | 0.291 | 0.34 |
| 12 | 0.278 | 0.288 | 3.60 |
| 13 | 0.261 | 0.273 | 4.60 |
| 14 | 0.248 | 0.252 | 1.61 |
| 15 | 0.233 | 0.241 | 3.43 |
| 16 | 0.220 | 0.218 | 0.91 |
| 17 | 0.205 | 0.211 | 2.93 |
| 18 | 0.192 | 0.202 | 5.21 |
| 19 | 0.177 | 0.167 | 5.65 |
| 20 | 0.164 | 0.158 | 3.66 |
| 21 | 0.149 | 0.135 | 9.40 |
| 22 | 0.135 | 0.118 | 12.59 |
| 23 | 0.119 | 0.102 | 14.29 |
| 24 | 0.105 | 0.066 | 37.14 |
| 25 | 0.084 | 0.055 | 34.52 |

*FIG. 14E*

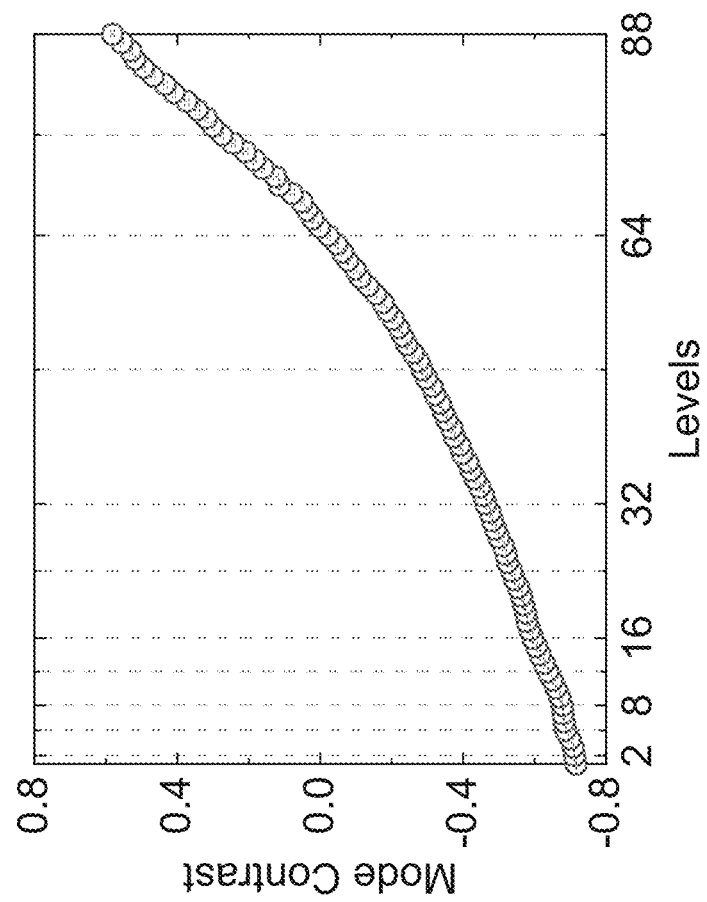
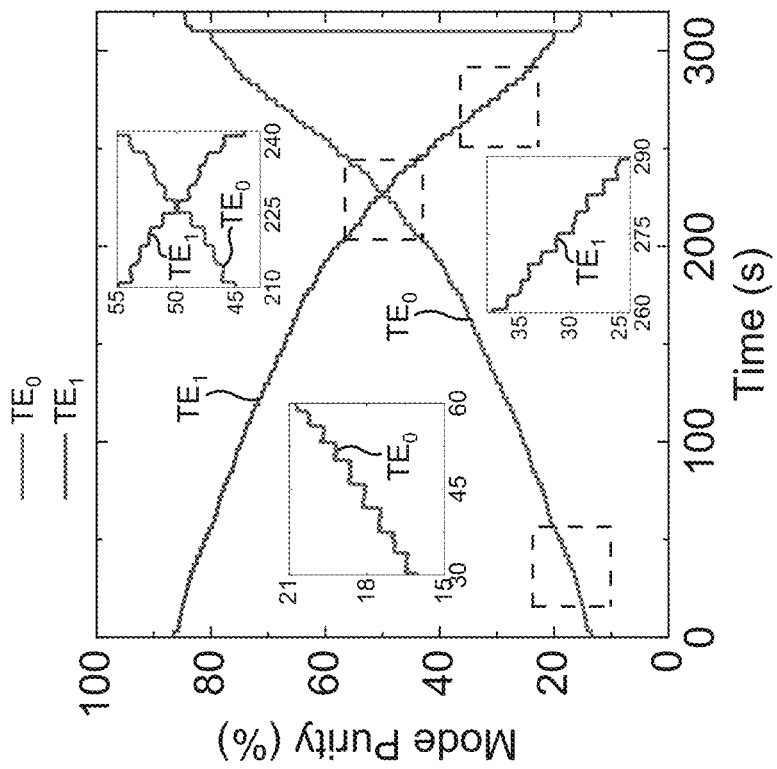
FIG. 16C
FIG. 16B

Original image

Input image

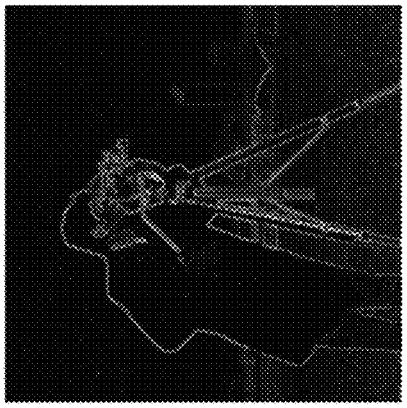
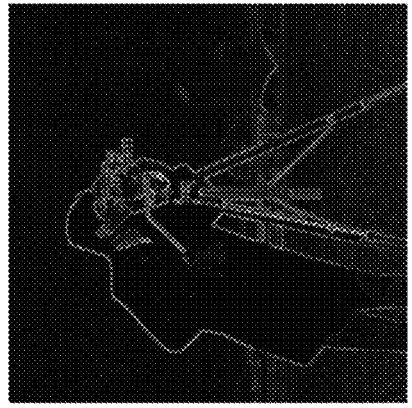
FIG. 20C All edges
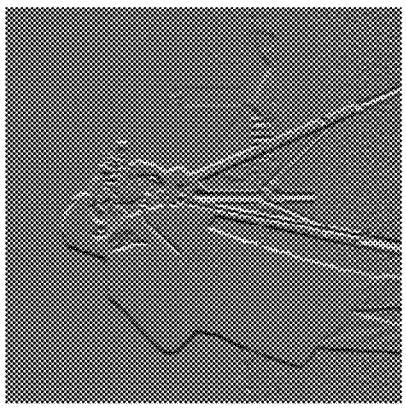
FIG. 20B Vertical edge
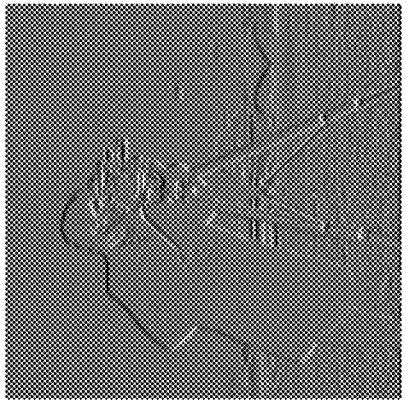
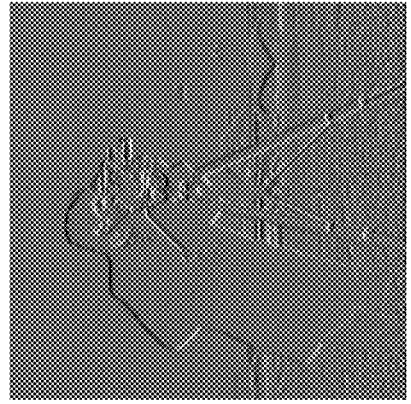
Calculated | Horizontal edge | Experiment | FIG. 20A

PHASE-CHANGE METASURFACE FOR PROGRAMMABLE WAVEGUIDE MODE CONVERSION

CROSS-REFERENCES TO RELATED APPLICATIONS

The present application is a National Stage application of International Application No. PCT/US2021/026126, filed on Apr. 7, 2021, which claims the benefit of U.S. Provisional Application No. 63/013,478, filed on Apr. 21, 2020, the contents of which are incorporated herein by reference in entirety.

STATEMENT OF GOVERNMENT LICENSE RIGHTS

This invention was made with government support under Grant No. N00014-17-1-2661, awarded by the Office of Naval Research. The government has certain rights in the invention.

BACKGROUND

Neuromorphic photonics have recently emerged as a promising hardware accelerator, with significant potential speed and energy advantages over digital electronics for machine learning algorithms, such as neural networks of various types. Integrated photonic networks are particularly powerful in performing analog computing of matrix-vector multiplication (MVM) as they afford unparalleled speed and bandwidth density for data transmission. Incorporating non-volatile phase-change materials in integrated photonic devices enables indispensable programming and in-memory computing capabilities for on-chip optical computing.

SUMMARY

In an aspect, the present disclosure provides a multimode photonic computing core consisting of an array of programmable mode converters based on on-waveguide metasurfaces made of phase-change materials. In an embodiment, the programmable converters utilize the refractive index change of the phase-change material $Ge_2Sb_2Te_5$ during phase transition to control the waveguide spatial modes with a very high precision of, for example, 64 levels in modal contrast. This contrast is used to represent the matrix elements, with 6-bit resolution and both positive and negative values, to perform MVM computation in neural network algorithms. The present disclosure provides an optical convolutional neural network that can perform image processing and recognition tasks with a high accuracy. With a broad operation bandwidth and a compact device footprint, the multimode photonic core provides large-scale photonic neural networks with ultrahigh computation throughputs.

Accordingly, in an aspect, the present disclosure provides a phase-change metasurface waveguide mode converter comprising a plurality of phase-change antennas comprising a phase-change material and protruding from a surface, wherein each phase-change antenna of the plurality of phase-change antennas is configured to scatter an optical waveguide mode and cause a phase shift of light travelling through an optical waveguide optically coupled thereto.

In another aspect, the present disclosure provides a photonic computing system comprising a phase-change metasurface waveguide mode converter according to any embodiment of the present disclosure; an optical waveguide optically coupled to the plurality of phase-change antennas; an input light source configured to emit signal light into a first end of a first portion of the optical waveguide; a variable optical attenuator disposed between the input light source and the first end of the first portion; and a signal photodetector configured to receive signal light from a second end of the first portion of the optical waveguide and generate a modulated signal based upon the received signal light.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2A schematically illustrates a photonic computing system, in accordance with an embodiment of the present disclosure;

FIG. 2B is an image of a phase-change metasurface waveguide mode converter of the photonic computing system of FIG. 2A, in accordance with an embodiment of the present disclosure;

FIG. 2C is an image of a mode selector of the phase-change metasurface waveguide mode converter of the photonic computing system of FIG. 2A, in accordance with an embodiment of the present disclosure;

FIG. 3A schematically illustrates using a phase-change metasurface array, in accordance with an embodiment of the present disclosure, as a photonic computing core for convolutional image processing, where an array of $k^2$ phase-change metasurfaces is programmed to store a kernel matrix and a patch of pixels of the image is encoded as optical pulses and input into $k^2$ optical channels to perform MAC operation with the kernel, the output in $TE_0$ and $TE_1$ are summed incoherently and measured with photodetectors, and the activation map is represented by the mode contrast and could be both positive and negative;

FIG. 3B is an optical microscope image of the photonic core of FIG. 3A including four phase-change metasurfaces with four input channels, where the $TE_0$ mode outputs are summed on-chip with Y-junctions whereas $TE_1$ mode outputs are summed off-chip and optical control pulses are input using the same set of grating couplers used for the $TE_1$ mode detection, in accordance with an embodiment of the present disclosure;

FIG. 3D is (left) a raw image generated by convolution with the kernel matrix for detection of horizontal edges and (right) the corresponding kernel matrix for edge detection, in accordance with an embodiment of the present disclosure;

FIG. 3E is (left) a raw image generated by convolution with the kernel matrix for detection of vertical edges and (right) the corresponding kernel matrix for edge detection, in accordance with an embodiment of the present disclosure;

FIG. 4C shows raw output data of the convolution layer of two kernel matrix, in accordance with an embodiment of the present disclosure;

FIG. 4D shows a weight bank matrix used in the fully connected layer, in accordance with an embodiment of the present disclosure;

FIG. 4E provides the recognition results from the experiment with the optical CNN (left) and calculation with a computer (right) show an excellent agreement, in accordance with an embodiment of the present disclosure;

FIG. 5A illustrates a refractive index n and extinction coefficient κ of the crystalline and amorphous phases of $Ge_2Sb_2Te_5$ measured with ellipsometry, in accordance with an embodiment of the present disclosure;

FIG. 5B illustrates a change of n and κ with the percentage of crystallization p, in accordance with an embodiment of the present disclosure;

FIGS. 6A and 6B illustrate simulation results showing the incident fundamental $TE_0$ mode evolving when propagating in the PMMC where when GST is in the aGST phase, the mode conversion does not happen both in the forward propagation direction (FIG. 6A) and the backward direction (FIG. 6B), where black dashed lines outline the profile of the nano-antenna array, in accordance with an embodiment of the present disclosure;

FIGS. 6C and 6D illustrate simulation results showing the incident fundamental $TE_0$ mode evolving when propagating in the PMMC when GST is in the cGST phase, the incident mode will gradually be converted in the $TE_1$ mode in the forward propagation direction (FIG. 6C) and scattered out of the waveguide as surface waves in the backward direction (FIG. 6D), where black dashed lines outline the profile of the nano-antenna array, in accordance with an embodiment of the present disclosure;

FIGS. 7A-7C are 2D plots of the normalized transmission (7A), the $TE_1$ mode purity (7B), and the mode contrast (7C), when both the optical wavelength and the crystallization percentage are scanned, in accordance with an embodiment of the present disclosure;

FIGS. 12C and 12D illustrate experimental characterization of the mode selector, in accordance with an embodiment of the present disclosure;

FIG. 14E is a table providing designed width, fabricated width, and their difference of each nano-antenna in the metasurface, in accordance with an embodiment of the present disclosure;

FIG. 16B shows a total of 88 levels in mode purity, which correspond to more than 6 bits of the resolution, can be programmed in the PMMC, where the insets show the enlarged details of the plot. Each level can be distinguished clearly, in accordance with an embodiment of the present disclosure;

FIG. 16C shows the corresponding mode contrast calculated from the mode purity data in FIG. 16B, in accordance with an embodiment of the present disclosure;

FIGS. 20A-20C are output images of edge detection, which highlights horizontal (20A), vertical (20B) and all edges (20C), where the image processing is achieved by computer calculation (top panel) and photonic CNN (bottom panel), respectively, according to an embodiment of the present disclosure;

DETAILED DESCRIPTION

Figure 1A:
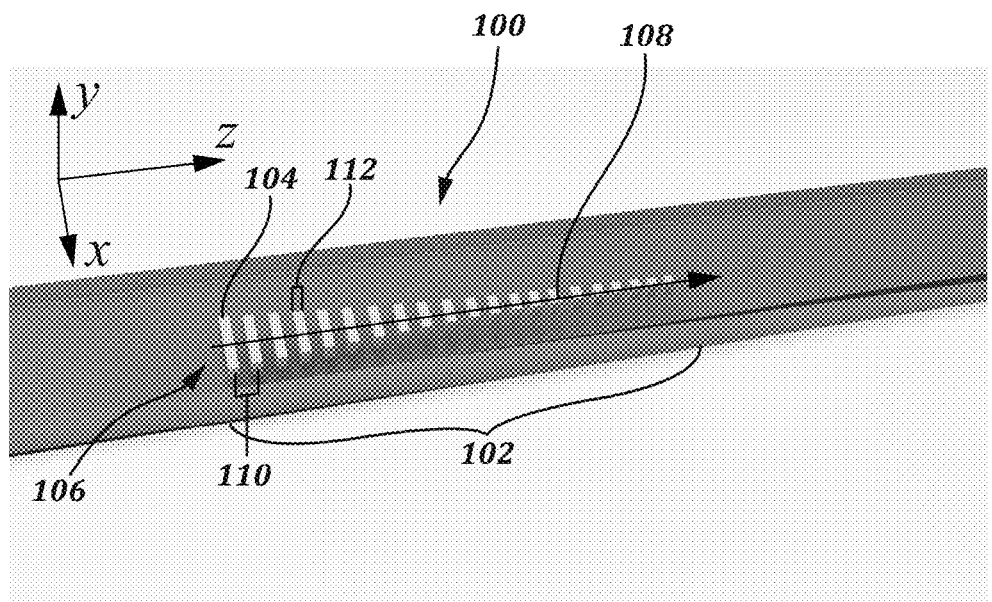
FIG. 1A is a three-dimensional, perspective illustration of a phase-change metasurface waveguide mode converter, in accordance with an embodiment of the present disclosure.
Figure 1B:
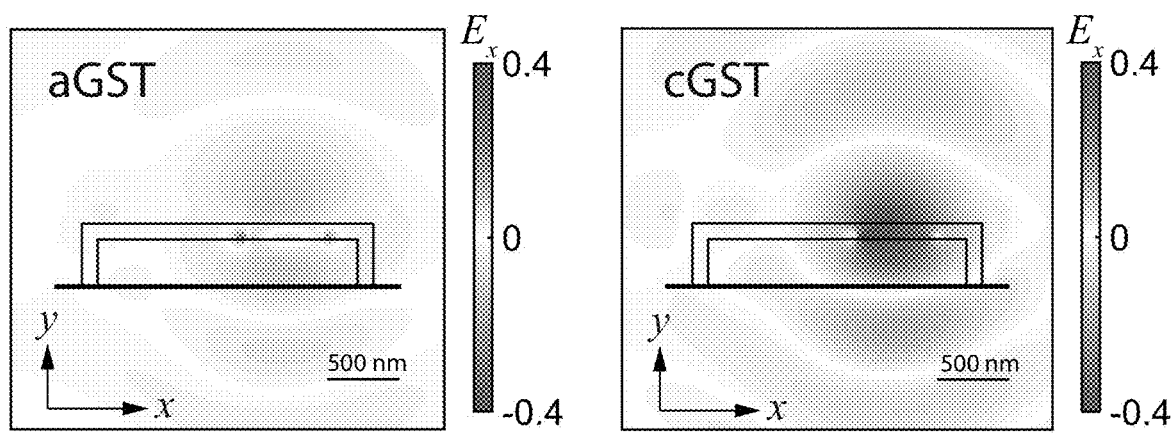
FIG. 1B is a finite element simulation of a scattered electric field produced by the phase-change material antennas of the phase-change metasurface waveguide mode converter of FIG. 1A when the phase-change material is in an amorphous (left panel) and crystalline (right panel) phase, respectively, in accordance with an embodiment of the present disclosure.

The unmet gap between the rate of energy efficiency improvement of current digital electronics and the fast-growing load of computation by emerging applications, such as machine learning and artificial intelligence, has once again brought optical computing into focus. Integrated photonics provide a scalable hardware platform to realize large-scale optical networks on a chip, which affords an enormous bandwidth density that is unreachable for conventional electronics. To use integrated photonics for optical computing, programmable photonic components and nonlinear elements are useful building blocks. Phase-change materials (PCM) recently emerged as an advantageous material system to realize optical programmability. The optical properties of PCMs change dramatically during the phase transition, which can be electrically or optically controlled. Harnessing this has allowed for embodiments of programmable optical switches, couplers, lens and metamaterials to be demonstrated.

The phase change in the chalcogenide family of Ge—Sb—Te alloys is nonvolatile, requiring no sustaining power supply to retain the programmed state or stored information. Their use in programmable photonic devices, thus, can have a significant advantage in power consumption over electro-optic or thermo-optic methods. Photonic devices incorporating those nonvolatile PCMs, thus, can realize optical memories and perform in-memory computing simply by measuring the transmission of the optical input data through the programmed device. Proliferating these phase-change photonic devices in a scalable network, prototypes of an optical neural network (ONN), has been proposed and demonstrated in the present disclosure.

Accordingly, in certain aspects, the present disclosure provides a programmable waveguide mode converter based on a phase-gradient metasurface. As discussed further herein, in certain embodiments, the phase-change metasurface waveguide mode converters of the present disclosure comprise the phase-change material $Ge_2Sb_2Te_5$ (GST). In an embodiment, the phase-change metasurface mode converter (PMMC) of the present disclosure utilize GST's large refractive index change during its phase transition to control the conversion of the waveguide's two spatial modes ($TE_0$ and $TE_1$ modes). In an embodiment, the PMMC can be programmed to control the waveguide mode contrast precisely at multiple, such as 64, distinguishable levels, which are used to represent the weight parameters with 6-bit precision in MVM computation. In this regard and as discussed further herein with respect to the Examples of the present disclosure, the PMMCs of the present disclosure can be used to build, for example, a 2×2 array of PMMCs and implement them as programmable kernels to realize a multimode optical convolutional neural network (OCNN). By performing image processing tasks, such as edge detection and pattern recognition, the present disclosure demonstrates the OCNN's viability and potential in large-scale optical computing.

Accordingly, in an aspect, the present disclosure provides a phase-change metasurface waveguide mode converter comprising a plurality of phase-change antennas protruding from a surface. In that regard, attention is directed to FIG. 1A, in which a phase-change metasurface waveguide mode converter 100, according to an embodiment of the present disclosure, is illustrated.

In the illustrated embodiment, the phase-change metasurface waveguide mode converter 100 is shown to include a plurality of phase-change antennas 102 comprising a phase-change material, which protrude from a surface 106. In an embodiment, the surface 106 is a surface 106 of an optical waveguide. In an embodiment, each phase-change antenna 104 of the plurality of phase-change antennas 102 is configured to scatter an optical waveguide mode, such as of the optical waveguide, and cause a phase shift of light travelling through the optical waveguide optically coupled thereto.

As above, the phase-change metasurface waveguide mode converter 100 is shown to include a plurality of phase-change antennas 102 comprising a phase-change material. In an embodiment, the plurality of phase-change antennas 102 is configured to alternate between two phase states, such as a crystalline phase and an amorphous phase. In an embodiment, the phase-change material is configured to continuously transition between a first phase state and a second phase state. This continuous phase transition is in contrast to a phase transition that is binary between a first phase state and a second phase state, with no mixed phase states therebetween.

As discussed further herein, as the phase-change material of the plurality of phase-change antennas 102 transitions from a crystalline phase to an amorphous phase, optical properties, such as a refractive index of the phase-change material, also change. In an embodiment, a complex refractive index of the material has a large change when the material undergoes a phase-transition between crystalline and amorphous phases suitable to generate scattering distinguishable between the two phases.

A number of phase-change materials can be used with the phase-change metasurface waveguide mode converters of the present disclosure. In an embodiment, phase-change material selected from the group consisting of $Ge_2Se_2Te_5$ (GST), $GeSb_2Te_4$, GeSbSeTe, GeTe, TiSbTe, and combinations thereof. In an embodiment, phase-change material selected from the group consisting GST.

In an embodiment, the phase-change metasurface waveguide mode converter 100 is configured to produce a spatial gradient of scattering phases defining a wavevector. In this regard, as the phase-change material of the plurality of phase-change antennas 102 changes from one phase to another phase, such as from a crystalline phase to an amorphous phase or vice versa, light travelling through the phase-change metasurface waveguide mode converter 100 or an optical waveguide optically coupled thereto can change, in part or in whole, from one transverse optical mode of the optical waveguide to another.

In the illustrated embodiment, the plurality of phase-change antennas 102 defines a longitudinal axis 108. In an embodiment, widths of the plurality of phase-change antennas 102 change along the longitudinal axis 108. In an embodiment, the spacing and/or positioning of the plurality of phase-change antennas 102 varies periodically along the longitudinal axis 108. As shown, the plurality of phase-change antennas 102 tapers along the longitudinal axis 108. Such a change along the longitudinal axis 108 is suitable to provide a spatial gradient of scattering phases defining a wavevector.

In an embodiment, the plurality of phase-change antennas 102 is disposed on the surface 106 such that the phase-change antennas 104 are disposed periodically and/or at regular intervals along the surface 106. In an embodiment, the periodic arrangement is suitable to produce a spatial gradient of scattering phases defining a wavevector. In an embodiment, a periodicity 110 of phase-change antennas 104 of the plurality of phase-change antennas 102 is a fraction of the optical wavelength a whole wavelength of light passing through the optical waveguide, such as discussed further herein with respect to FIGS. 2A-2C. For example, in an embodiment, a periodicity 110 of phase-change antennas 104 of the plurality of phase-change antennas 102 is less than a wavelength of signal light from a light source optically coupled to the waveguide. In an embodiment, a periodicity 110 of adjacent phase-change antennas 104 of the plurality of phase-change antennas 102 is in a range of about 0.1 µm to about 2.0 µm, about 0.2 µm to about 1.5 µm, or about 0.2 µm to about 0.9 µm. In an embodiment, a periodicity 110 of adjacent phase-change antennas 104 of the plurality of phase-change antennas 102 is in a range of about 0.2 µm to about 0.9 µm, such as discussed further herein with respect to the EXAMPLES of the present disclosure.

In an embodiment, widths and/or lengths of the phase-change antennas 104 can be shaped to produce a spatial gradient of scattering phases defining a wavevector. In an embodiment, such widths and/or lengths are a fraction of an optical wavelength of light travelling through an optical waveguide optically coupled to the plurality of phase-change antennas 102. In an embodiment, a length 112 of the phase-change antennas 104 of the plurality of phase-change antennas 102 is in a range of about 0.1 µm to about 1.0 µm, about 0.1 µm to about 0.8 µm, or about 0.1 µm to about 0.4 µm. In an embodiment, a length 112 of the phase-change antennas 104 of the plurality of phase-change antennas 102 is in a range of about 0.1 µm to about 0.4 µm.

In an embodiment, a number of the phase-change antennas 104 of the plurality of phase-change antennas 102 is in a range of about 2 to about 100, about 5 to about 75, about 10 to about 50, or about 20 to about 40. In an embodiment, the number of the phase-change antennas 104 of the plurality of phase-change antennas 102 is in a range of about 20 to about 40

In addition to being a size suitable to produce a spatial gradient of scattering phases defining a wavevector, the phase-change antennas 104 may also be of a size scale that the phase-change antennas 104 do not or do not substantially change shape when transitioning between phase states. At larger size scales, the phase-change antennas 104 may change shape due to factors such as surface tension and/or other thermodynamic factors. However, when the phase-change antennas 104 are relatively small, such as those described herein, they generally do not change shape and, thus, photonic computing operations including phase-state changes can be repeatedly performed on a single plurality of phase-change antennas 102, as discussed further herein with respect to the EXAMPLES of the present disclosure.

In another aspect, the present disclosure provides a photonic computing system including one or more phase-change metasurface waveguide mode converters according to an embodiment of the present disclosure. In that regard, attention is directed to FIGS. 2A-2C, in which a photonic computing system 216, in accordance with an embodiment of the present disclosure, is illustrated. FIG. 2A schematically illustrates the photonic computing system 216. FIG. 2B is an image of a phase-change metasurface of the photonic computing system 216. FIG. 2C is an image of a mode selector 248 of the phase-change metasurface of the photonic computing system 216.

The photonic computing system 216 is shown to include the phase-change metasurface waveguide mode converter 200; an optical waveguide 218 optically coupled to the plurality of phase-change antennas 202; an input light source 220 configured to emit signal light into a first end 222 of a first portion 224 of the optical waveguide 218; a variable optical attenuator 226 disposed between the input light source 220 and the first end 222 of the first portion 224; and a signal photodetector 228 configured to receive signal light from a second end 230 of the first portion 224 of the optical waveguide 218 and generate a modulated signal based upon the received signal light.

The phase-change metasurface waveguide mode converter 200 can be a phase-change metasurface waveguide mode converter 200 according to any embodiment of the present disclosure. In an embodiment, the phase-change metasurface waveguide mode converter 200 is an example of the phase-change metasurface waveguide mode converter 100 discussed further herein with respect to FIG. 1A.

As shown, the phase-change metasurface waveguide mode converter 200 includes a plurality of phase-change antennas 202 disposed on a surface 206 and defines a longitudinal axis 208 along a length of the plurality of phase-change antennas 202, as discussed further herein with respect to FIG. 1A.

As also shown, the photonic computing system 216 includes an encapsulation layer 214 disposed over the phase-change metasurface waveguide mode converter 200. In an embodiment, the encapsulation layer conformally encapsulates the phase-change metasurface waveguide mode converter 200. In an embodiment, the encapsulation layer comprises $Al_2O_3$. In an embodiment the encapsulation layer 214 serves as a protection layer. In an embodiment, the encapsulation layer 214 also facilitates achieving complete phase transition of the phase-change material, prevents film deformation, and/or improves the endurance of the phase-change metasurface waveguide mode converter 200.

In an embodiment, the optical waveguide 218 supports a first transverse mode and a second transverse optical mode. In an embodiment, such first transverse optical mode and second transverse optical mode pass through first portion 224 of the waveguide 218 and second portion 236 of the waveguide 218. In this regard, the input light source 220 is configured to emit signal light into a first end 222 of a first portion 224 of the optical waveguide 218 in the first transverse mode.

In an embodiment, a wavevector difference between the first transverse optical mode and the second transverse optical mode is equal to the wavevector produced by the plurality of phase-change antennas 202 in a crystalline phase. In this regard, the system is configured to convert light in the first transverse optical mode to the second transverse optical mode upon passing through the phase-change metasurface waveguide mode converter 200, such as when the plurality of phase-change antennas 202 is in a crystalline phase. Correspondingly, in an embodiment, the wavevector produced by of the plurality of phase-change antennas 202 is not equal to the wavevector difference between the first transverse optical mode to the second transverse optical mode when the plurality of phase-change antennas 202 is in an amorphous phase. In this regard, when the plurality of phase-change antennas 202 is in an amorphous phase, the photonic computing system 216 does not convert light or converts less light in the first transverse optical mode to the second transverse optical mode upon passing through the phase-change metasurface waveguide mode converter 200.

As above, the system includes a signal photodetector 228 configured to receive signal light from a second end 230 of the first portion 224 of the optical waveguide 218 and generate a modulated signal based upon the received signal light. Signal light that is not converted from the first transverse optical mode to the second transverse optical mode is received by the signal photodetector 228. As shown, the system 216 further includes a control photodetector 238 configured to receive control light from a second end 240 of the second portion 236 of the optical waveguide 218 and configured to generate a control signal based upon the received control light. Signal light that is converted from the first transverse optical mode to the second transverse optical mode is received by the control photodetector 238. A comparison of signals from the signal photodetector 228 and the control photodetector 238 can be indicative of an amount of signal light converted from the first transverse optical mode to the second transverse optical mode by the phase-change metasurface waveguide mode converter 200. As above, this amount of conversion between optical modes is based upon or controlled by a phase state of the phase-change antennas 204 of the plurality of phase-change antennas 202, such as a degree of crystallinity or amorphousness of the phase-change material of the plurality of phase-change antennas 202.

In an embodiment, the photonic computing system 216 further includes a controller 250 operatively coupled to the signal photodetector 228 and configured to receive the modulated signal. In an embodiment, the controller 250 is one or more conventional (i.e. electronic) computing systems. In an embodiment, the controller 250 is a functional element that choreographs and controls the operation of the other functional elements. In one embodiment, the controller 250 is implemented with hardware logic (e.g., application specific integrated circuit, field programmable gate array, etc.). In yet another embodiment, the controller 250 may be implemented as a general-purpose microcontroller 250 that executes software or firmware instructions stored in memory (e.g., non-volatile memory, etc.). Yet alternatively, the controller 250 may be implemented in a combination of hardware and software and further may be centralized or distributed across multiple components.

As also noted above, the photonic computing system 216 includes a variable optical attenuator 226 disposed between the input light source 220 and the first end 222 of the first portion 224. In an embodiment, the variable optical attenuator 226 is configured to vary an amount of signal light that is transmitted from the input light source 220 to the optical waveguide 218. In this regard, the variable optical attenuator 226 can be used to encode the signal light that enters into the optical waveguide 218 by varying signal light intensity entering into the optical waveguide 218, wherein the signal light intensity corresponds to information to be processed by the photonic computing system 216.

In an embodiment, the photonic computing system 216 includes an antenna phase control module 246 configured to modulate a phase state of the plurality of phase-change antennas 202 between a first phase state, such as a crystalline phase, and a second phase state, such as an amorphous phase. In an embodiment, the antenna phase control module 246 is configured to convert the plurality of phase-change antennas 202 from a first phase state to a second phase state different from the first phase state. As discussed further herein, such modulation between phase states of the plurality of phase-change antennas 202 is suitable to modulate optical properties, such as a refractive index, of light passing through the photonic computing system 216 and to modulate intensities signals generated by the signal photodetector 228 and the control detector. In an embodiment, the antenna phase control module 246 is configured to modulate the phase state of the plurality of phase-change antennas 202 electrically or optically. Where the antenna phase control module 246 is an electrical antenna phase control module 246, the antenna phase control module 246 includes an electrical heater adjacent to the plurality of phase-change antennas 202 positioned to transition the plurality of phase-change antennas 202 from a first phase to a second phase through electrical heating.

In an embodiment, the antenna phase control module 246 is suitable to change a degree of phase change between a first phase state and a second phase state of the phase-change material. In this regard, the phase-change material can be partially modulated between a first phase state, such as a crystalline phase, and a second phase state, such as an amorphous phase state. Such partial modulation can be useful, for example, in generating multiple levels of phase states having optical characteristics that are individually distinguishable. In this regard, a degree of mode conversion is distinguishable between the multiple levels of phase states and can be used in performing multi-bit photonic computing tasks, as discussed further herein with respect to the EXAMPLES of the present disclosure.

In an embodiment, the antenna phase control module 246 is an optical antenna phase control module 246. In an embodiment and as shown in FIG. 2A, the photonic computing system 216 includes a control light source 232 configured to emit control light into a first end 234 of a second portion 236 of the optical waveguide 218. In an embodiment, the control light emitted from the control light source 232 is configured to transition the plurality of phase-change antennas 202 from a first phase state to a second phase state. In this regard, the control light is suitable to transition optically properties of the plurality of phase-change antennas 202 from a first value or set of values to a second value or second set of values. In an embodiment, the control light emitted from the control light source 232 is also configured to transition the plurality of phase-change antennas 202 from the second phase state to the first phase state. In this regard, the control light source 232 can transition the phase-change from a first phase state to a second phase state and then back to a first phase stage.

As shown, the controller 250 is operatively coupled to the input light source 220, control light source 232, and variable optical attenuator 226. In this regard, the controller 250 is configured to control when the signal light is emitted into the waveguide 218, how much signal light is emitted into the waveguide 218, and a phase state of the plurality of phase-change antennas 202.

In an embodiment, the photonic computing systems of the present disclosure include an array of phase-change metasurface waveguide mode converters. In this regard, attention is directed to FIGS. 3A and 3B in which a photonic computing system 316, according to an embodiment of the present disclosure, is illustrated. In an embodiment, the photonic computing system 316 is an example of the photonic computing system 216 discussed further herein with respect to FIGS. 2A-2C.

In the illustrated embodiment, the photonic computing system 316 includes an array 342 phase-change metasurface waveguide mode converters 300A-300K. The phase-change metasurface waveguide mode converters 300A-300K of the array 342 of phase-change metasurface waveguide mode converters 300A-300K can be any phase-change metasurface waveguide mode converters of the present disclosure.

In an embodiment, the phase-change metasurface waveguide mode converters 300A-300K are examples of phase-change metasurface waveguide mode converter 100 or phase-change metasurface waveguide mode converter 200 discussed further herein with respect to FIGS. 1A and FIGS. 2A-2C, respectively, or combinations thereof.

FIG. 3A schematically illustrates using a phase-change metasurface array 342, in accordance with an embodiment of the present disclosure, as a photonic computing core for convolutional image processing, where an array 342 of $k^2$ phase-change metasurfaces is programmed to store a kernel matrix and a patch of pixels of the image is encoded as optical pulses and input into $k^2$ optical channels to perform MAC operation with the kernel. The output in $TE_0$ and $TE_1$ are summed incoherently and measured with photodetectors 328 and 338. The activation map is represented by the mode contrast and could be both positive and negative. FIG. 3B is an optical microscope image of the photonic core comprising four phase-change metasurface waveguide mode converters 300A-300K with four input channels, where the $TE_0$ mode outputs are summed on-chip with Y-junctions, whereas $TE_1$ mode outputs are summed off-chip and optical control pulses are input using the same set of grating couplers used for the $TE_1$ mode detection, in accordance with an embodiment of the present disclosure;

As shown, the photonic computing system 316 includes a number of light sources emitting light of wavelengths or wavelength ranges, $\lambda_1, \lambda_2, \lambda_3 \ldots \lambda_k$, respectively input into variable optical attenuators 326A-326K, which is then passed onto phase-change metasurface waveguide mode converters 300A-300K of the array 342. In an embodiment, the wavelengths or wavelength ranges, $\lambda_1, \lambda_2, \lambda_3 \ldots \lambda_k$, can be the same or different. Light that has passed through an array 344 of optical waveguides optically coupled to phase-change metasurface waveguide mode converters 300A-300K of the array 342 of phase-change metasurface waveguide mode converters 300A-300K is received by photodetectors 328 and 338, configured to generate a signal based on the received light. As discussed further herein with respect to FIGS. 2A-2C, the photodetectors 328 and 338 can include a signal photodetector 328 and a control photodetector 338 positioned to receive light that has not been converted by the phase-change metasurface waveguide mode converters 300A-300K and light that has been converted by the phase-change metasurface waveguide mode converters 300A-300K, respectively. Likewise, signals generated by the signal photodetector 328 and the control photodetector 338 can be used to determine a degree of such conversion and, accordingly, the photonic computing system 316 can be used to perform optical or photonic computing tasks.

EXAMPLES

Example 1: Phase-Change Material Characterization

The 30 nm thick $Ge_2Sb_2Te_5$ (GST) thin film used in this work is sputtered on a silicon nitride-on-insulator substrate at room temperature. A 10 nm thick $SiO_2$ layer is then sputtered to cover the GST film to prevent oxidation and degradation during the fabrication and measurement processes. The refractive index n, as well as the extinction coefficient κ of the GST measured by a spectroscopic ellipsometer, is shown in FIGS. 5A and 5B.

Experimentally, GST can be programmed to an intermediate phase between a fully amorphous and a fully crystalline phase. The effective refractive index n and extinction coefficient κ for mixed phases (partially crystallized and partially amorphous) can be estimated from effective permittivity approximation, calculated with the effective-medium $\varepsilon_{eff}$ theory, $$\frac{\varepsilon_{eff}(p)-1}{\varepsilon_{eff}(p)+2} = p \times \frac{\varepsilon_c - 1}{\varepsilon_c + 2} + (1-p) \times \frac{\varepsilon_a - 1}{\varepsilon_a + 2},$$

where $\varepsilon_c$, $\varepsilon_a$ are the complex permittivities measured using ellipsometry spectroscopy for cGST and aGST phases respectively and can be obtained from $\sqrt{\varepsilon}=n+i\kappa$, p is the percentage of crystallization, so p=100% corresponds to the fully cGST phase while 0% corresponds to the fully aGST phase.

Example 2: Phase-Change Metasurface Mode Converter (PMMC) Design

Figure 1C:
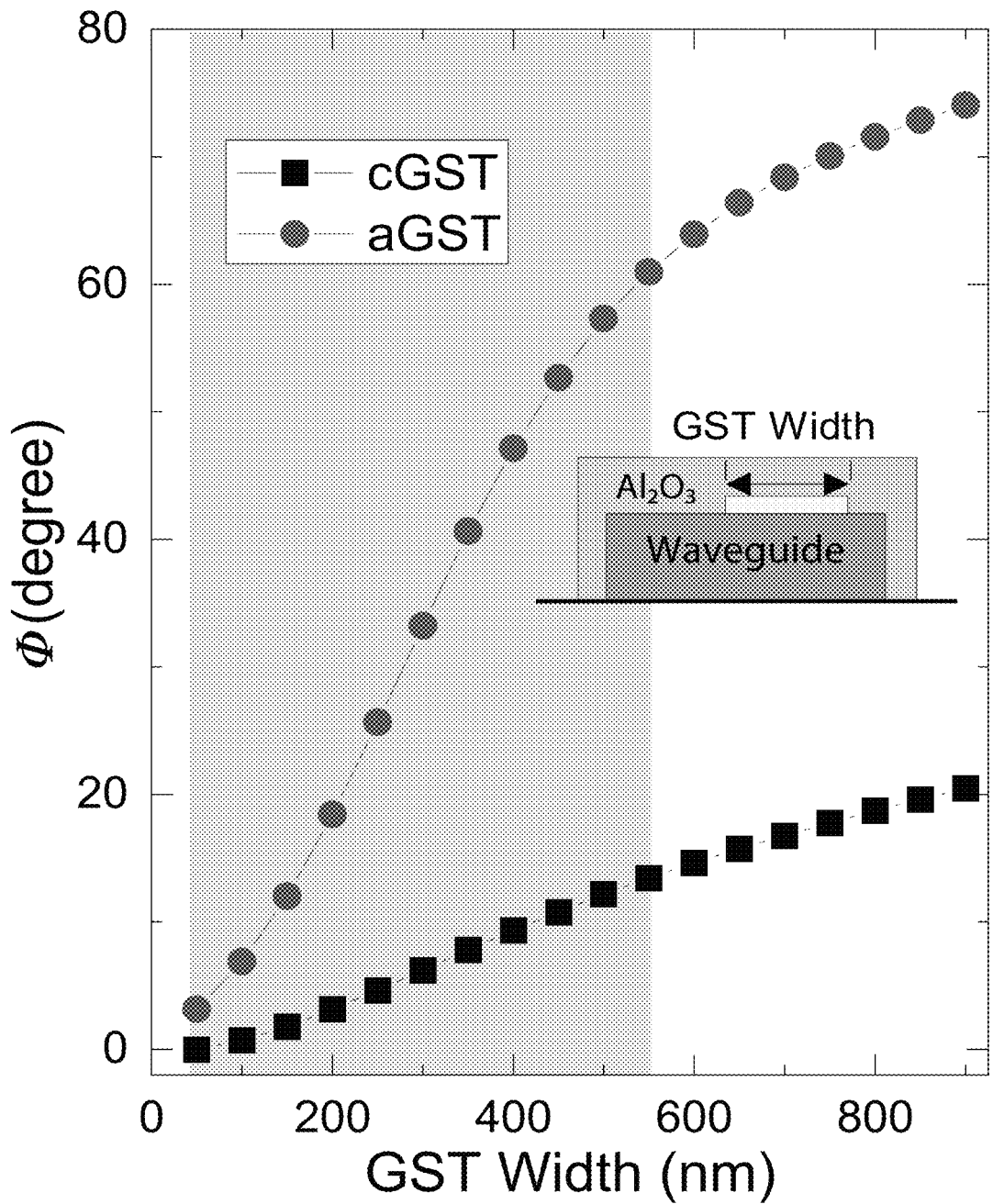
FIG. 1C illustrates phases of the scattered mode as a function of nano-antenna width for crystalline and amorphous phases, where shaded region indicates the range of antenna widths that are used in the phase-change metasurface waveguide mode converter (Inset: cross-sectional view of the structure), in accordance with an embodiment of the present disclosure.

The phase-change material based phase-gradient metasurface utilizes the consecutive scattering of the waveguide mode by the GST nano-antenna array. To build a well-defined phase gradient dΦ/dx, the phase response of a single GST nano-antenna is simulated first. The inset of FIG. 1C shows the cross-section of the geometry used in the simulation, in which a single GST nano-antenna with various width is placed on a 1.8 µm wide, 330 nm thick $Si_3N_4$ multimode waveguide, with a 400 nm offset from the central axis of the waveguide. The waveguide and the GST nano-antenna are conformally covered with a layer of 218 nm thick $Al_2O_3$ layer as a protection layer. A fundamental waveguide $TE_0$ mode is launched into the waveguide. The field distribution right after the $TE_0$ mode pass through the nano-antenna is recorded. To obtain the scattered phase precisely, we also perform another simulation with similar device geometry but without a GST nano-antenna as a reference, which is subtracted from the first simulation to calculate the scattered field by the nano-antenna only. In this way, the phase and amplitude information of the scattered field by the nano-antenna can both be determined. In the simulation, we sweep the width of the nano-antenna as well as the phase of the GST (both aGST and cGST). Since cGST has a higher refractive index near 1550 nm, the field scattered by cGST nano-antenna is much stronger compared to the field scattered by aGST nano-antenna. The phase response also shows a much stronger dependence on nano-antenna width when the GST is in the crystalline phase compare to when GST is in the amorphous phase. Thus, consider both the phase and the amplitude response together, a phase-gradient metasurface mode converter designed for the cGST nano-antenna will not be effective when the GST is in the aGST phase, other than causing a small perturbation to the mode.

To construct the metasurface, we arrange a set of cGST nano-antennas with varying widths into an array with a subwavelength spacing of dx between adjacent ones, and set the phase response between two adjacent nano-antennas to be dϕ. Thus, a constant phase gradient of dΦ/dx along the gradient metasurface is created. Since we only monitor the phase and amplitude responses of a single isolated nano-antenna as described above, when we arrange many nano-antennas into an array, the near-field inter-nano-antenna coupling between adjacent nano-antennas introduces a small additional perturbation, causing a variation of the phase gradient. To optimize the mode converter performance, we perform several rounds of optimization of the metasurface. The parameters to be optimized include the thickness of the $Al_2O_3$ encapsulation layer, the lengths and the widths of the GST nano-antennas. The parameters after optimization are listed in Table 1.

TABLE 1

Optimized parameters of the programmable phase-change material based metasurface in the mode converter.

| | |
|---|---|
| Central wavelength (nm) | 1550 |
| Dimensions of the waveguide cross-section (μm × μm) | 1.8 × 0.33 |
| $Al_2O_3$ layer thickness (nm) | 218 |
| Numbers of antennas | 25 |
| Antenna length/thickness/spacing (nm) | 172/30/400 |
| Phase incremental (degrees) | 2.5 |
| Antenna offset from waveguide central axis (nm) | 400 |
| Antenna lengths (nm) | 510, 480, 447, 425, 398, 380, 358, 341, 323, 308, 290, 278, 261, 248, 233, 220, 205, 192, 177, 164, 149, 135, 119, 105, 84 |

Example 3: Simulation on the Performance of the PMMC

One feature for this metasurface mode converter is that it supports asymmetric optical power transmission when light travels along with two opposite directions. Here we define the "forward direction" as the propagation direction following the tapering of the width of the nano-antenna while the "backward direction" is the opposite direction. The mode converter is designed to work under the crystalline phase GST. As shown in FIGS. 6A-6D, when GST is in the aGST phase, the incident $TE_0$ mode propagates in both forward and backward directions without being converted, so it is the dominant mode at the output in both directions. The slight difference at the output is due to the broken mirror symmetry caused by the GST array. When the GST in the cGST phase, the incident $TE_0$ mode propagating in the forward directions will be converted to $TE_1$ mode while the mode propagating in the backward directions will be scattered out so the transmittance will be reduced. Besides, due to the high absorption of the cGST (high κ), the total insertion loss is higher compared to the insertion loss of the aGST phase. Recently, new phase-change materials combine broadband transparency with large optical contrast have been reported, which can help further reduce the insertion loss.

Figure 7F:
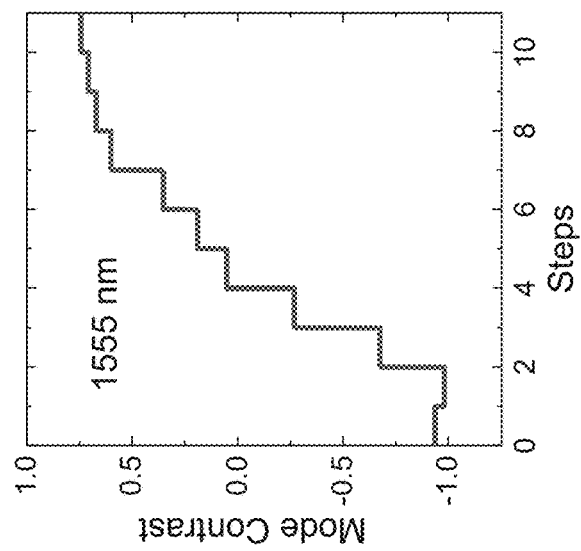
FIG. 7F is a simulation of the mode contrast varies when the GST's phase is changed from cGST to aGST step by step, where step 0 corresponds to the fully crystalline phase and the crystallization percentage drops to 0 (fully amorphous phase) at step 10 and in each step, the crystallization percentage drops by 10%, in accordance with an embodiment of the present disclosure.
Figure 7E:
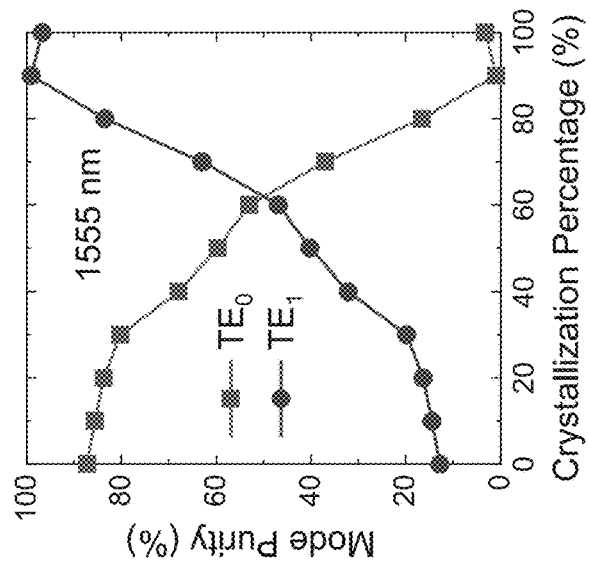
FIGS. 7D and 7E are cross-sectional plots of the transmission (7D) and the mode purity (7E) as a function of the crystallization percentage (0% corresponds to cGST and 100% corresponds to aGST), in accordance with an embodiment of the present disclosure.
Figure 7D:
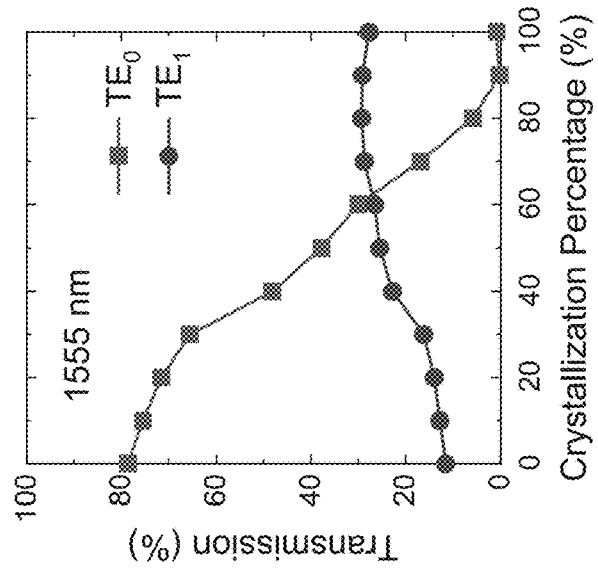

One of the advantages of using the GST metasurface is that the GST can be controlled between a fully amorphous and a fully crystalline phase using optical pulses, thus bring about the programmability that is needed for reconfigurable photonics and optical computing. We simulate the performance of the PMMC in FIGS. 7A-7F assuming the phase of the GST metasurface can be tuned continuously and uniformly. The optical properties, the refractive index n and the extinction coefficient, are taken from the FIG. 5B. FIGS. 7A-7C show the 2D plot of the normalized transmission T, $TE_1$ mode purity $\beta_{TE1}$, and mode contrast Γ, respectively, when the wavelength and the crystallization percentage are swept. The transmission spectra at various crystalline percentages are normalized by the transmission spectrum at the amorphous phase. As shown in the simulation, the PMMC performs well over broadband ranging from 1500 nm to 1600 nm. When the GST metasurface is in the cGST phase, though the transmission of the $TE_1$ mode is low due to cGST's absorption, the $TE_1$ mode purity is >95% so most of the transmitted power is carried by the $TE_1$ mode. In contrast, when the GST metasurface is in aGST phase, the $TE_0$ mode purity is as high as 87%, so most of the transmitted power is carried by the $TE_0$ mode. The detailed cross-sectional line cut of the 2D plot is also shown in FIGS. 7D and 7E. FIG. 7F shows that changing the GST from fully crystalline to fully amorphous step by step, the mode contrast is varied stepwise from −1.0 to +0.75.

We also performed FDTD simulations on the performance of the antenna array when sweeping the array period or the length of the antenna and plotted the output $TE_1$ mode purity at the 1570 nm. When we swept the array period or the antenna length, the other parameters are kept the same as elsewhere herein and the detailed parameters can be found in Table 1.

Figure 8B:
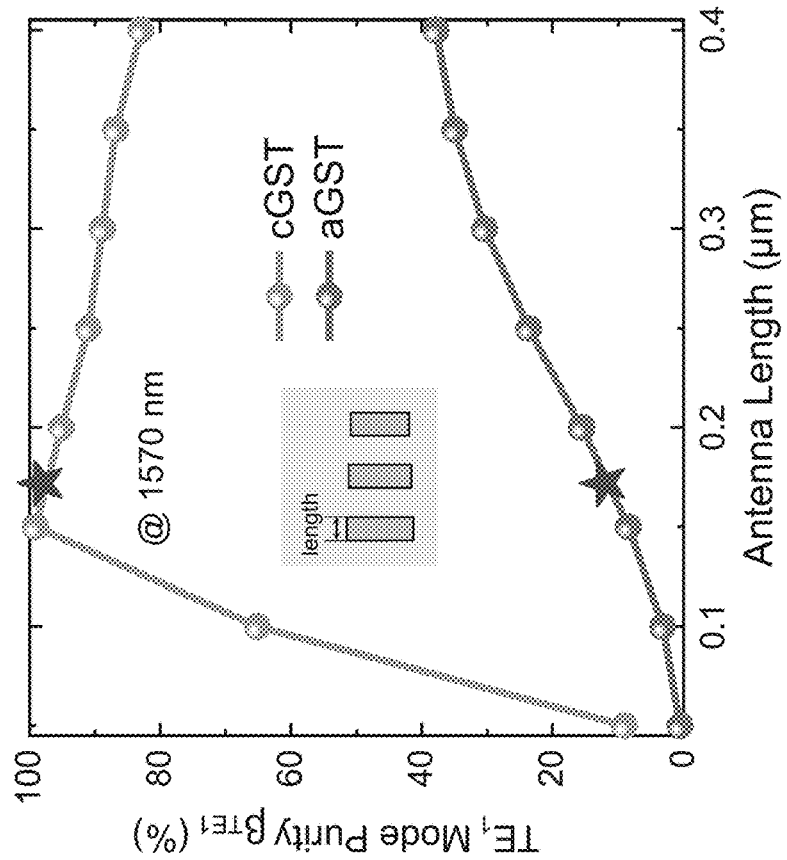
FIG. 8B is a calculated TE1 mode purity for both cGST and aGST phases, as a function of the antenna length, where the star marks the length used (0.172 μm) in the experiment and the inset denotes the definition of the antenna length, in accordance with an embodiment of the present disclosure.
Figure 8A:
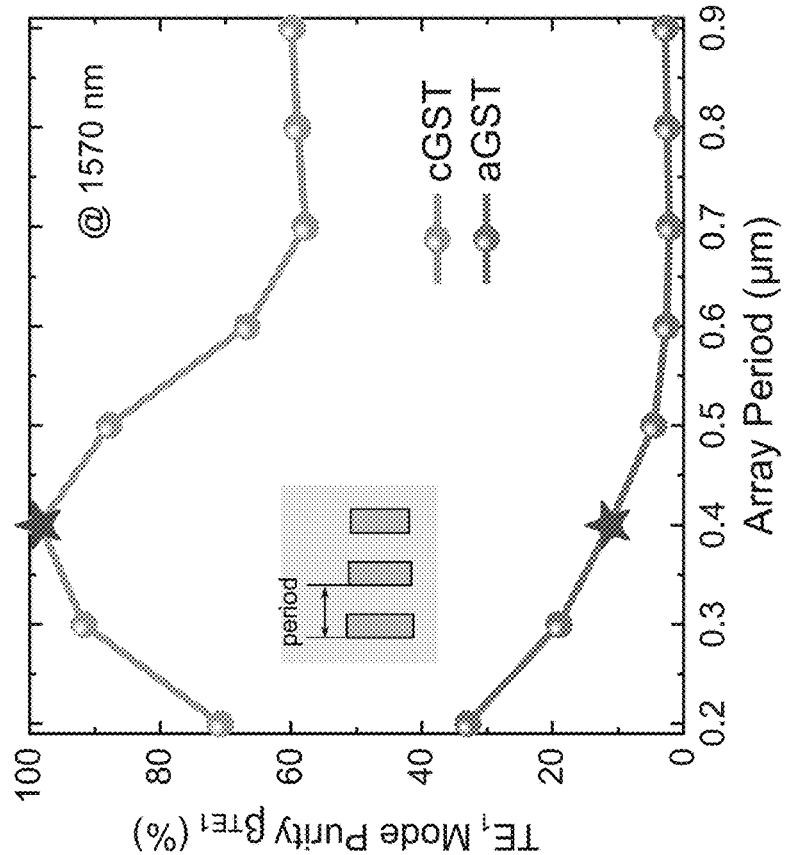
FIG. 8A is a calculated $TE_1$ mode purity for both cGST and aGST phases, as a function of the array period, where the star marks the period we used in the experiment (0.4 μm) and the inset denotes the definition of the array period, which is the distance between two adjacent nano-antennas, in accordance with an embodiment of the present disclosure.

FIG. 8A shows the $TE_1$ mode purity for both cGST and aGST as a function of the array period. The star marks the purity at the period 0.4 μm. The inset denotes the definition of the array period, which is the distance between two adjacent antennas. Changing the array period will change both the phase gradient and the coupling strength between the $TE_0$ and $TE_1$ modes. As shown in FIG. 8A, for aGST, the $TE_1$ mode purity will gradually decrease when the array period increases from 0.2 μm to 0.9 μm, while for cGST, $\beta_{TE1}$ will have its maximum at the antenna period of 0.4 μm. When the array period larger than 0.7 μm, the period is comparable to the effective wavelength of the mode, the phase gradient is negligible. The incident light is scattered by several independent antennas, thus $\beta_{TE1}$ is a constant for both phases. Therefore, we choose a period of 0.4 μm to optimize the contrast of $\beta_{TE1}$ when GST is switched between the two phases.

FIG. 8B shows the $TE_1$ mode purity for both the cGST and aGST phases as a function of the antenna length. The star marks the purity at the length we used in the manuscript (0.172 μm). The inset denotes the definition of the antenna length. Changing the antenna length will change the coupling strength between the $TE_0$ and $TE_1$ modes but only slightly change the phase gradient. If the antenna length is too small, the coupling is too weak; thus $\beta_{TE1}$ is small for both phases of GST. The $\beta_{TE1}$ increases with the increasing antenna length for aGST. For cGST, as the length of antenna increases, the $\beta_{TE1}$ first increases rapidly until it reaches its maximum at the antenna length around 0.15 μm and then gradually decreases.

Figure 9A:
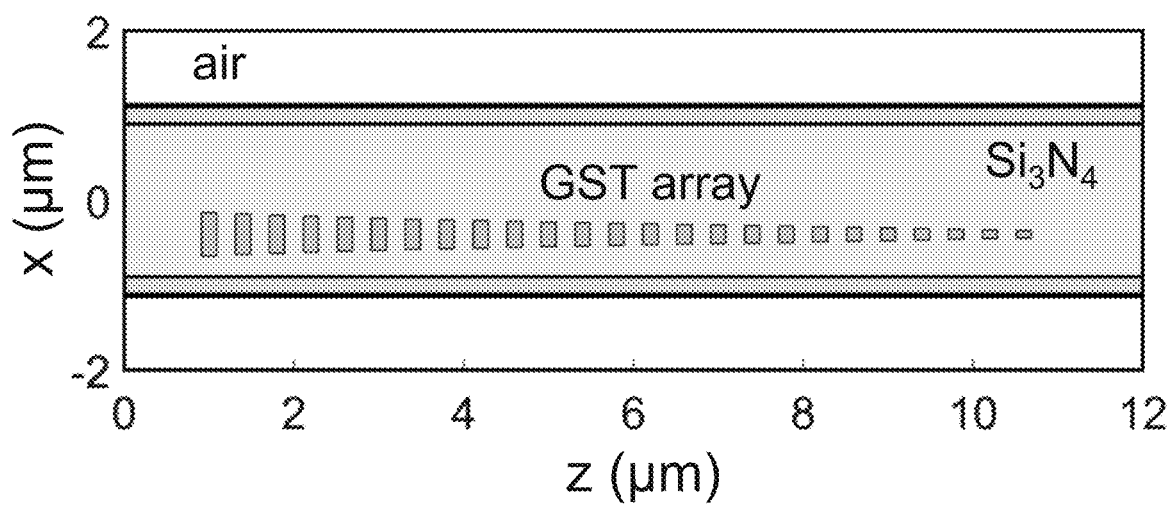
FIGS. 9A and 9B are top-down plan views (x-z cross-sectional plane) of two geometries of phase-change metasurface waveguide mode converters, in accordance with an embodiment of the present disclosure, where the dashed line in (b) outlines the nano-antenna array for comparison.
Figure 9B:
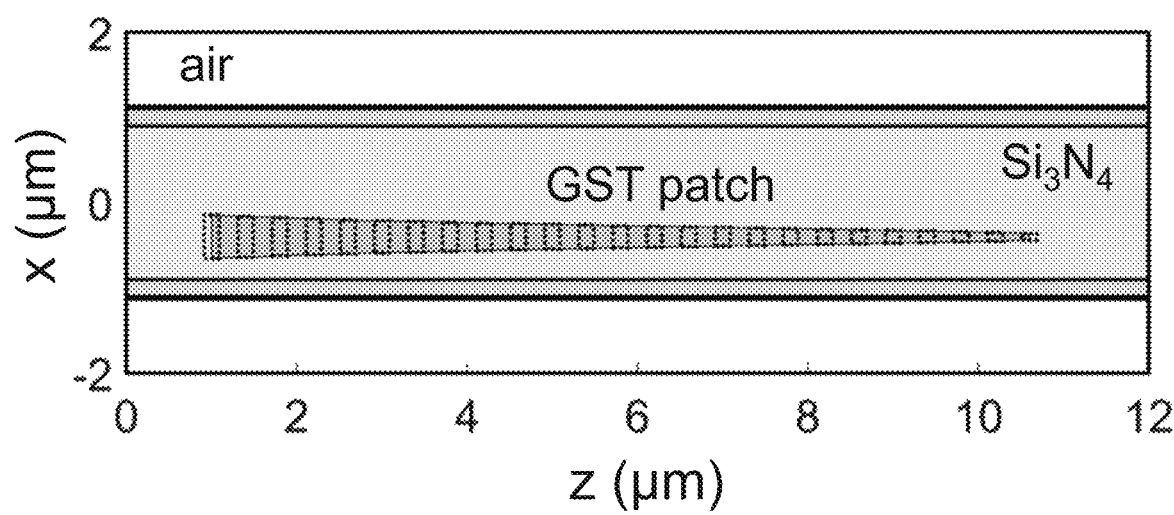

We also performed FDTD simulations and plotted the $TE_1$ mode purity as well as the mode contrast of two geometries (nano-antenna array and tapered patch) in FIGS. 9A and 9B.

FIGS. 9A and 9B show the top view (x-z cross-sectional plane) of the two geometries (GST antenna array and tapered patch). The green, blue, grey, white areas denote the $Si_3N_4$ waveguide, GST array, $Al_2O_3$ capping layer, ambient air, respectively. The geometry of the nano-antenna array is the same as the device we have shown in the manuscript. The dashed line rectangles in FIG. 9B indicates the outline of the nano-antennas in FIG. 9A for comparison. The definition of the $TE_1$ mode purity $\beta_{TE1}$ and the mode contrast Γ is the same as in the manuscript, $\beta_{TE0(TE1)}=P_{TE0(TE1)}/(P_{TE0}+P_{TE1})$, $\Gamma=\beta_{TE0}-\beta_{TE1}$ where $P_{TE0}$ ($P_{TE1}$) is the power in the $TE_0$ ($TE_1$) mode.

Figure 9C:
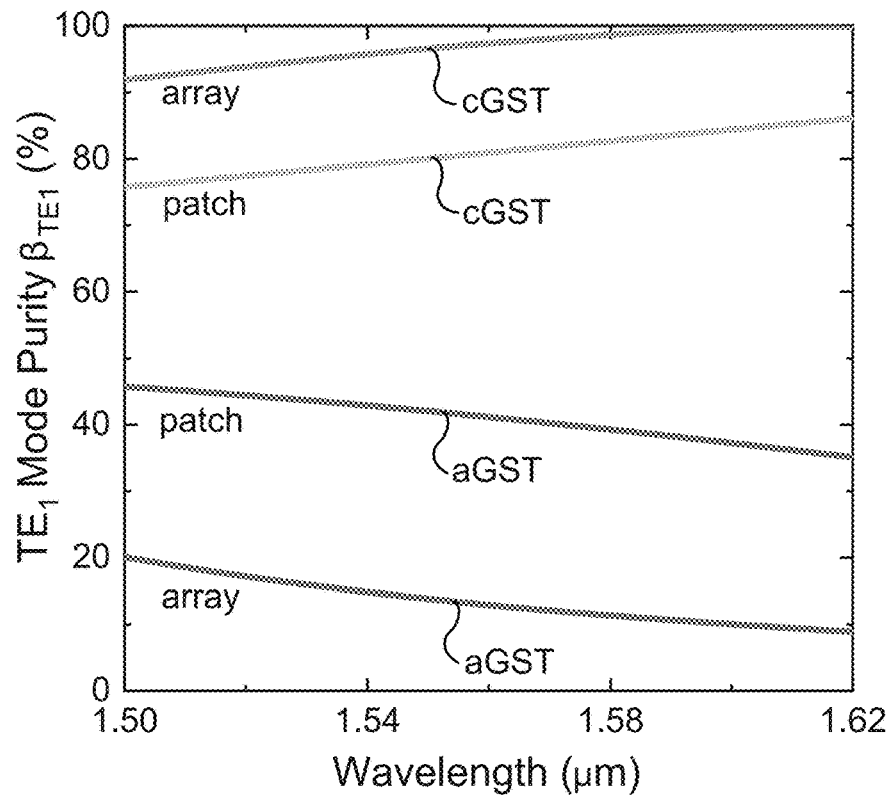
FIGS. 9C and 9D illustrate TE1 mode purity (9C) and mode contrast (9D) as a function of the wavelength, in accordance with an embodiment of the present disclosure, for the geometries of the phase-change metasurface waveguide mode converters of FIGS. 9A and 9B.
Figure 9D:
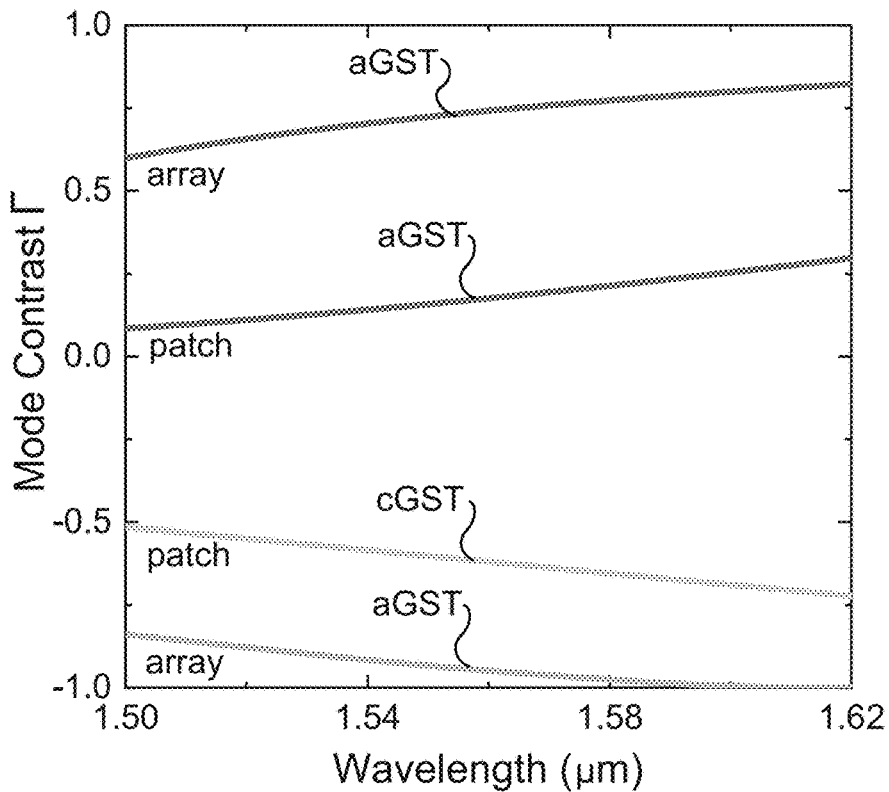

We compare the $TE_1$ mode purity for both cGST and aGST phases in two geometries, as shown in FIG. 9C. For the nano-antenna array geometry, the $TE_1$ mode purity changes from 92-99.9% in the whole spectrum range (from 1.50 μm to 1.62 μm) to 9-20% when the GST is switched from cGST to aGST phase. In comparison, the continuous tapered GST geometry has a much lower change, from 76-86% to 35-46%. This directly leads to a difference in mode contrast Γ changes, as plotted in panel FIG. 9D. For example, at 1.555 μm, Γ can be tuned from −0.93 to 0.72 in the antenna array geometry (experimental value: −0.73 to 0.67), while only from −0.61 to 0.17 in the single patch geometry. The large tunable change of Γ is critical for the use of it to represent the kernel element values in MVM computing, in terms of both precisions (up to 6 bits) and reliability.

Figure 10:
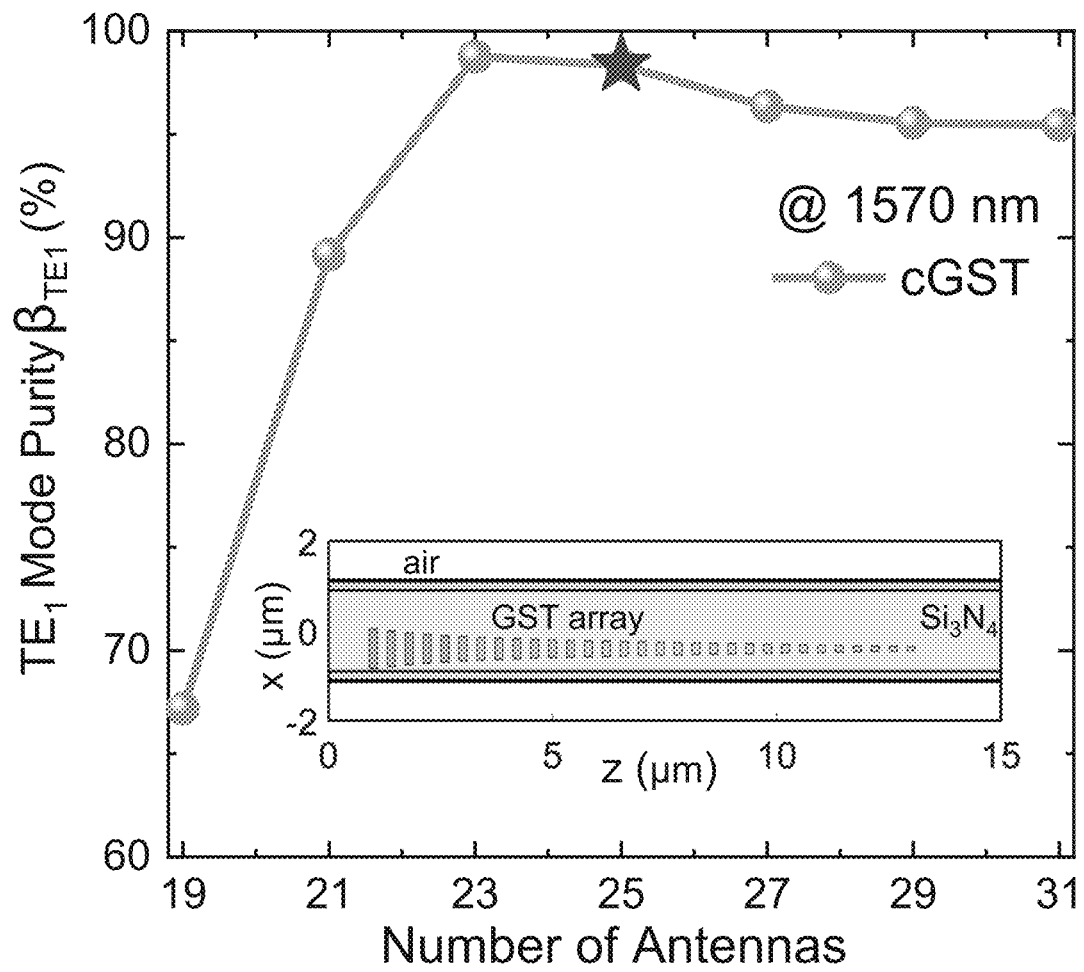
FIG. 10 illustrates TE1 mode purity as a function of the number of antennas, in accordance with an embodiment of the present disclosure, where the number of antennas changes while keeping the phase gradient as a constant, and the inset is the geometry of 19, 26, 31 nano-antennas, respectively and the star symbol marks the number of nano-antennas (25) used in the experiment.

The number N of the antenna in the array used in our device is optimized to achieve high $TE_1$ mode purity $\beta_{TE1}$. We calculate the $TE_1$ mode purity as a function of the antenna numbers in the array when the GST is in the cGST phase, as shown in FIG. 10. As shown in the inset of the figure, the number of antennas is changed while keeping the phase gradient a constant. The results show that $TE_1$ is non-monotonically dependent on the number of antennas with a peak at N=23. Beyond that, $\beta_{TE1}$ actually decreases with N, because of the increasing insertion loss. In our experiment, considering the fabrication deviation, we used N=25.

Example 4: Device Fabrication and Fabrication Error Characterization

To fabricate the PCMM, we deposited a layer of 30 nm thick $Ge_2Sb_2Te_5$ with a layer of 10 nm thick $SiO_2$ film on top by sputtering on the silicon nitride on insulator wafer (330 nm thick stoichiometric silicon nitride film deposited by LPCVD on an oxidized silicon wafer). The metasurface was patterned with electron beam lithography system (EBL) using resist ZEP 520A, and etched with an inductively coupled plasma etching (ICP) system using fluorine-based chemistry. Next, the photonic structures such as waveguides, mode selectors and grating couplers are patterned and etched using the EBL and dry etching processes. Afterward, the GST nano-antenna array was conformally covered with a 218 nm thick $Al_2O_3$ layer deposited with atomic layer deposition (ALD) method followed by a standard lift-off process to complete the fabrication. After fabrication, the substrate was baked at 180° C. on a hotplate for 10 minutes to convert the GST into the fully cGST phase.

The deviation between the geometry of the designed and the fabricated nano-antennas is characterized by the SEM images taken before the $Al_2O_3$ encapsulation process and are listed in FIG. 14E. The fabrication process is optimized to make the nano-antennas in the intermediate part of the array as accurate as possible, with <5% deviation from design. The overall errors in the widths of fabricated nano-antennas are controlled within ~15% except for the shortest nano-antennas. Despite the fabrication errors, the devices have excellent programmable mode conversion performances, demonstrating the robustness of the design against fabrication errors[4].

Figure 11A:
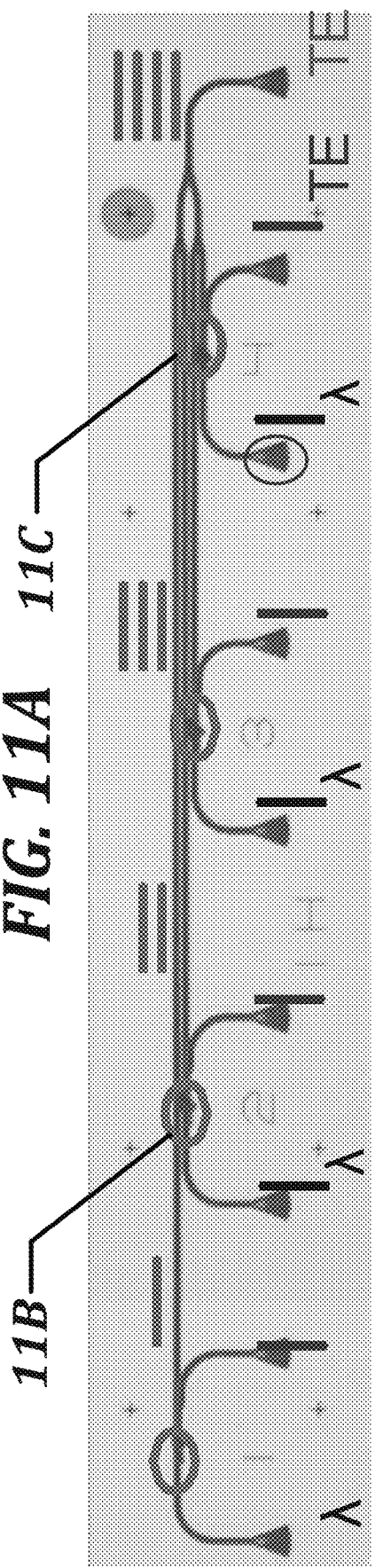
FIG. 11A is a magnified optical image of the phase-change metasurface waveguide mode converter of FIG. 3B.
Figure 11B:
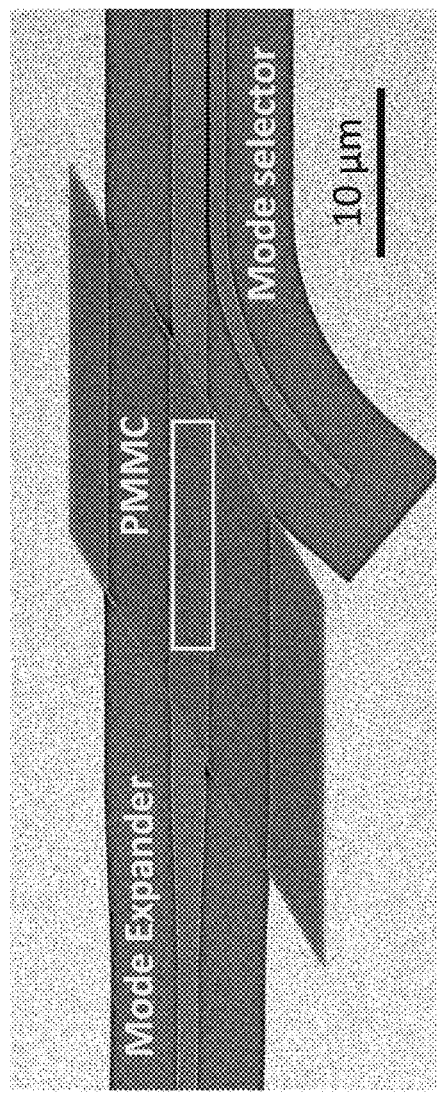
FIG. 11B is an enlarged view of the mode converter region, including a mode expander, a PMMC, and a mode selector, of FIG. 3B, in accordance with an embodiment of the present disclosure, where the shaded area is capped by an $Al_2O_3$ capping layer.
Figure 11D:
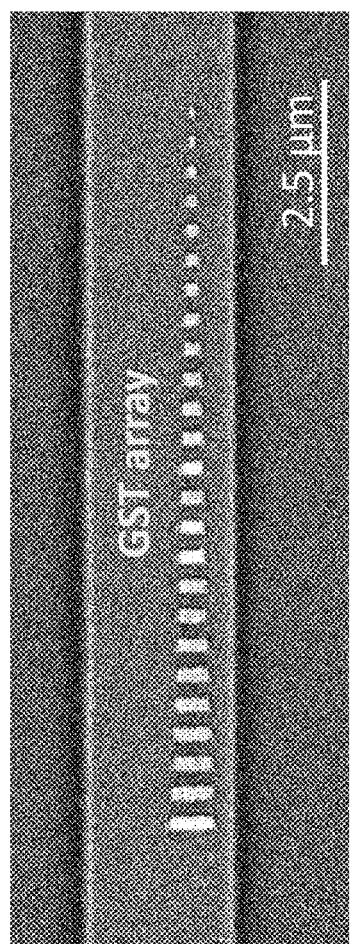
FIG. 11D is an SEM image of the GST array before $Al_2O_3$ encapsulation, according to an embodiment of the present disclosure.
Figure 11C:
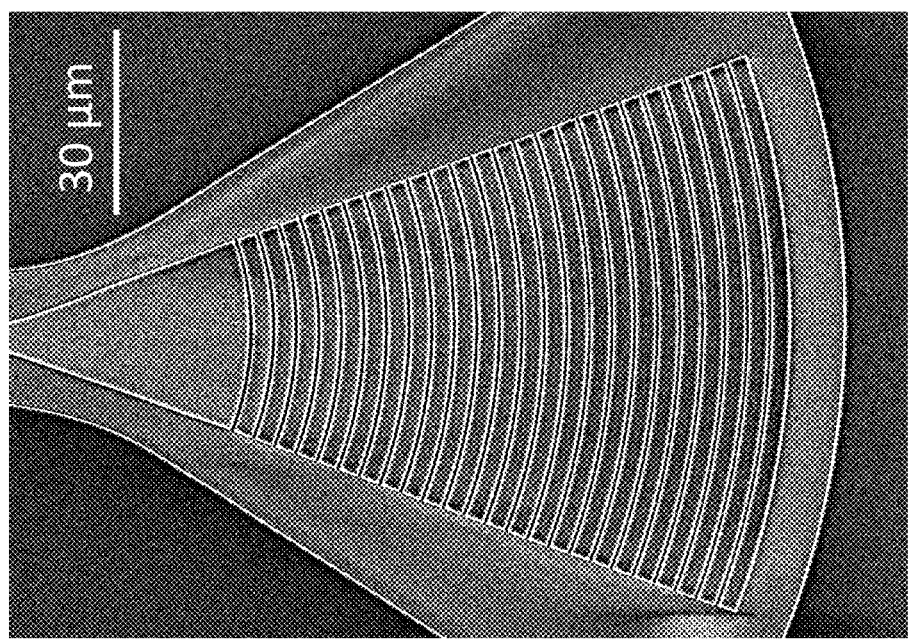
FIG. 11C is an SEM image of the grating coupler of FIG. 11A, in accordance with an embodiment of the present disclosure.

FIG. 11A shows a blow-up image of the device, as in FIG. 3B, with more details. The whole device includes of four programmable mode converters, such as shown in FIG. 11D. As shown in FIG. 11B, a mode expander is connected to the mode converter and followed with a mode selector, and the mode converter is encapsulated by a layer of $Al_2O_3$ (the blue shaded area). The incident light is firstly coupled into the single-mode waveguides through grating couplers (See FIG. 11C for the SEM image of the grating coupler). The mode expander is used to expand the incident $TE_0$ mode from the single-mode waveguide to the multimode waveguide. After the mode conversion, the light passes through the mode selector, which is an asymmetric directional coupler, to separate the $TE_0$ and $TE_1$ mode components at the output. The $TE_1$ mode components would couple out from separate ports and are summed up off-chip. The $TE_0$ mode components are summed on-chip using Y-junctions and coupled out of the chip.

Example 5: Mode Selector and Mode Expander Design

Figure 12A:
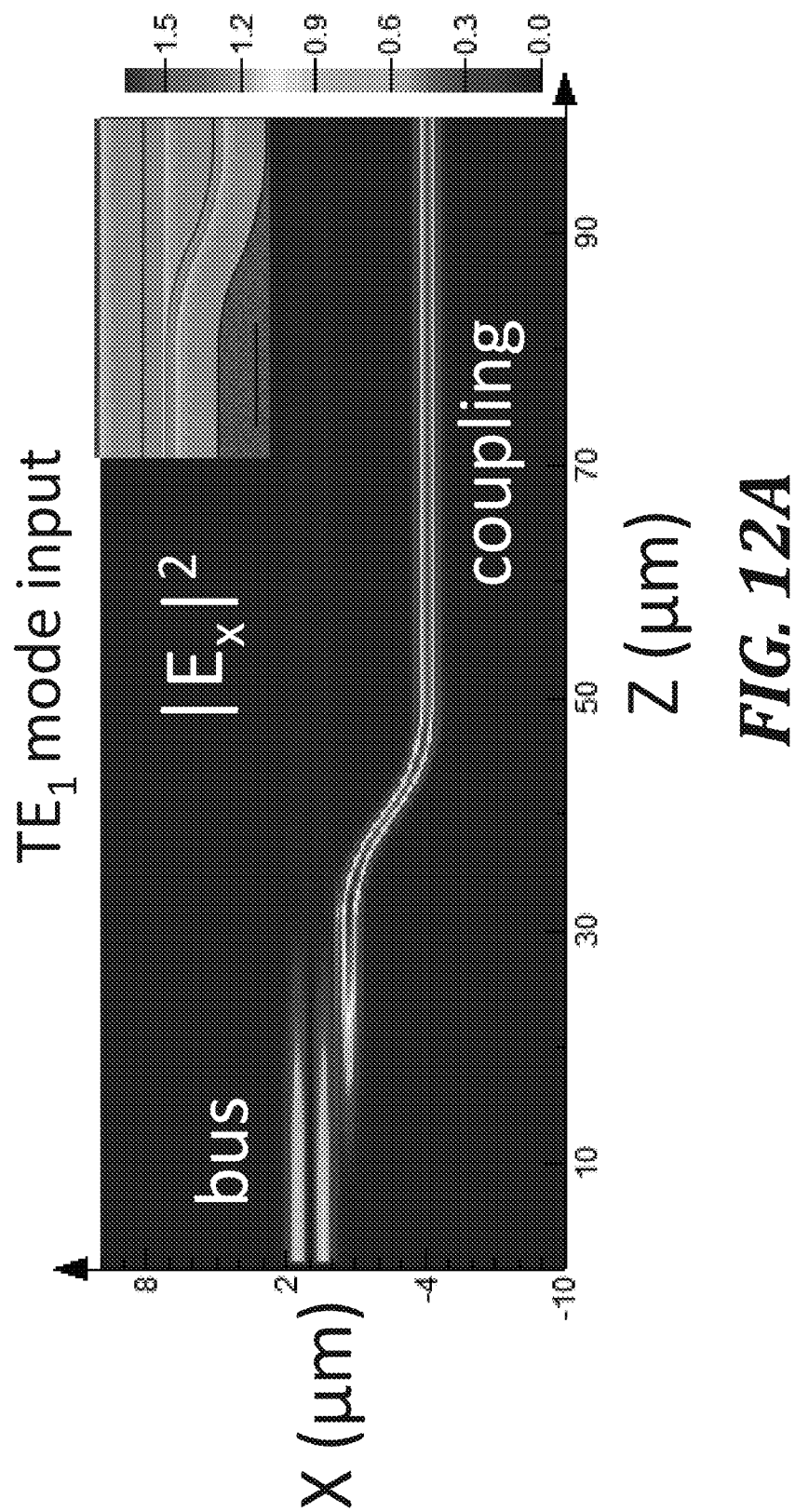
FIGS. 12A and 12B are simulation results of mode propagation through the mode selector, where if the input in the bus waveguide is in the $TE_1$ mode, it will gradually couple to the coupling waveguide and if the input mode is the $TE_0$ mode, it will stay in the bus waveguide, in accordance with an embodiment of the present disclosure.
Figure 12B:
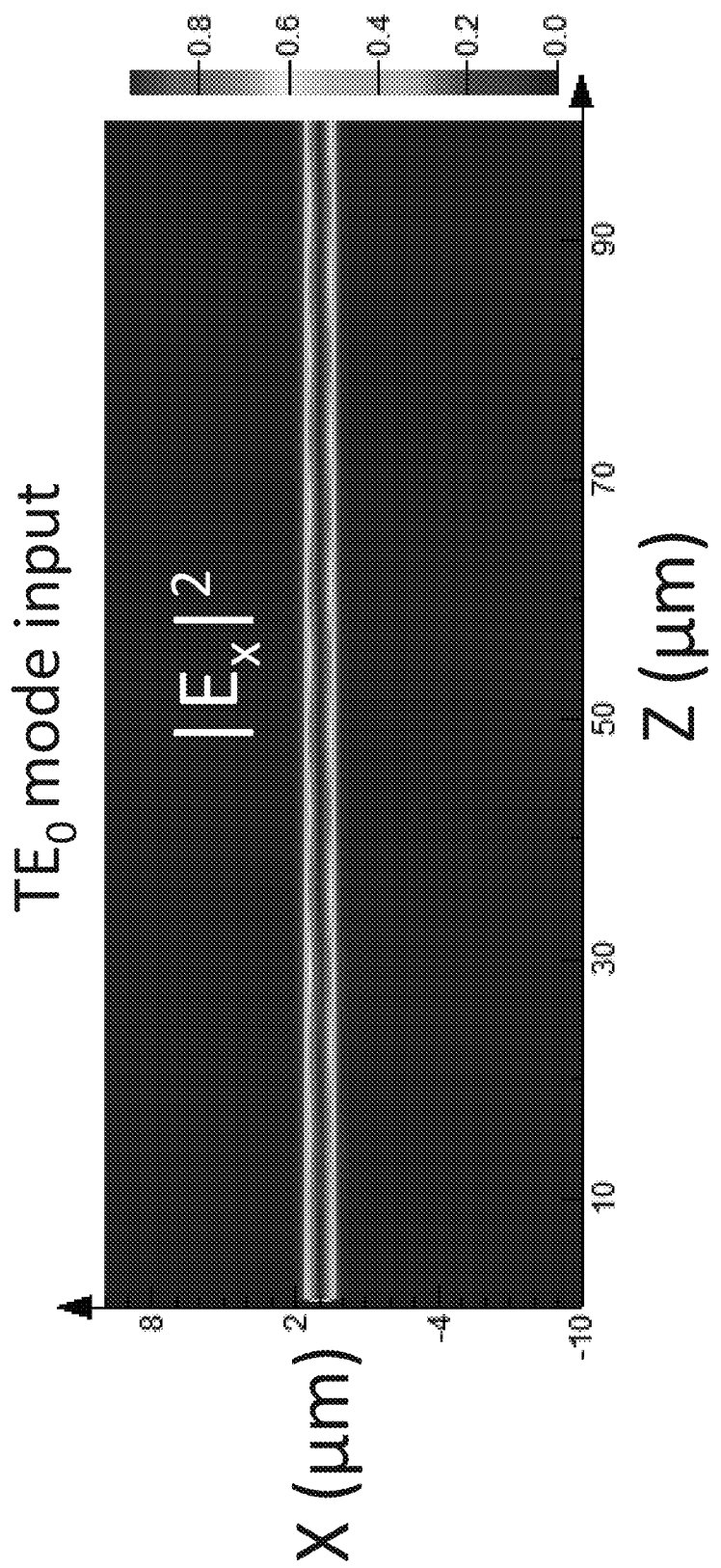

Asymmetric directional couplers are designed to separate the $TE_1$ mode from the $TE_0$ mode in the multimode waveguide. As shown in FIG. 12A, the mode selector includes a single-mode coupling waveguide and a multimode bus waveguide. The widths of the coupling waveguide and the bus waveguide are 0.91 μm and 1.8 μm, respectively. The gap between the two waveguides is 150 nm and the coupling length is around 22 μm. The waveguide widths are designed to equalize the effective mode indices of the $TE_0$ mode in the coupling waveguide with the $TE_1$ mode in the bus waveguide so they can couple with each other. The effective mode index of the $TE_0$ mode in the bus waveguide, however, is very different from that of any modes in the coupling waveguide, so it will not couple to the coupling waveguide. As demonstrated in the simulation in FIGS. 12A and 12B, the mode selector separates the $TE_1$ from the $TE_0$ modes in the bus waveguide to the coupling waveguide.

To characterize the performance of the mode selector experimentally, we fabricate a pair of the mode selector connected with the multimode waveguide, the front one is used to input the modes and the back one is used to select the mode components. As demonstrated in FIGS. 12C and 12D, if the $TE_1$ mode is input, it will output to the coupling waveguide; if the $TE_0$ mode is input, in contrast, it will stay in the bus waveguide. The performance of the mode selector is used as a reference when we measure the mode-conversion performance of our PMMC.

Figure 13A:
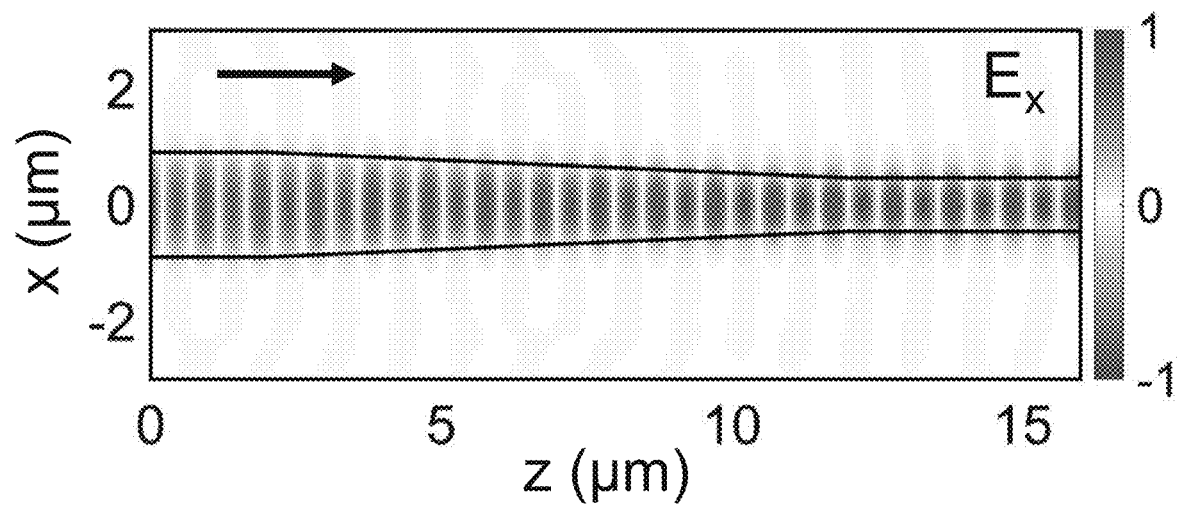
FIGS. 13A and 13B provide simulation results of mode propagation in the mode expander from a multimode waveguide to a single-mode waveguide, where the wavelength is 1550 nm, the arrow indicates the propagation direction (13A), and the input $TE_0$ mode will pass the mode expander with the expanded or squeezed mode profile with high efficiency (13B), in accordance with an embodiment of the present disclosure.
Figure 13B:
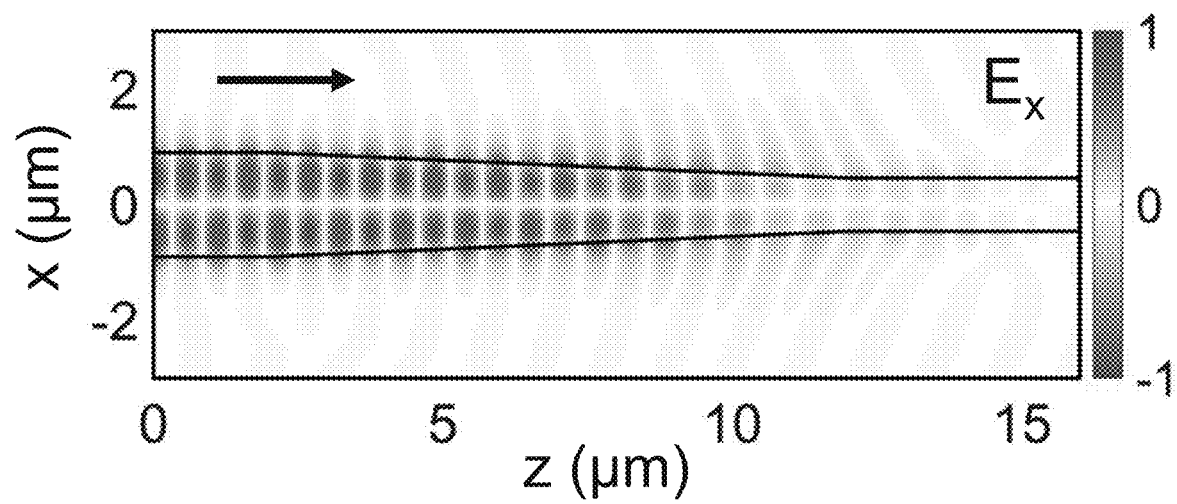
Figure 13C:
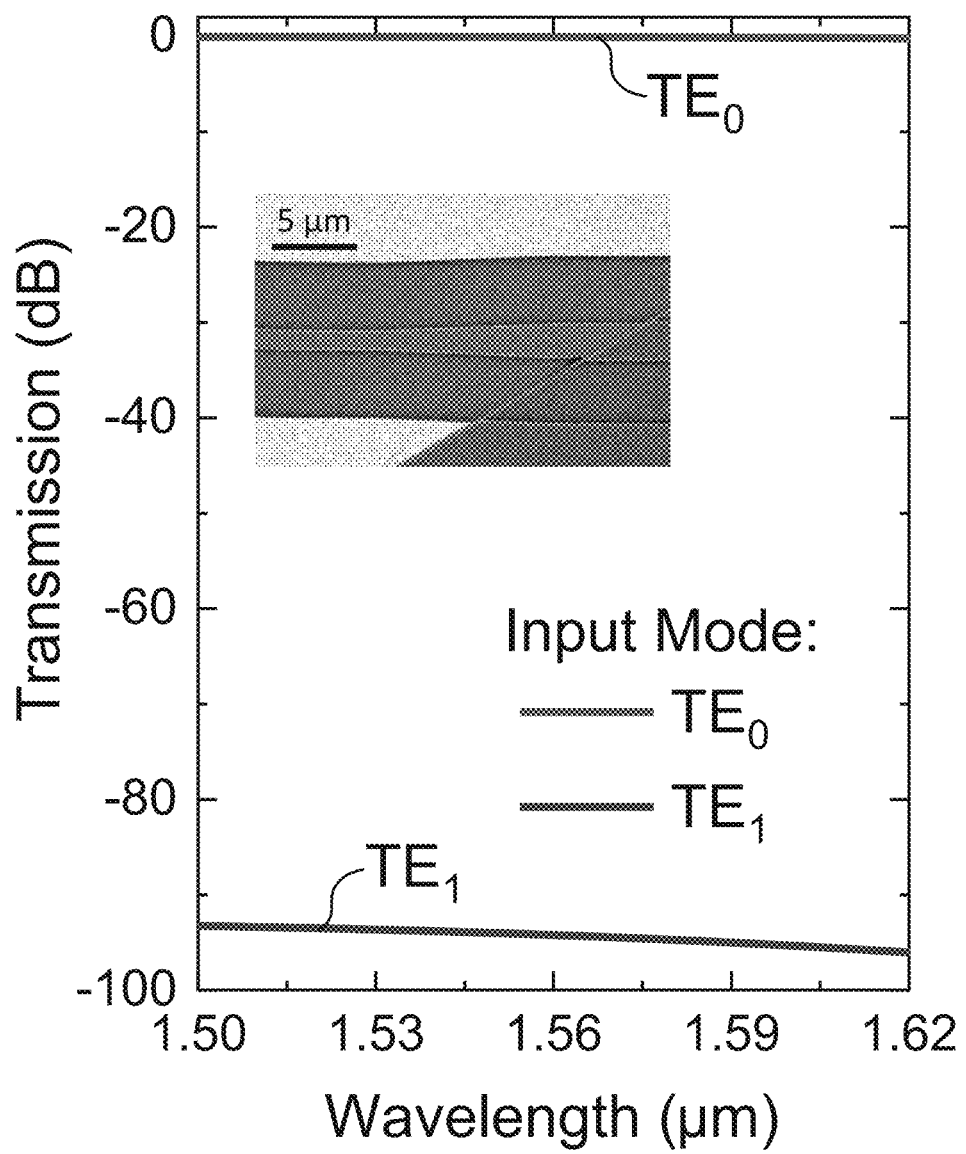
FIG. 13C illustrates the transmission spectrum in dB showing a high transmission for $TE_0$ mode (insertion loss <0.2 dB over broadband) and a high loss for the $TE_1$ mode (insertion loss >90 dB over broadband), where the inset shows the SEM image for the mode expander, in accordance with an embodiment of the present disclosure.

The mode expander is a 10 μm-long tapered waveguide connected with a 0.91 μm-wide single-mode waveguide and a 1.8 μm-wide multimode waveguide at the two ends respectively. The mode expander is used to expand or squeeze the $TE_0$ mode while blocking the incident $TE_1$ mode from the multimode waveguide, as shown in FIG. 13A-13C.

Example 6: Additional Experimental Data on the Performance of the PMMC

Figure 14B:
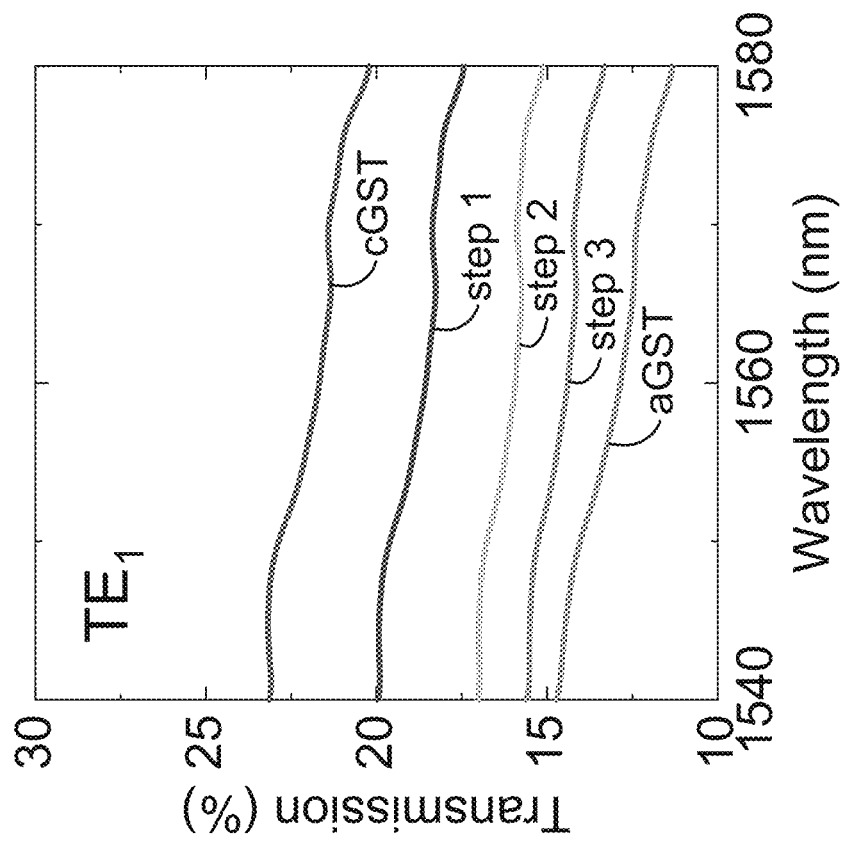
FIGS. 14A and 14B illustrates the $TE_0$ mode (14A) and $TE_1$ mode (14B) transmission coefficients when GST is gradually quenched from a fully amorphous phase to a fully crystalline phase, in accordance with an embodiment of the present disclosure.
Figure 14A:
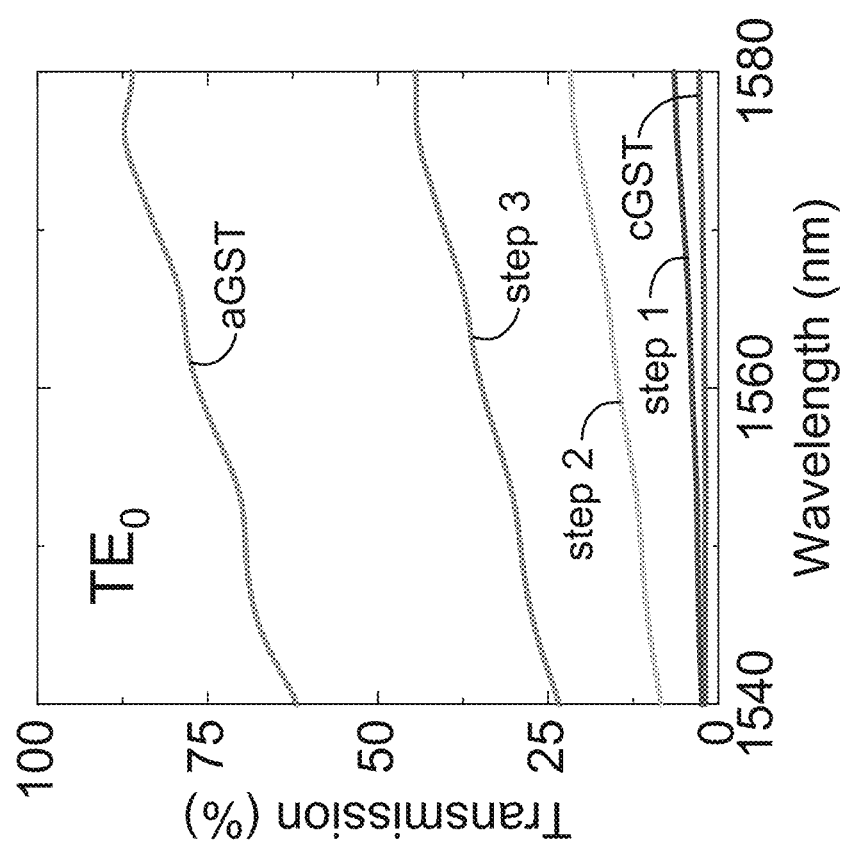

FIGS. 14A and 14B show when a $TE_0$ mode incidents into the PMMC, as the phase of the GST is gradually quenched from cGST to aGST, the $TE_0$ mode transmitted power at the output rises while the $TE_1$ mode transmitted power drops. Thus the PMMC can be programmed by controlling the phase of the GST metasurface.

Figure 14D:
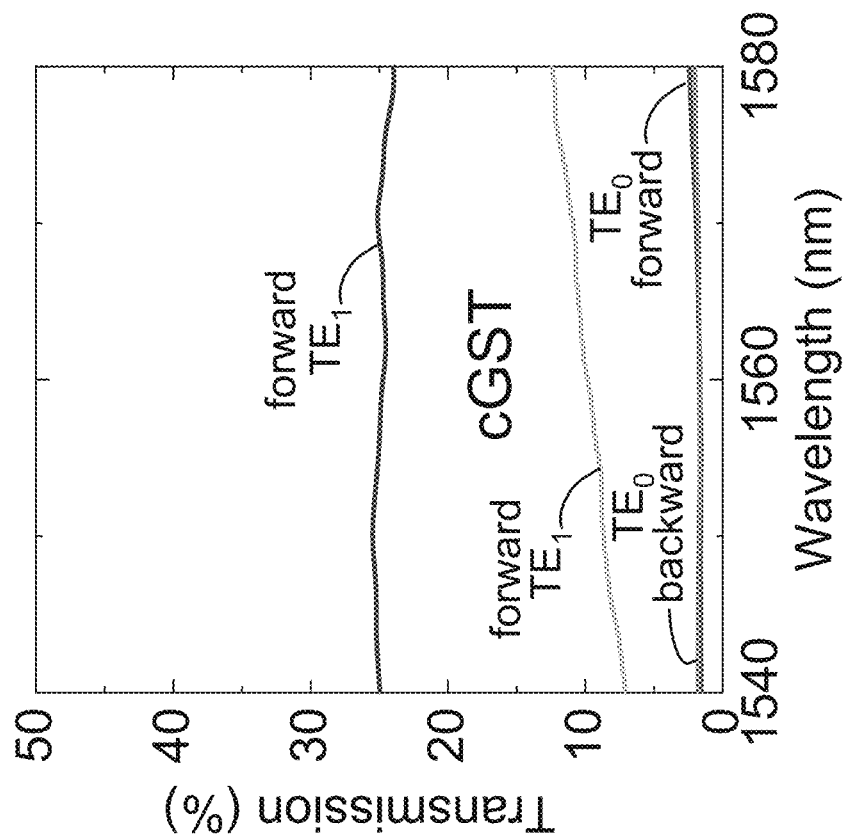
FIGS. 14C and 14D show how when GST is at aGST (14C) and cGST (14D) phases, the transmission coefficient of $TE_0$ and $TE_1$ modes, when the incident $TE_0$ mode is propagating in forward and backward directions; in accordance with an embodiment of the present disclosure.
Figure 14C:
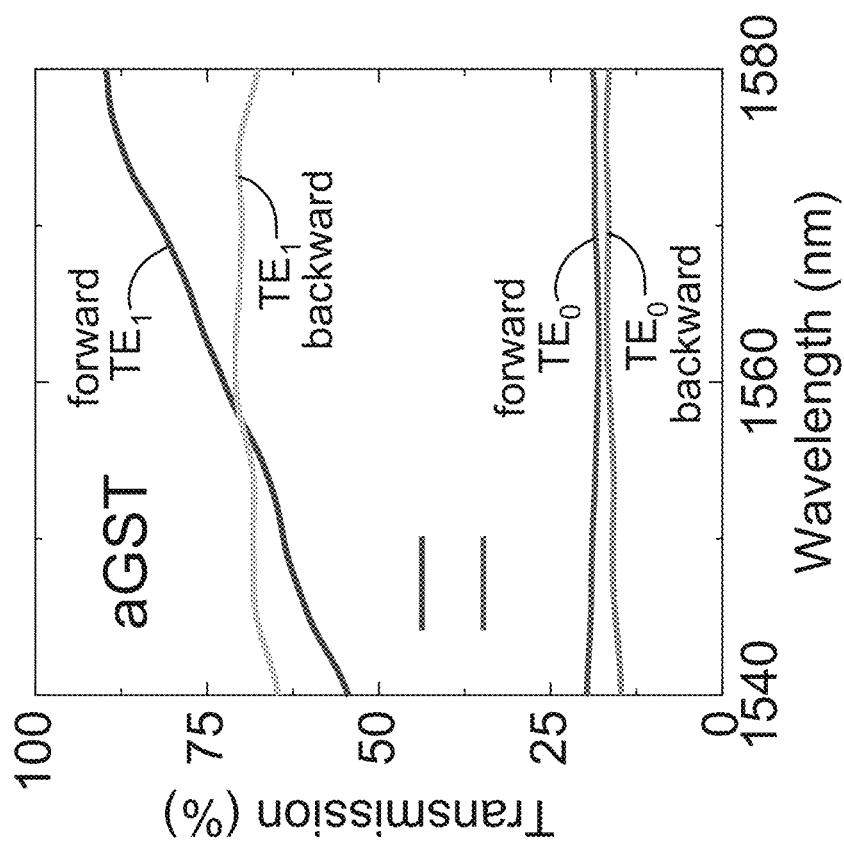

The performance of the PMMC strongly depends on the phase of the GST. To confirm this, FIGS. 14C and 14D show the measured transmission spectra of the PMMC as the incident light is propagating along with the forward and the backward direction. When the GST is in the cGST phase, the device shows a strong asymmetric transmission behavior. The light is strongly scattered out when the light travels backward as described above, thus the transmitted power is suppressed. When GST is in the aGST phase, the PMMC is ineffective with only a slight asymmetric transmission spectrum can be measured.

Figure 15A:
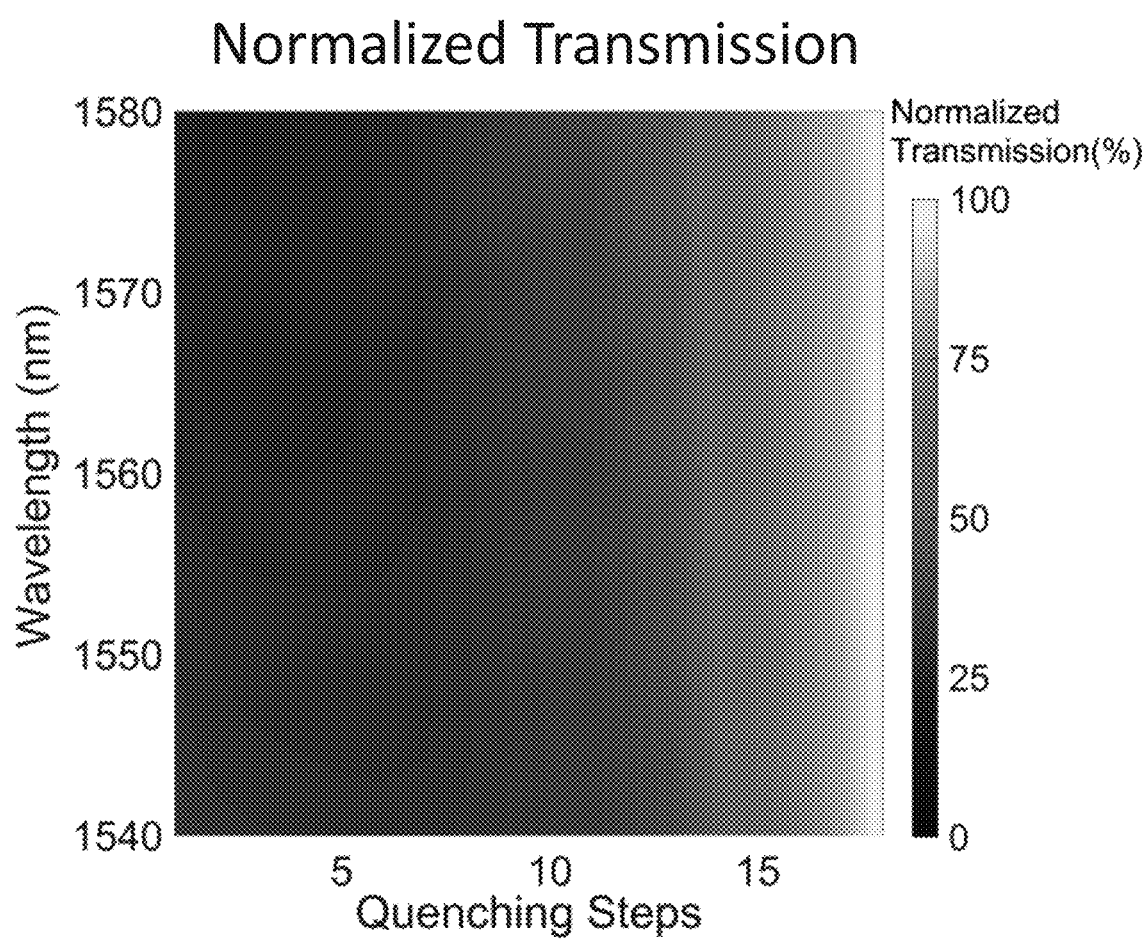
FIGS. 15A-15C illustrate experimental results of the mode converter, showing (15A) the normalized transmission, (15B) the $TE_1$ mode purity, and (15C) the mode contrast, when both the optical wavelength and the quenching steps are scanned, in accordance with an embodiment of the present disclosure.
Figure 15B:
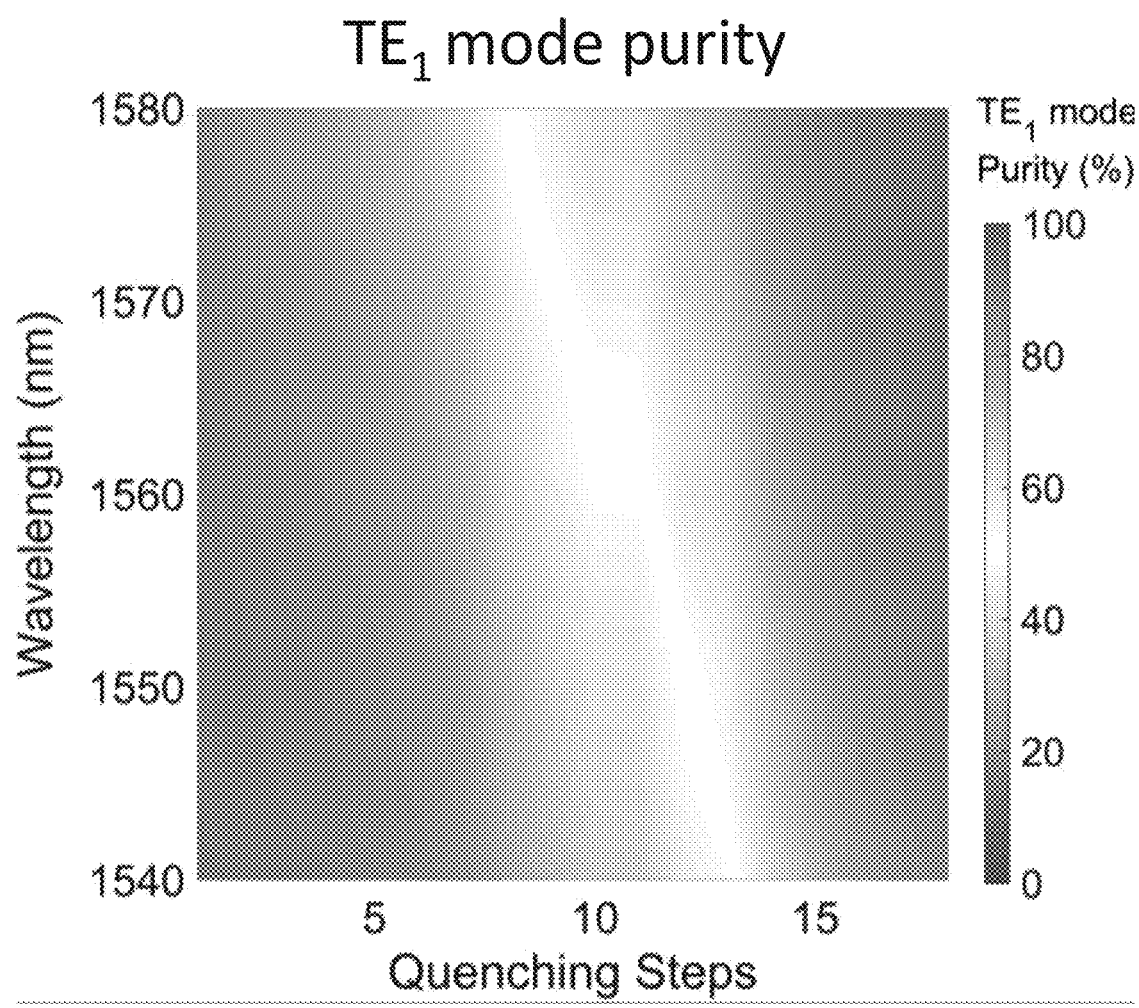
Figure 15C:
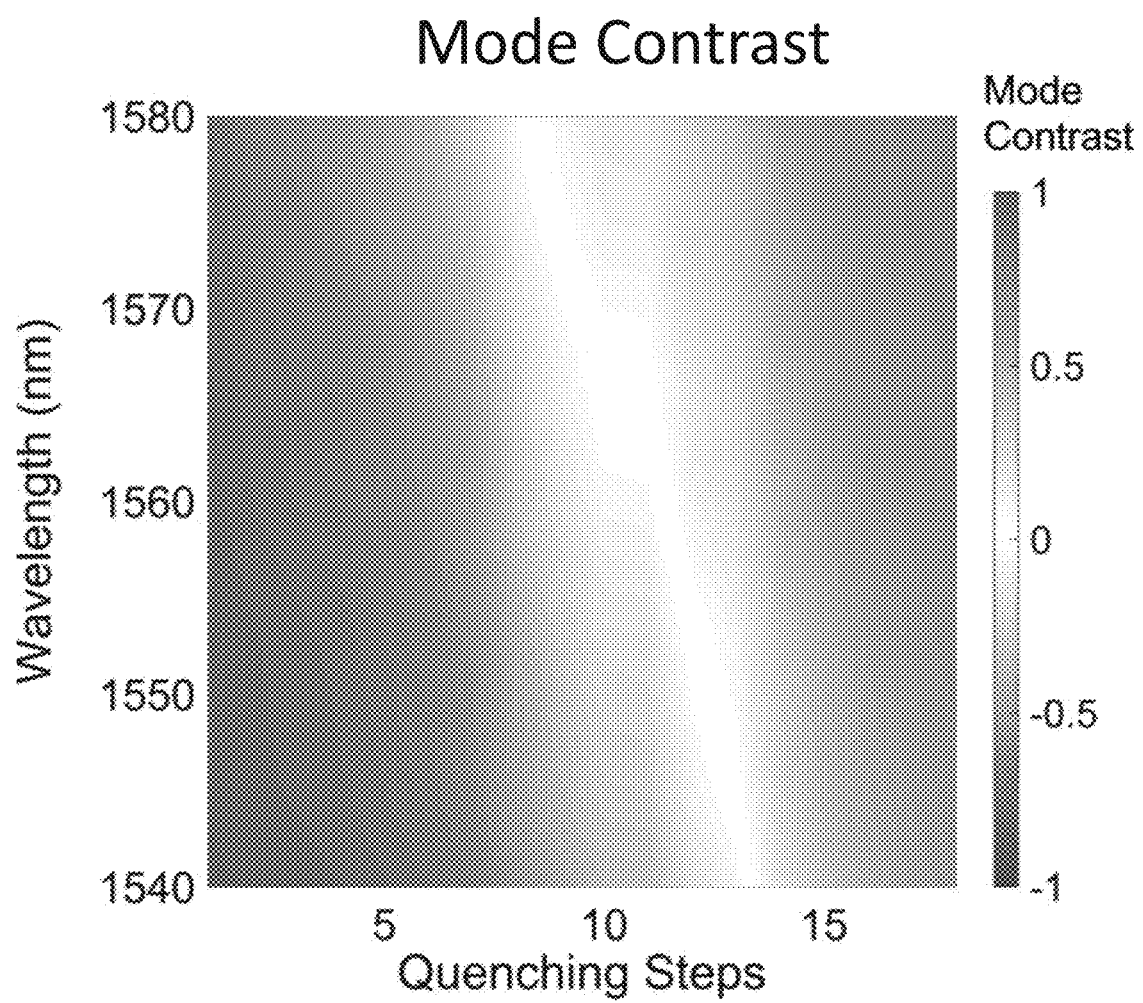

To compare with the simulation results, FIG. 15A-15C plot experimentally measured results of the normalized transmission, the $TE_1$ mode purity, and the mode contrast as a function of the wavelength and the phase of the GST. Since we quench the GST from cGST to aGST step by step using optical pulses, the crystallization percentage gradually decreases. The step "0" corresponds to the cGST phase and step "1" corresponds to the aGST phase. Compare with the simulation results in FIG. 7, the x-axis has a distortion. This is because in the simulation, we assume the phase of the GST array varies continuously and uniformly. However, in a real experiment, the crystallization percentage cannot change continuously, and the phase of each nano-antenna is not uniform either. Nevertheless, our experimental results agree well with the simulation.

Example 7: 6-Bits Nonvolatile Programmable Mode Converter

The phase-change GST has a drastic change in both of its refractive index n and extinction coefficient κ upon phase-transition. The PMMC utilizes the n contrast rather than only κ change between the crystalline and amorphous phases of GST. Thus, the PMMC is much more energy-efficient and performs larger contrast compared to other phase-change material based programmable photonic devices using a similar volume of the GST. Ideally, the phase of the GST can be set continuously to an arbitrary level if the controlling pulse sequence is precisely and carefully designed. The number of the output levels will only be limited by the achievable measurement signal-to-noise ratio. The noise level in our experiment is within the range of 0.5% and mainly comes from the noise of photodetectors, and the mechanical vibration between the grating coupler and the fibers. Other than the noise, a larger switching contrast leads to a larger range of change in the output signal with more resolvable levels of change and thus higher programming resolution.

Figure 16A:
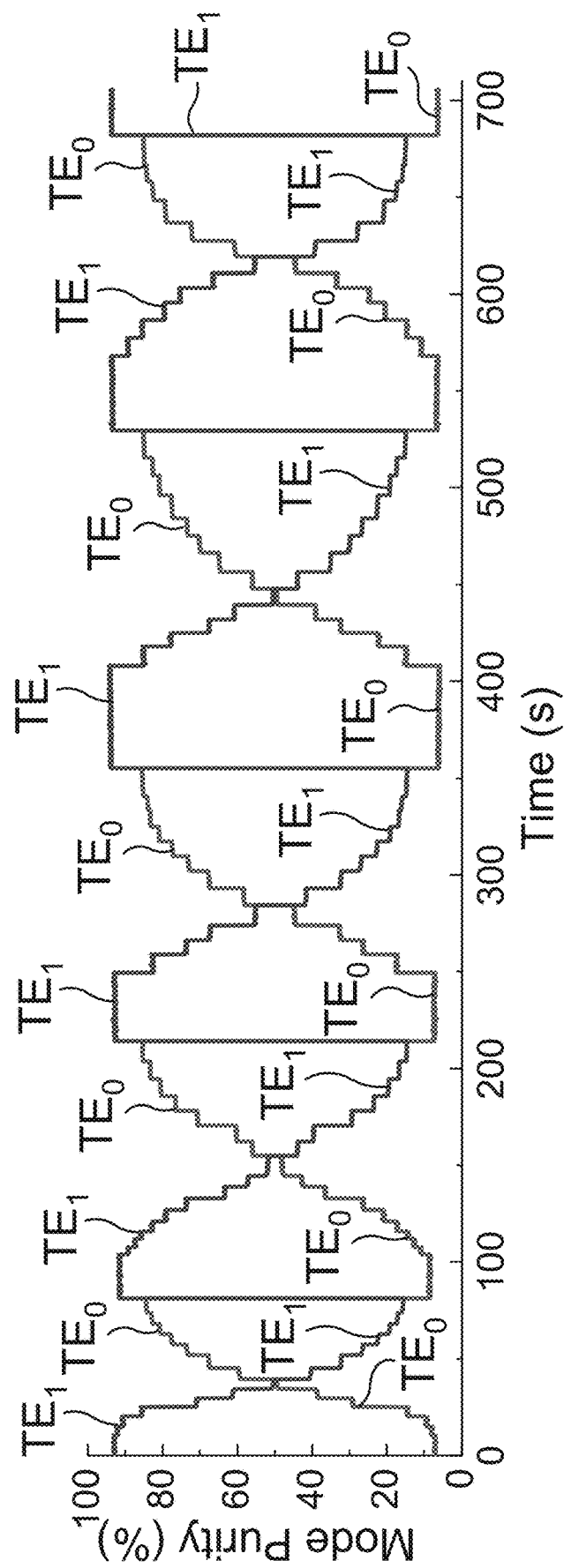
FIG. 16A illustrates five programming cycles of setting and resetting the PMMC, showing the PMMC has an excellent repeatability, in accordance with an embodiment of the present disclosure.

FIG. 16B shows the programming operation of the PMMC during quench the GST to achieve 88 distinguishable levels in the mode purity. FIG. 16C shows the corresponding mode contrast calculated from the mode purity data in FIG. 16B. We start with the fully crystalline phase of the GST and progressively quenching GST metasurface toward the aGST phase until the whole metasurface becomes fully amorphous. Each step is achieved by sending into the waveguide a 50 ns duration laser pulse with a gradually increase pulse energy from 43 pJ to 381 pJ. A 500 ns duration pulse with lower pulse energy instead can reset the GST to the fully crystalline phase so the device can be re-programmed. Since the nano-antenna array is offset from the center axis of the waveguide, we use controlling pulses in the $TE_1$ mode rather than in $TE_0$ mode to achieve sufficient coupling and thus heating of the GST. Besides high-resolution programmability, the subwavelength patterning the GST nano-antennas, as well as the conformal encapsulation with the $Al_2O_3$ protection layer, also significantly facilitates achieving the complete phase transition, prevents film deformation and improves the endurance. FIG. 16A shows five operation cycles, demonstrating that the setting and resetting operations are repeatable and stable.

Example 8: Repeatability and Endurance Test

We perform testing on the devices' programming repeatability and endurance. The number of programming cycles the device can endure can be affected by two practical factors: 1) the atomic diffusion in the material, and 2) The reflowing, deforming and even ablation of the GST film when the photonic device is programmed. For 30 nm thick GST film we used in this work, the previous estimated up limit due to the material atomic diffusion is larger than $10^5$ cycles[11]. We previously also demonstrated that after sub-wavelength patterning and conformal encapsulating the GST with a capping layer (ALD alumina), reflowing and deforming of GST film could be avoided.

Figure 17B:
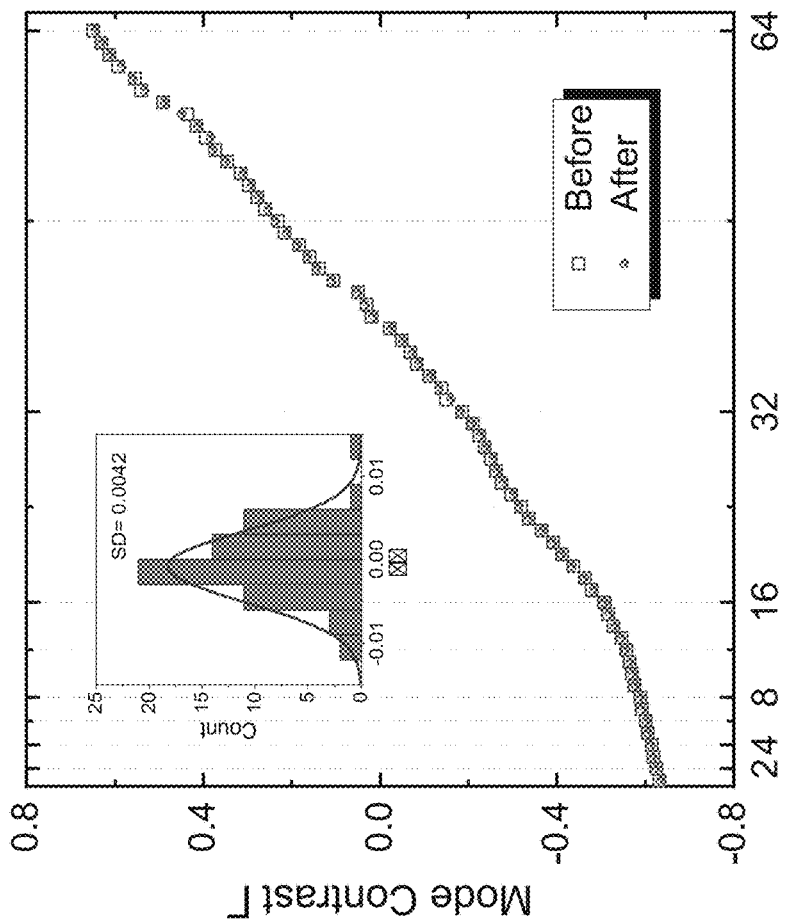
FIG. 17B illustrates 64 level of mode contrast before and after the 1000 cycles shown in the FIG. 17A, where the standard deviation of variation in contrast throughout all 64 levels is only 0.0042, according to an embodiment of the present disclosure.
Figure 17A:
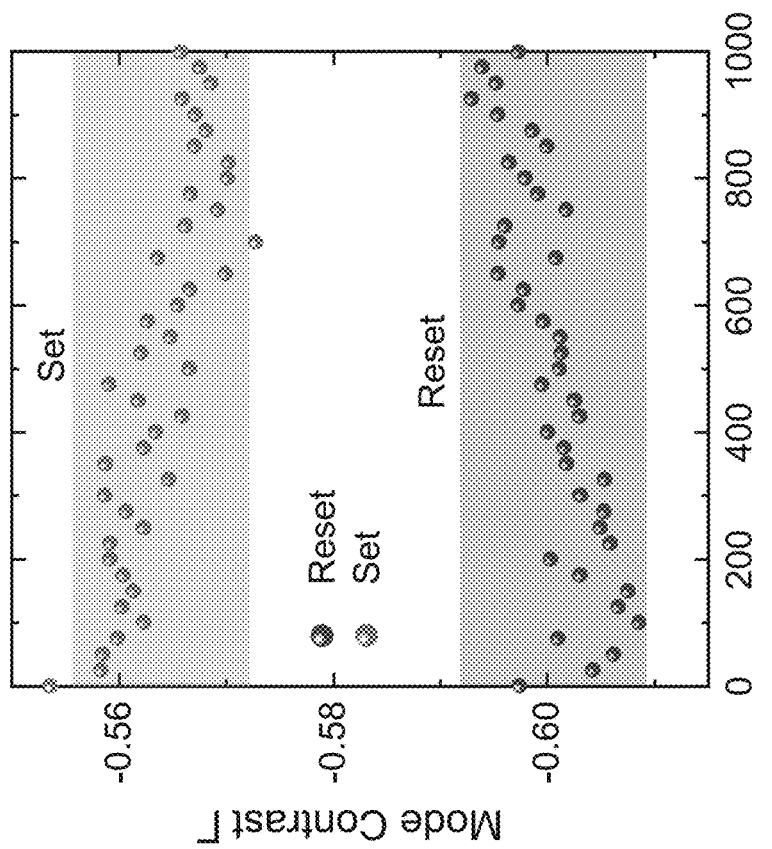
FIG. 17A illustrates 1,000 set/reset programming cycles of a PMMC, according to an embodiment of the present disclosure, between level 1 and 12, showing only a drift <2% in mode contrast, in accordance with an embodiment of the present disclosure.

To demonstrate the endurance of our device, we performed 1000 set/reset cycles of programming of our devices between two arbitrary levels: 1 and 12. see FIG. 17A. The measured mode contrast is plotted in FIG. 17B, which shows no evidence of degradation. The slow drift of <2% is mainly due to the drift of our measurement instruments, such as the alignment between the fiber array and the chip. The stability of the device could be future confirmed by comparing the 64 levels of the mode contrast before and after the 1000 cycles. The demonstrated number of cycles is already 10 times more than previously reported in similar photonic devices. All the 64 levels are repeated with negligible changes after 1000 cycles. The standard deviation (SD) throughout all 64 levels is only 0.0042.

Example 9: Optical Convolutional Neural Network Using PMMCS

Encoding 8-Bit Grayscale Image in the Optical Signal

Figures 18A, 18B:
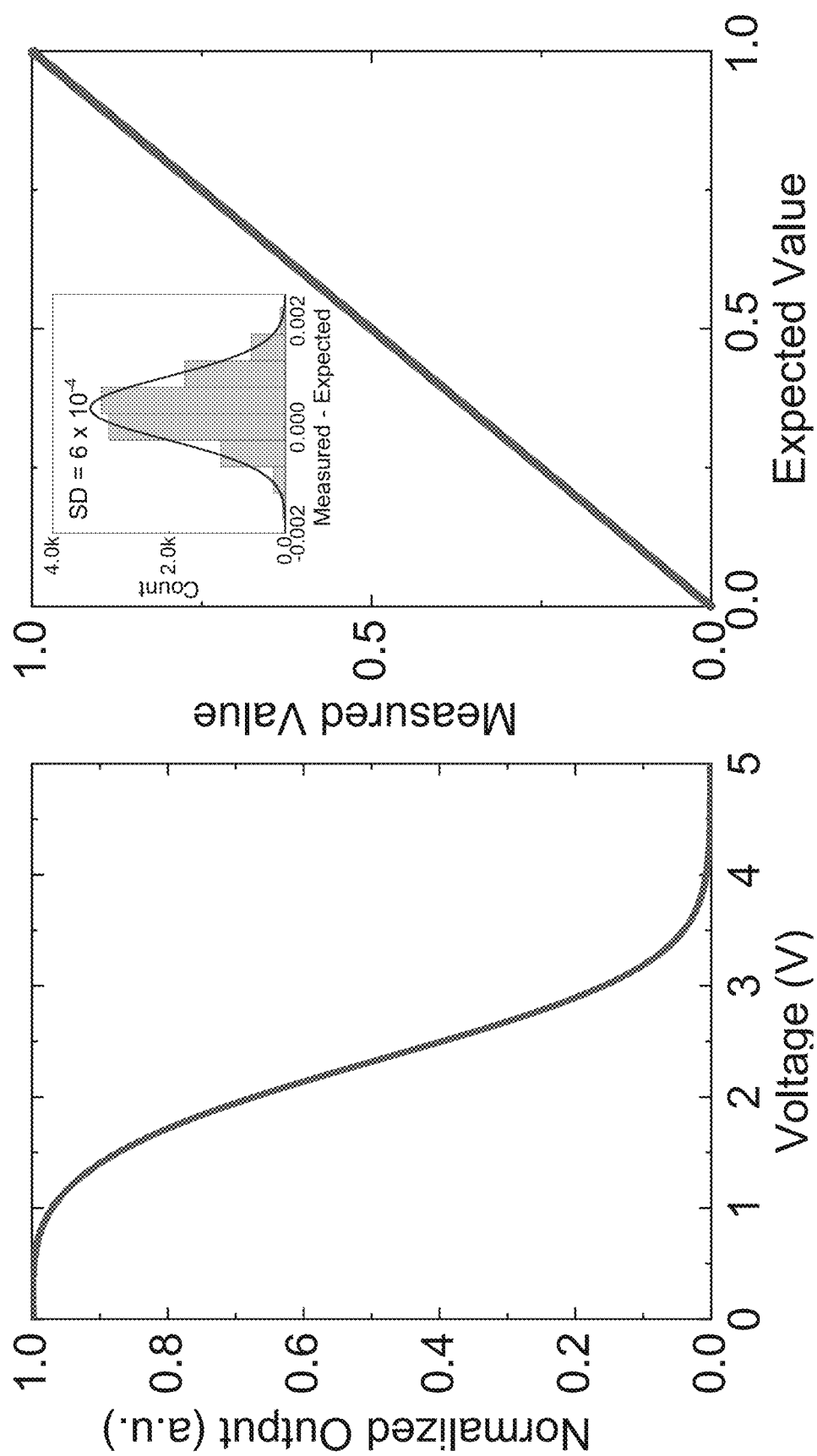
FIG. 18A illustrates a calibration of the normalized transmission of the EVOA as a function of the input voltage, in accordance with an embodiment of the present disclosure.
FIG. 18B illustrates 10,000 randomly generated integer numbers in [0.255] are normalized and input as a voltage [0-5] V to the EVOA, where the EVOA output is measured and plotted after normalization versus the input value, the inset showing the histogram, and the standard deviation is only $6 \times 10^{-4}$, according to an embodiment of the present disclosure.
Figure 18C:
FIG. 18C provides an original image.
Figure 18D:
FIG. 18D is a replotted image that formed from encoded optical signals sent into the photonic network, according to an embodiment of the present disclosure, where the image of FIG. 18C recovered from the transmitted optical signal through the network, which shows no apparent deviation from the original image, according to an embodiment of the present disclosure.

The first step to perform imaging processing tasks such as edge detection and pattern recognition is to encode the image from 8-bit grayscale into the input optical signal. The 8-bit grayscale data for each pixel, represented by a decimal number between 0 and 255, is first normalized to a value in the range of [0,1]. Experimentally, this value is represented by the transmission coefficient of an optical pulse controlled by an electrical variable optical attenuator (EVOA), with no transmitted power denoting "0" (black) and maximum transmitted power denoting "1" (white). The pixel data of the image encoded in such a way in sent into the PMMCs network in a time sequence of optical pulses. FIG. 18A shows the calibration result of the EVOA, which controls the attenuation (or transmission) of the laser pulses with an analog voltage between 0 and 5V. To test the stability and accuracy of this process, we generated 10000 random greyscale numbers with a computer and encoded them in the above process. We measured the encoded optical pulses and compared them with the expected result, as shown in FIG. 18B. The EVOA is operated at 1 KHz. The measured result is accurate and stable compare to the expected value, and the standard deviation we calculated from the histogram is only $6 \times 10^{-4}$. FIGS. 18C and 18D show the original image we chose to process and the image we recover from the encode optical signal we sent into our network. One can hardly see any difference between these two images, demonstrating that the optical encoding process of a greyscale image is of high fidelity.

Programming the PMMC Matrix Elements

Figure 19A:
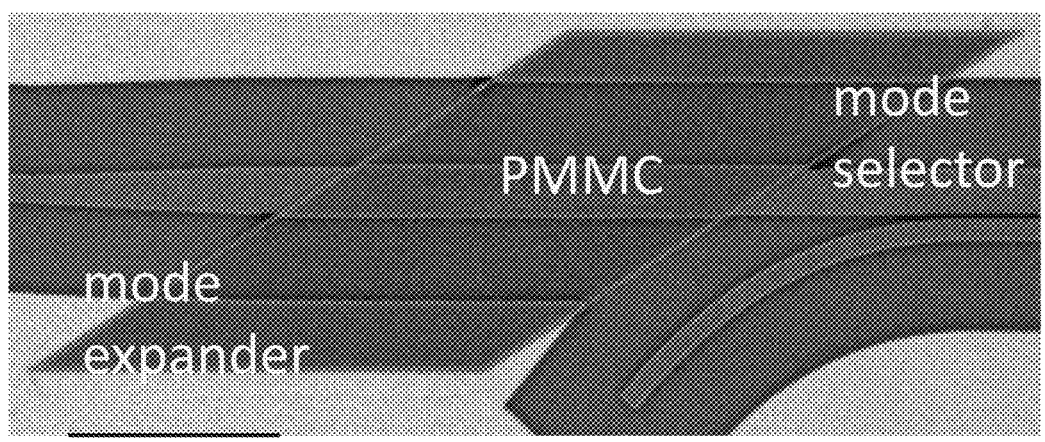
FIG. 19A is a scanning electron microscopy (SEM) image of a PMMC device, according to an embodiment of the present disclosure.
Figure 19B:
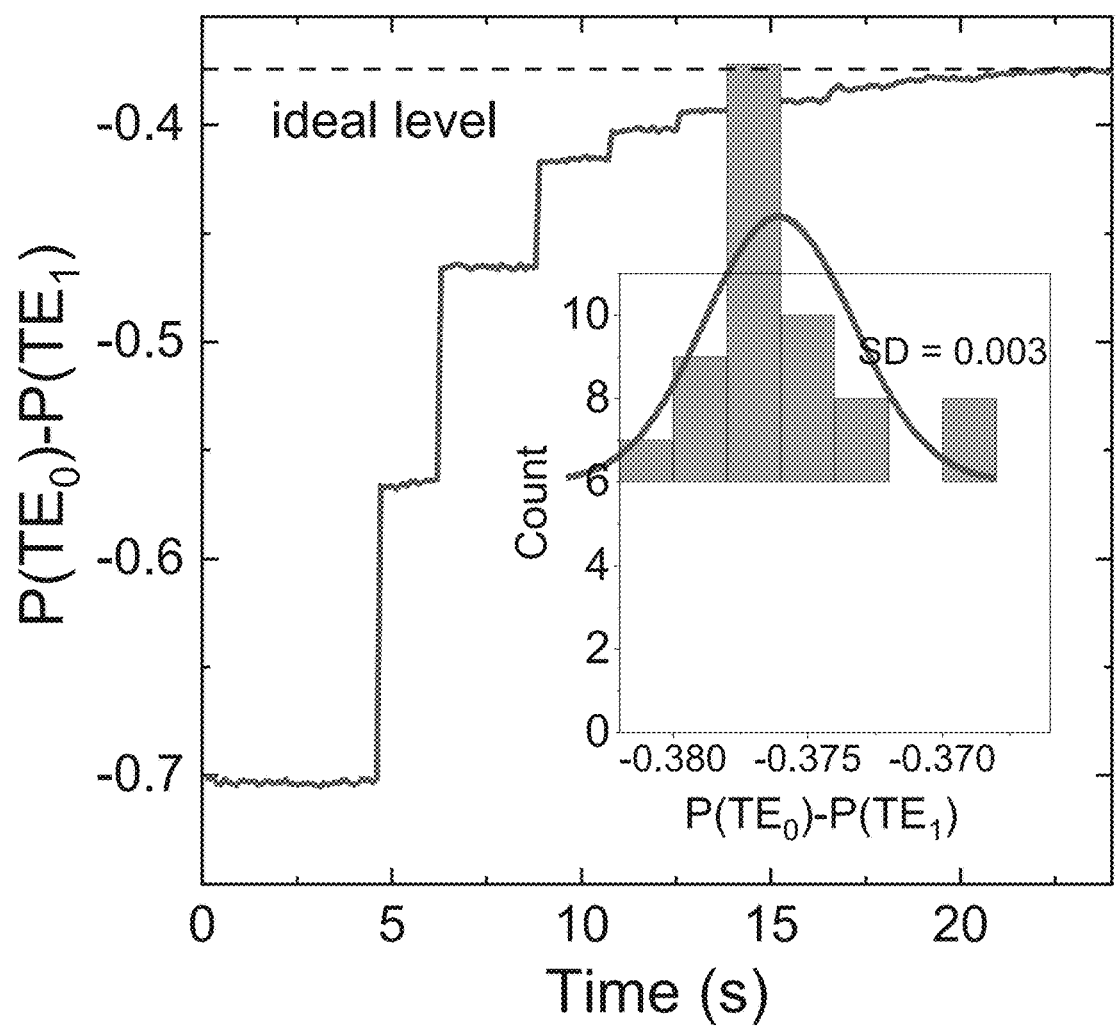
FIG. 19B illustrates a typical programming process, according to an embodiment of the present disclosure, to set the mode contrast $\Gamma$ to value −0.375, where the inset shows a histogram of programming error calculated from repeatedly setting the kernel element to the desired value, where N=22 and the standard deviation is 0.003, according to an embodiment of the present disclosure.
Figure 19C:
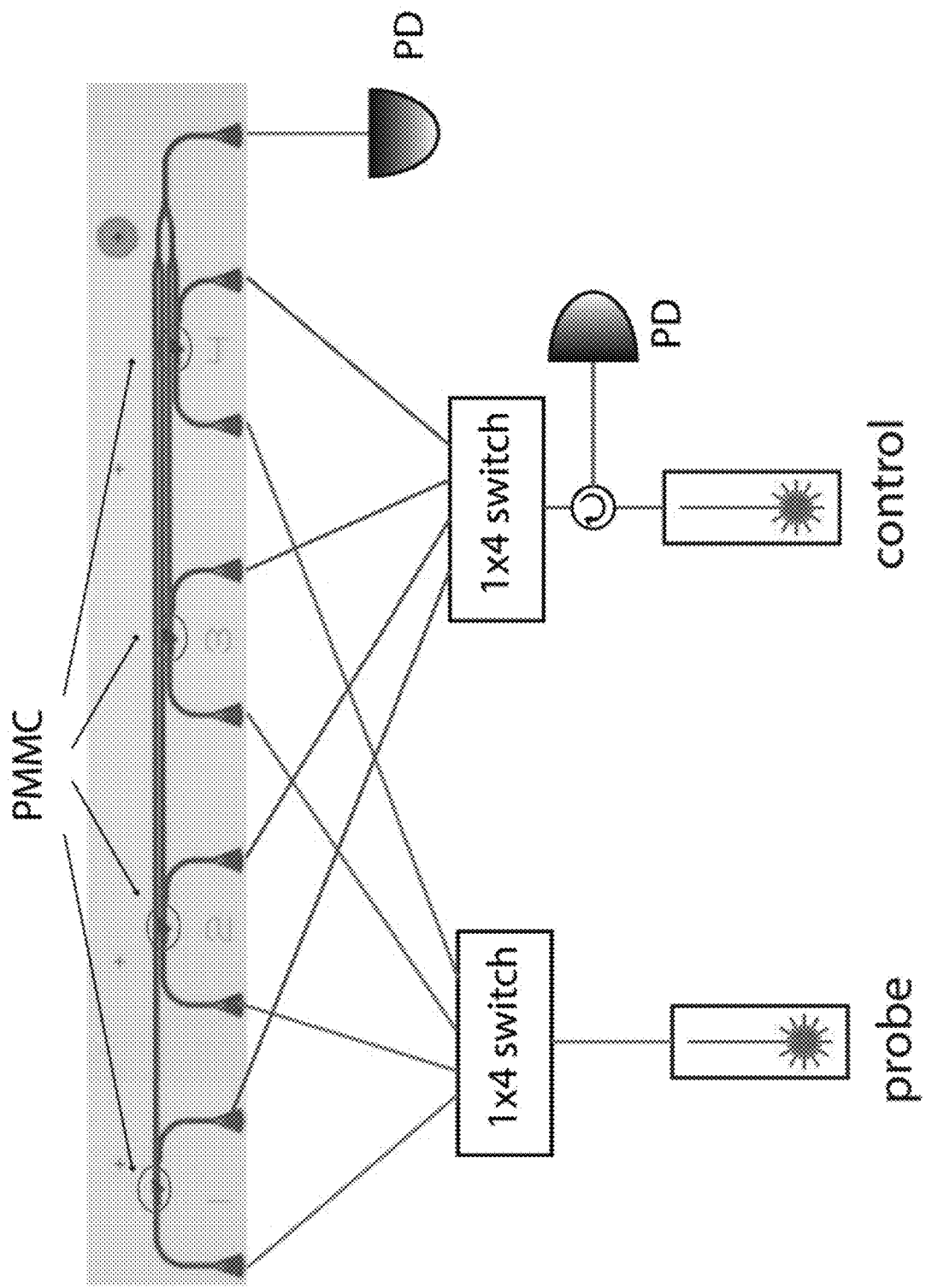
FIG. 19C schematically illustrates a photonic computing system, according to an embodiment of the present disclosure, suitable to program 2×2 kernel elements.

The next step to perform optical computing with the PMMC array is to store kernel matrices in it. A schematic of our set up for programming the PMMCs is shown in FIG. 19C with FIG. 19A providing a scanning electron microscopy (SEM) image of a PMMC device. By choosing the corresponding control and probe ports, we selectively program each PMMC individually with the corresponding matrix element. The transmitted $TE_1$ and $TE_0$ mode power is measured using two photodetectors to confirm the programmed value.

The mode contrast $\Gamma=(P_{TE0}-P_{TE1})/(P_{TE0}+P_{TE1})$, is used as the programming parameter. FIG. 19B demonstrates how we set the kernel element. To set Γ to the desired level (−0.6 in this demonstration), instead of programming with 6-bit precision all the way, we first program "coarsely" using optical pulses with high energy to quickly approach the set level. We then program "finely" using optical pulses with smaller energy. Benefit from the stability and the high precision of the PMMC, the contrast will be set to the desired value precisely, as demonstrated in FIG. 19B. Besides, the PMMC is re-programmable by resetting it using a 500 ns long reset pulse. We here set Γ to the desired value (−0.375) for 22 times continuously, the programming errors are plotted as a histogram shown in the inset. The standard deviation for our setting is only 0.003, indicating our setting process is accurate and repeatable.

Without loss of generality, we describe the kernel setting procedure as following:
first, we determined the input optical power level that represents "white" pixels. Second, we calibrate all PMMCs and determine a scaling factor for each PMMC that compensates for the fabrication fluctuations and fiber alignment variations to equalize their output. This scaling factor is characteristic of each PMMC and, once calibrated, is never changed and used in all the following measurements and operations. Third, we set the kernel matrices to their ideal value of Γ after equalization as the programming parameters. The third step is repeated if the kernel matrices need to be reprogrammed.

Edge Detection Demonstration

The perform the edge detection algorithm, we use the PMMC array photonic core to compute a discrete first-order derivative between adjacent pixels. This corresponds to a convolution operation with the kernel matrix of $$\begin{bmatrix} 1 & 1 \\ -1 & -1 \end{bmatrix}$$

to highlighting the horizontal edges and $$\begin{bmatrix} -1 & 1 \\ -1 & 1 \end{bmatrix}$$

for highlighting the vertical edges.

Table 2 The ideal value and experimental value of each element of the kernel matrix used to detect the (a) horizontal edge and (b) vertical edge.

We follow the procedure described further herein and set the kernel matrix. Once the scaling factors are calibrated and the trained kernel matrix elements are programmed, the input 256×256 8 bits grayscale cameraman image is then reorganized into patches and sent into the kernel in the time sequence. We calculate the output voltage difference

Figure 20D:
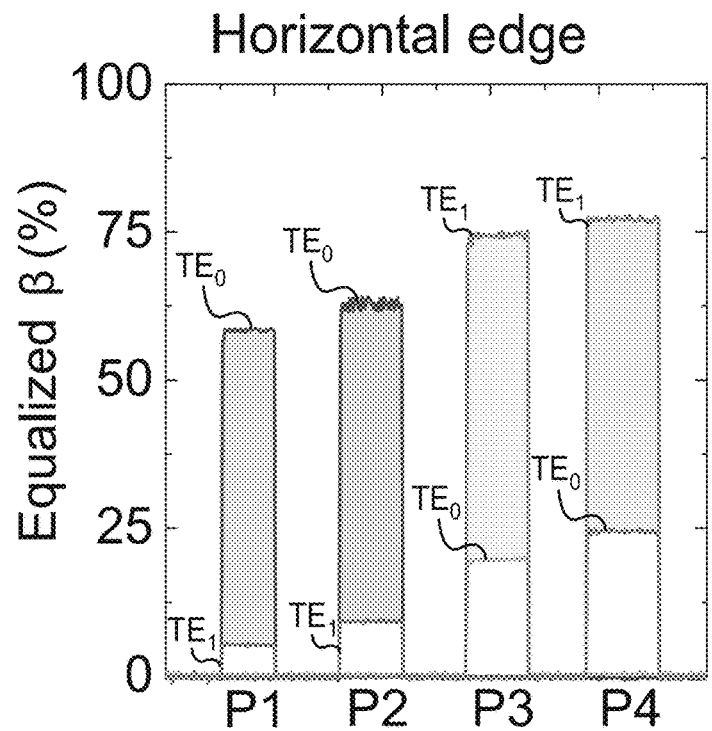
FIGS. 20D and 20E illustrate the equalized $TE_0$ mode and $TE_1$ mode purities, where their differences, i.e. mode contrast, correspond to the 2×2 convolutional kernel, in accordance with an embodiment of the present disclosure.
Figure 20E:
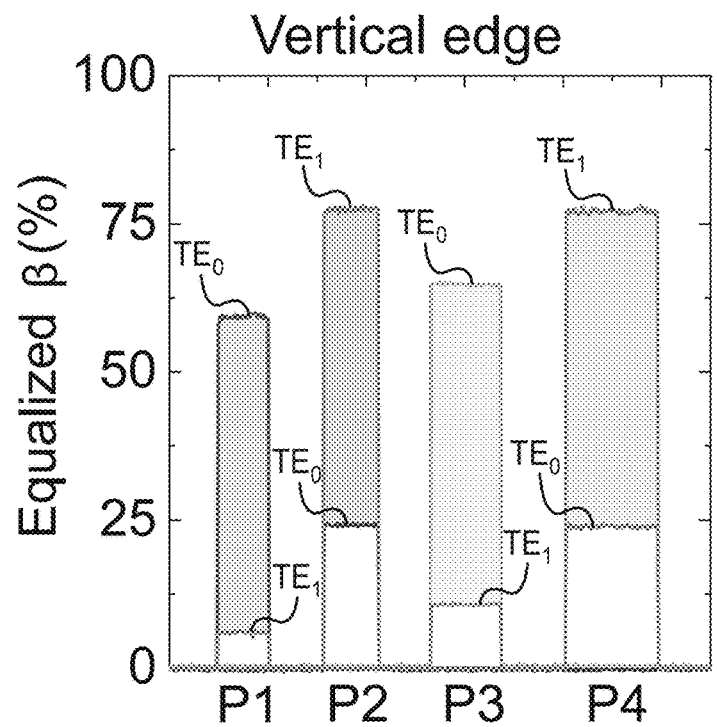

|    | Equalized $\beta_{TE0}$ (%) | Equalized $\beta_{TE1}$ (%) | Equalized Γ | Rescale |
|----|---|---|---|---|
| (a) Horizontal edge | | | | |
| $K_x(\text{Ideal}) = \begin{bmatrix} -1 & -1 \\ +1 & +1 \end{bmatrix} = \begin{bmatrix} P1 & P2 \\ P3 & P4 \end{bmatrix}$ | | | | |
| P1 | 5.21 | 57.25 | −0.520 | −0.984 |
| P2 | 9.15 | 61.72 | −0.526 | −1 |
| P3 | 72.43 | 19.15 | 0.533 | 1 |
| P4 | 75.94 | 24.06 | 0.519 | 0.963 |
| (b) Vertical edge | | | | |
| $K_y(\text{Ideal}) = \begin{bmatrix} -1 & +1 \\ -1 & +1 \end{bmatrix} = \begin{bmatrix} P1 & P2 \\ P3 & P4 \end{bmatrix}$ | | | | |
| P1 | 5.89 | 58.18 | −0.520 | −0.989 |
| P2 | 76.17 | 23.75 | −0.526 | 0.993 |
| P3 | 10.57 | 63.92 | 0.533 | −1 |
| P4 | 76.34 | 23.66 | 0.519 | 1 | between the photodetectors at each time frame and normalize the kernel matrix element from [−0.7,0.7] to [−1,1]. The result is also a series of positive and negative numbers in time sequence, which can be recovered to a 255×255 image. This image highlights the silhouettes of the objects with sharp edges while suppresses smooth backgrounds. FIGS. 20A-20C show the images after convolution processing to detect the horizontal, vertical and edges along with both directions. FIGS. 20D and 20E illustrate the equalized $TE_0$ mode and $TE_1$ mode purities, where their differences, i.e. mode contrast, correspond to the 2×2 convolutional kernel. We compare the output images measured using the photonic convolution approach with computer calculated ones, which show an excellent agreement.

Training the Convolutional Neural Network to Recognize Number Images

Figure 21A:
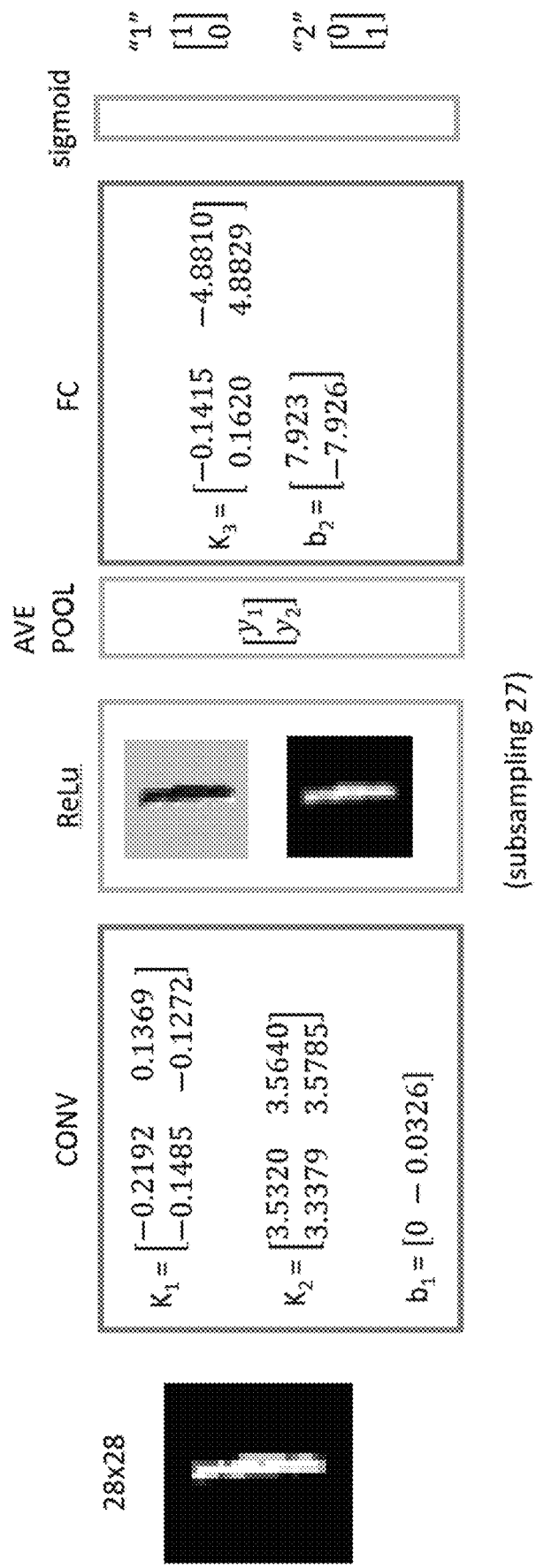
FIG. 21A illustrates a schematic of the CNN configuration showing all the bias and matrices values after training, in accordance with an embodiment of the present disclosure.
Figure 21B:
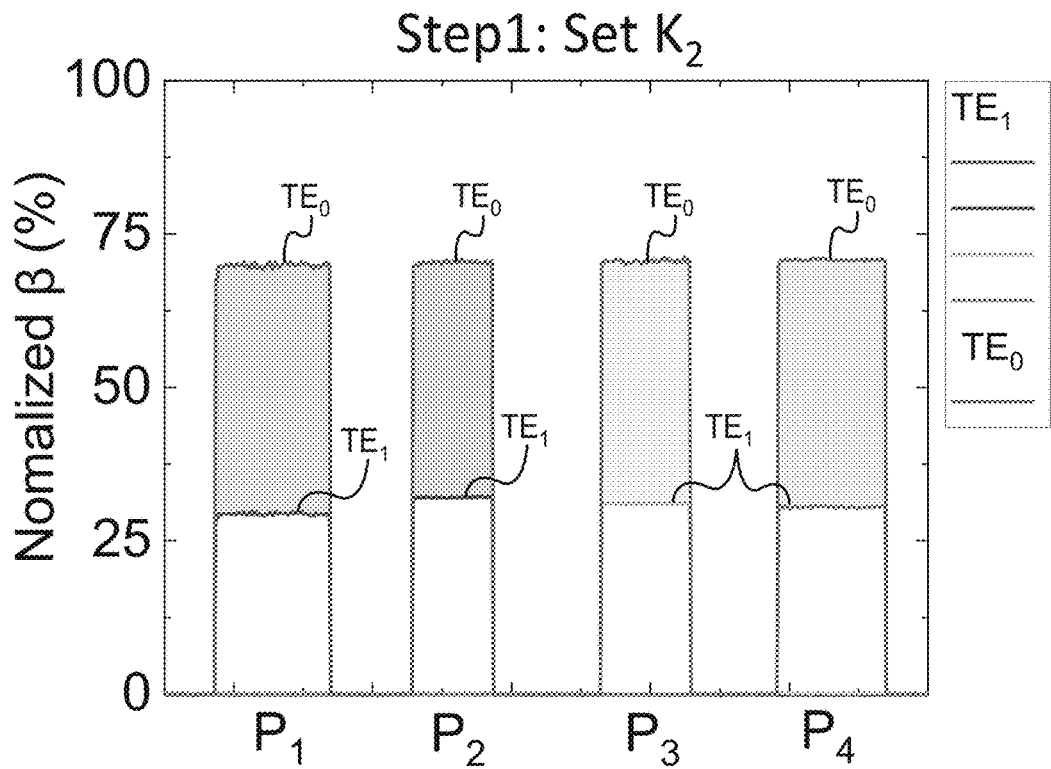
FIGS. 21B-21D illustrate the equalized $TE_0$ mode and $TE_1$ mode purity of 4 PMMCs respectively, where each element in the 2×2 convolutional kernel $K_2$, $K_3$, and the 2×2 weight bank $K_3$ is encoded in a PMMC as the equalized mode contrast, in accordance with an embodiment of the present disclosure.
Figure 21C:
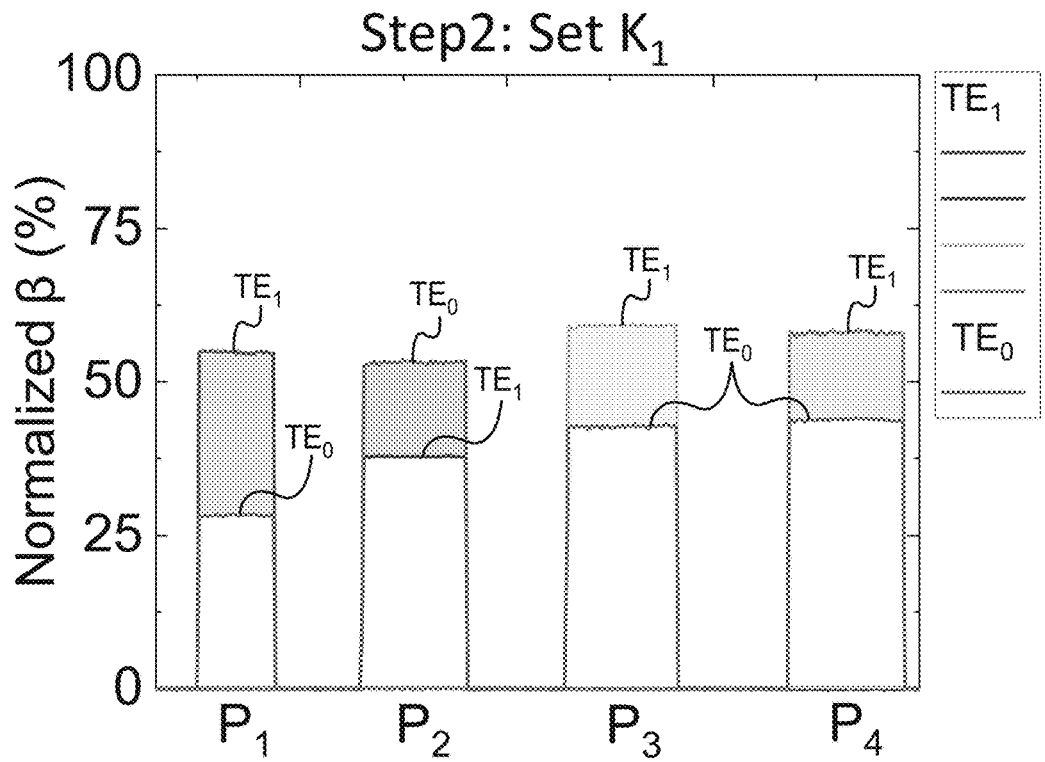
Figure 21D:
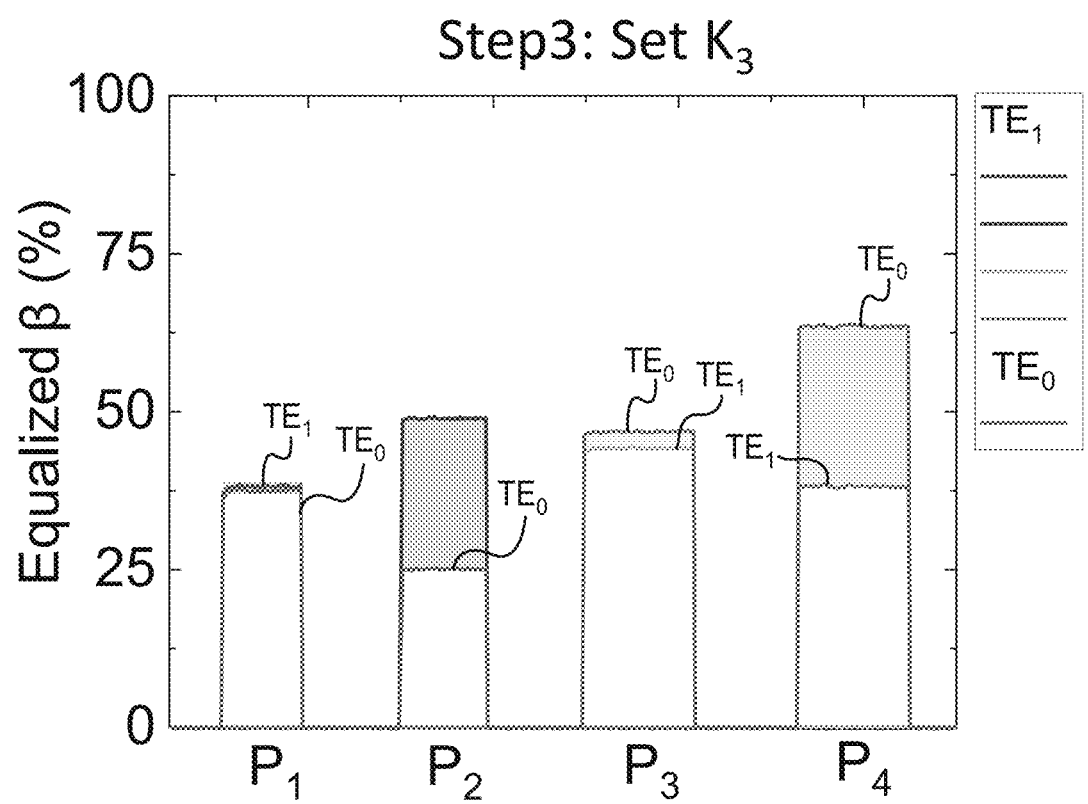

We build and train the convolutional neural network with a standard back-propagation algorithm using the gradient descent method. The network architecture includes of an input layer, a convolutional layer, an average pooling layer, a fully connected layer, and an output layer. The training code is built based on an open-access MATLAB package. When training the network, the learning rate is 0.01, the cost function is the mean square cost function. The training set includes of 11000 images of the handwritten number "1" or "2" from the MNIST database. The epoch number for our training is 200, and the batch size is 20. The training determines the values of all matrices element and bias as shown in FIG. 21A. FIGS. 21B-21D illustrate the equalized $TE_0$ mode and $TE_1$ mode purity of 4 PMMCs respectively, where each element in the 2×2 convolutional kernel $K_2$, $K_3$, and the 2×2 weight bank $K_3$ is encoded in a PMMC as the equalized mode contrast.

Experimentally, we sequentially reuse the PMMC array in both convolution and fully connected layers to demonstrate the corresponding OCNN. We emphasize here that after the network is calibrated, only the kernel matrix can be programmed and reprogrammed while other parameters such as the gain factors of the photodetectors are fixed. We set the kernel matrix following the procedure described in further herein. We start by setting the $K_2$ then $K_1$ matrix. A hundred randomly chosen handwritten images of "1" and "2" are encoded as the input signal and convolves with the kernel matrices. After the convolution process, post-processing is performed to the output electrical signal to add bias and apply nonlinear function and pooling. The resultant output is reorganized as 100 2×1 vectors in total and multiplied with the 2×2 weight bank $K_3$, which is programmed in the PMMC array. In some of the processes described above, rescaling is performed to equalize the transmission difference of different channels. The final result is 100 2×1 vectors, with the first element gives the score for the class "1" while the second element gives the score for the class "2". If the first element is larger than the second element, we identify the image as number "1", otherwise, we identified it as "2". We test 100 randomly chosen "1" or "2" images from the MNIST testing image database Our OCNN correctly identified 91 out of 100 cases (9% error rate), which is consistent with the result of a computer (10% error rate). The slight difference is mainly caused by the small deviation of the experimentally programmed values from the ideal ones due to the system's conditions drift during operation.

Table 3 The ideal value and experimental value of each element of the kernel matrices $K_1$, $K_2$ and weight bank $K_3$ in the OCNN.

|  | Equalized $\beta_{TE0}$ (%) | Equalized $\beta_{TE1}$ (%) | Equalized $\Gamma$ | Rescale |
|---|---|---|---|---|
| (a) Step 1 Setting ||||
| $K_2(\text{Ideal}) = \begin{bmatrix} 3.5320 & 3.5640 \\ 3.3379 & 3.5785 \end{bmatrix}$ ||||
| P1 | 68.98 | 28.98 | 0.400 | 3.60 |
| P2 | 69.13 | 31.50 | 0.376 | 3.38 |
| P3 | 69.44 | 30.56 | 0.389 | 3.50 |
| P4 | 69.83 | 30.09 | 0.397 | 3.57 |
| (b) Step 2 Setting ||||
| $K_1(\text{Ideal}) = \begin{bmatrix} -0.2192 & 0.1369 \\ -0.1485 & -0.1272 \end{bmatrix}$ ||||
| P1 | 27.55 | 53.36 | −0.258 | −0.231 |
| P2 | 52.13 | 37.05 | 0.151 | 0.135 |
| P3 | 41.90 | 58.08 | −0.162 | −0.145 |
| P4 | 43.02 | 56.98 | −0.140 | −0.125 |
| (c) Step 3 Setting ||||
| $K_3(\text{Ideal}) = \begin{bmatrix} -0.1415 & -4.8810 \\ 0.1620 & 4.8829 \end{bmatrix}$ ||||
| P1 | 32.88 | 33.46 | −0.006 | −0.122 |
| P2 | 24.53 | 47.90 | −0.234 | 4.739 |
| P3 | 46.05 | 43.45 | 0.026 | 0.526 |
| P4 | 62.47 | 37.53 | 0.249 | 5.04 |

Example 10: The Perspective of Scalability-Crossbar Array Architecture

Work Principle of the Crossbar Array

Figure 22:
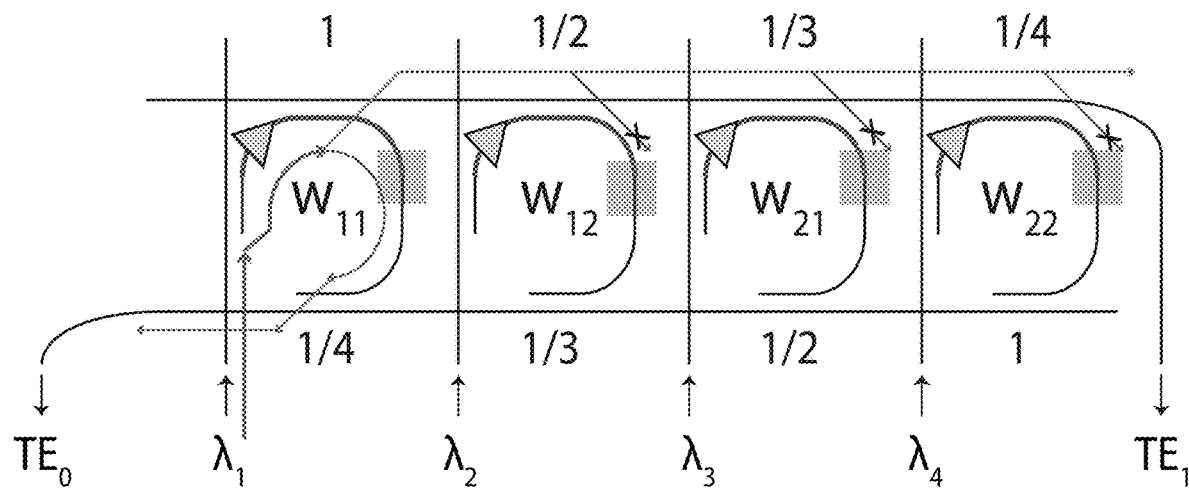
FIG. 22 schematically illustrates a photonic crossbar array architecture, according to an embodiment of the present disclosure, used to perform optical convolution operation with a 2×2 kernel matrix, where the arrows denote the detailed optical path for the first input channel (λ1) and the cross-coupling ratios for each mode selector and mode expander are labeled, respectively.

We have demonstrated an OCNN and perform proof-of-concept imaging recognition tasks of distinguishing handwritten numbers "1" and "2" from the MNIST database using the prototype device (See FIG. 3 or FIG. 11). The network architecture is shown in FIG. 3 can be scaled up using a crossbar array architecture as shown in FIG. 22.

All the $TE_1$ output from each of the 4 units are combined incoherently in the top horizontal waveguide and summed at the output. Likewise, all the $TE_0$ output are combined in the lower horizontal waveguide and summed. It is thus important that the output from each unit is combined with the same weight. This is achieved by the arrangement of the directional couplers between each unit and the bus waveguide. We elaborate the steps below:

The input $TE_0$ mode in the first channel with wavelength $\lambda_1$ passes through the $1^{st}$ unit of PMMC, which corresponds to the kernel element $w_{11}$, and is partially converted to $TE_1$ mode based on the value of $w_{11}$. So this is doing the part of the multiplication of $x_1 \cdot w_{11}$ (after taking a difference from the $TE_0$ mode). The $TE_1$ mode component couples to the top bus waveguide with a 100% coupling ratio and then passes by the next three units before reaching the output. In the $2^{nd}$ unit with kernel element $w_{12}$, the coupling ratio between the PMMC and the bus waveguide needs to be designed to be ½, so the through port efficiency of the bus waveguide is also ½. For the $3^{rd}$ unit with kernel element $w_{13}$, the PMMC to bus coupling efficiency should be ⅓ and the through port efficiency of the bus is ⅔. Finally, in the $4^{th}$ unit, the two coupling ratios should be ¼ and ¾, respectively. Therefore, the overall collective efficiency of the $TE_1$ mode output from the $1^{st}$ unit will be 1×½×⅔×¾=¼. Similarly, the overall collective efficiency of the $TE_1$ mode output from the $2^{nd}$ unit will be ½×⅔×¾=¼. For the $3^{rd}$ and $4^{th}$ units, the overall efficiency will be the same. The collective efficiencies for the $TE_0$ mode power from each unit to the bottom bus waveguide are designed in the same way to be ¼. These coupling efficiencies are denoted in the figure above. Also note that the $TE_1$ light left in multimode waveguide will be filtered out by the mode expander (the green box) so will not be collected by the lower bus waveguide. More details about the mode expander performance can be found further herein.

Mapping Convolutions to Photonic Mac Operations

Figure 23:
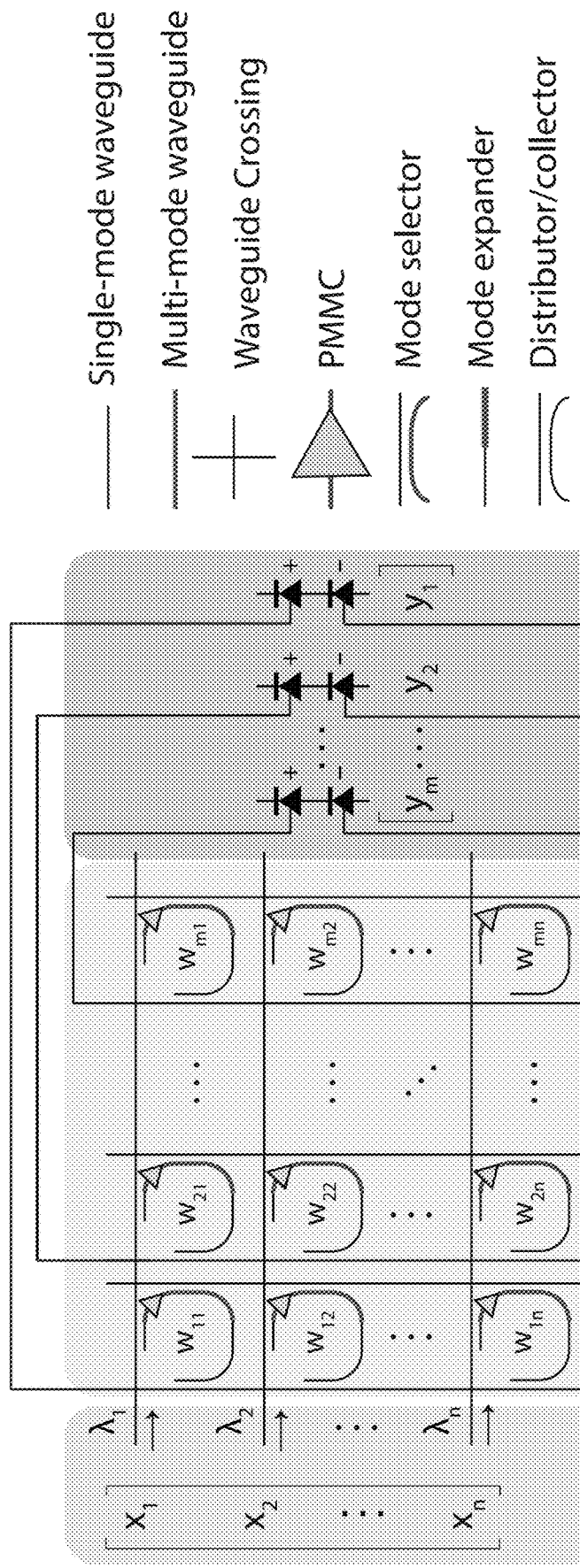
FIG. 23 schematically illustrates a large photonic crossbar array, according to an embodiment of the present disclosure, used to perform MVM operation, where the horizontal and vertical waveguides separate the network into m×n subunits.

To further scale up our system to realize large convolution kernels in parallel, a photonic crossbar array architecture as sketched in FIG. 23 can be used. The photonic crossbar array can perform a general MVM operation: y=w·x, where x=$[x_1, x_2, \ldots, x_n]^T$ is the input vector, the w is the m×n matrix represents m convolutional kernel matrices in parallel y=$[y_1, y_2, \ldots, y_m]^T$ is the output vector. The horizontal and vertical single-mode waveguide separates the whole structure into m×n subunits. The input vector x is encoded through a group of wavelengths $[\lambda_1, \lambda_2, \ldots, \lambda_n]$, with the value of each element $x_i$ represented by the input power, and sent into n horizontal bus waveguides. Directional coupler based power distributor is used to distribute the power carried by bus waveguide evenly into m subunits. These m subunits in a row of the crossbar array correspond to a column in the matrix w. The 2 m vertical single-mode waveguides are used as power collectors to collect the light after leaving each PMMC. The $TE_0$ and $TE_1$ lights collected and summed from the same row in the matrix w (the same column in the crossbar array) will be grouped in pairs and measured with balanced photodetectors to determine the contrast. Both the photonic convolution and the MVM operations are based on the photonic MAC operations, the m convolution kernels with the dimensions of $\sqrt{n} \times \sqrt{n}$, thus, can be mapped to the w matrix. The operation volume can be further extended through the wavelength-division multiplexing (WDM) method. For example, if g groups of the wavelength are implemented parallelly into the crossbar network with n wavelength per group, the numbers of the MAC operation performed can increase by g times, g×m×n MAC operations or g×m convolutions can be applied in parallel.

The Limiting Factors of Scalability and Comparison with the State-of-the-Art Commercial Microprocessors The insertion loss that is for the $TE_1$ mode when the GST is in cGST phase ($TE_1$ mode at aGST phase and $TE_0$ mode at cGST mode is supposed to be suppressed). As shown in FIG. 2D, this insertion loss (green triangle symbols) of our PMMC device is ~7 dB in the measured wavelength range. Although lower this insertion loss is beneficial to scaling, it is not the bottleneck for a crossbar array architecture that is commonly used. This is because the optical signal in each channel only passes one PMMC once to perform the multiplication: $w_{ij} \cdot x_i$. Rather, in a large network, the optical power loss will be dominated by the directional couplers. To equalize the output from n units, the directional couplers that are used to collect the output from each unit to the bus waveguide need to be designed to achieve a 1/n weight for each unit. Therefore, when n>5, this loss will be larger than the 7 dB insertion loss of the PMMC.

With these numbers, we can estimate what is a crossbar array size limited by the optical loss, assuming no optical amplifiers are used to boost up the power. If we assume the input optical power for a single wavelength channel is at a moderate level of 10 mW (10 dBm), and a 10 GHz bandwidth photoreceiver with noise-equivalent power of 10 pW/$\sqrt{Hz}$ (e.g. RXM10AF from Thorlabs) is used. So 40 dB total insertion loss is allowed. This means n can be as large as 2000, considering 7 dB loss of a PMMC (40−7 dB=33 dB, approximately ½₀₀₀). This is already a very large network, corresponding to a kernel matrix of ~45×45, or 45 5×9 kernel matrices in parallel. To go beyond this size limitation imposed by device insertion loss, optical amplifiers will need to be inserted in the network. It is possible to integrate semiconductor optical amplifiers (SOA) in the photonic network. The amplifiers, however, will increase the noise figure and negatively impact the accuracy of the network.

The photonic crossbar array architecture with WDM can fully utilize the intrinsic parallelism of photonic systems. We can estimate and compare the expected computation performance, including speed (Tera-Operations per second (TOPS)), operation power, clocks, MAC sizes, computing density, energy efficiency (TOPs/W), of the PNN with commercial GPUs commonly used in as accelerators for neural network-based AI applications.

We assume an array size of 32×32, an operation speed of 10 Gbits/see in data rate, and 16 wavelengths used in WDM. All of these values are quite moderate compared with the state-of-the-art optical communication technology. Since our PMMC device is very compact, its footprint (including the mode selector) is only 80×20 µm², a 32×32 array will an area of less than 2 mm². With 10 Gbit/sec operation frequency and 16 wavelengths, the network's computation speed will be 10 G/sec×16×32×32=164 TOPS. Its areal computing density will thus be 82 TOPS/mm². As shown in the Table 4, these values compare very favorably with the current digital computing technology for neural networks, such as GPUs and TPUs. In terms of computation density (TOPS/mm²), the photonic architecture is 800× higher than GPUs, 60× higher than TPUs, and 20× higher than the emerging memristor processors.

and causes a phase shift Ø, which depends on its geometry (e.g., width), as well as the refractive index of its material (FIG. 2B). A linear array of such nano-antennas with tapering widths thus produces a spatial gradient of the scattering phases dΦ/dx, which is equivalent to a wavevector $k_g$. If the phase-gradient metasurface is designed such that $k_g$ matches the wavevector difference between two spatial modes of the waveguide: $K_{mode1} - k_{mode2}$, it satisfies the phase-matching condition and facilitates the conversion between the two modes. Such phase-gradient metasurfaces for waveguide mode conversion realized with noble metals or dielectrics materials thus lacked tunability. Here, we use GST, which has a large change in its optical properties when a phase transition happens. When the GST is in the amorphous phase (aGST), its refractive index n is ~4.7 (representative value in the literature, the same hereafter). In contrast, when it is turned to the crystalline phase (cGST), n increases to ~7.5 with a drastic change of 2.8 over the whole measured spectral range from 1540 nm to 1580 nm (See FIGURE SA for more detailed information). This change will significantly modify the scattered phase of each GST nano-antenna (FIG. 2B) so as to modify the metasurface's function. FIG. 1C plots the simulated phase of the scattered fields inside the waveguide by a single nano-antenna of 30-nm-thick GST as a function of its width and for aGST and cGST phases. Since cGST has a much larger n, the scattered phase shows a much stronger dependence on the width than the aGST phase. By controlling the geometry of the GST nano-antennas and the interval between adjacent ones in the array, a well-defined phase gradient dΦ/dx is established. The entire metasurface includes of an array of 25 nano-antennas with tapering widths from 510 nm to 84 nm (shaded region in FIG. 1C) and is patterned on a SiN waveguide 1.8 µm wide and 330 nm thick. The waveguide supports two transverse-electric modes: the fundamental $TE_0$ mode and the first-order $TE_1$ mode. We design the metasurface, in the cGST phase, to have a uniform d=2.5° for every dx=400 nm to satisfy the generalized phase-matching condition, $k_0(n_{TE0} - N_{TE1}) = N \cdot d\Phi/dx$, where $k_0$ is the free-space wavevector, $n_{TE0}$ and $n_{TE1}$ are the effective index of the $TE_0$ and $TE_1$ modes, respectively, and N is the number of interactions between the guided modes and the metasurface. The cGST metasurface thus can efficiently convert the $TE_0$ mode to the $TE_1$ mode,

TABLE 4

Comparison of the projected performance parameters of a photonic CNN with the commercial electronic processors.

| Processor | Format | TOPS | Clock [GHz] | MAC Size | MAC Area (estimated) [mm²] | TOPS/mm² |
|---|---|---|---|---|---|---|
| Nvidia GPU P40 | INT 8 | 48 | 1.3 GHz | — | 471 | 0.1 |
| Nvidia GPU V100 | INT 8 | 62.8 | 1.3 GHz | — | 815 | 0.08 |
| Google TPU | INT 8 | 90 | 700 MHz | 256 × 256 | 72 | 1.25 |
| IBM (Memristor) | INT 8 | 1.4 | 4.2 MHz | 512 × 512 | 0.4 | 3.6 |
| Photonic CNN (16-λ) | INT 6 | 164 | 10 GHz | 32 × 32 | 2 | 82 |

Example 11: Discussion High-Precision Programmable Phase-Change Mode Converter

Figure 1D:
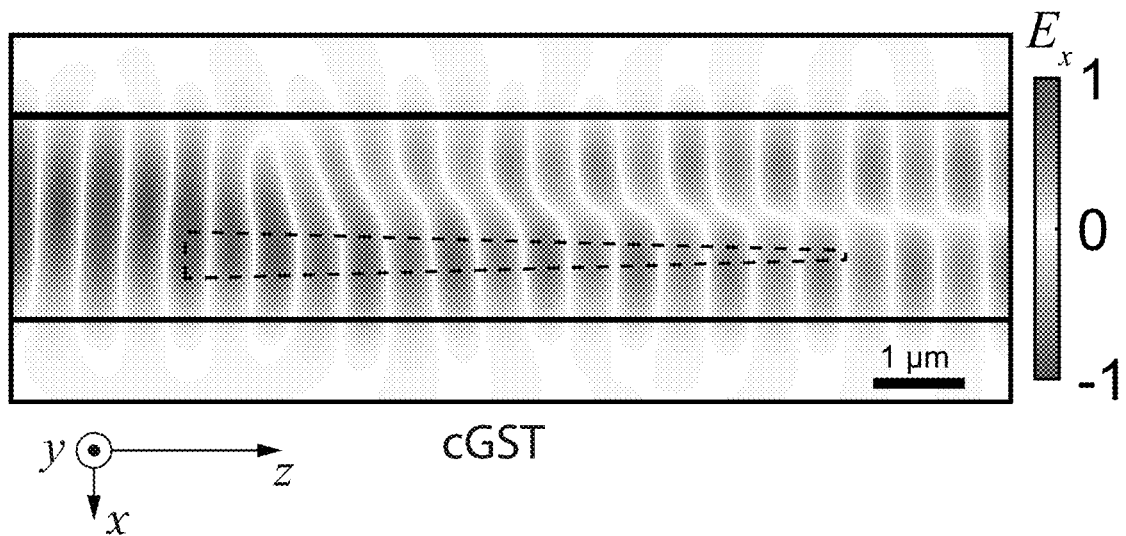
FIGS. 1D and 1E show FDTD simulation results showing effective mode conversion from the $TE_0$ mode to the $TE_1$ mode when the phase-change metasurface waveguide mode converter of FIG. 1A is in crystalline phase (1D), but only a small perturbation when the phase-change metasurface is in amorphous phase (1E)
Figure 1E:
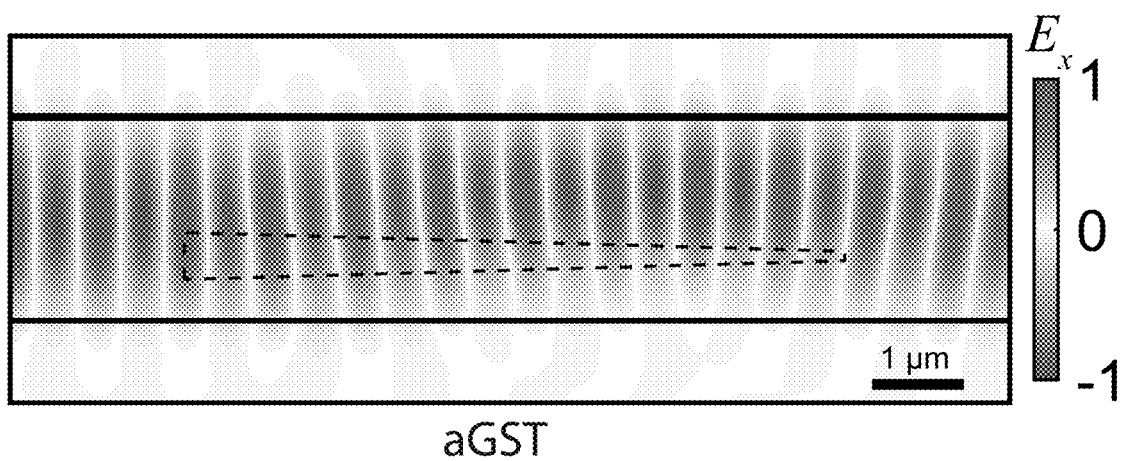

The design of the PMMC is based on the principle of a phase-gradient metasurface but replacing noble metals with phase-change materials. FIG. 1A shows a 3D schematic of the design, which includes of a linear array of GST nano antennas directly integrated on a silicon nitride (SiN) waveguide. Each GST nano-antenna scatters the waveguide mode as shown by the finite-domain finite-time (FDTD) simulation result in FIG. 1D. When the GST is transitioned to the aGST phase, as shown in FIG. 1C, the dΦ/dx is much reduced and thus insufficient for the phase-matching condition so that mode conversion between $TE_0$ and $TE_1$ modes does not occur, which is clearly seen in FIG. 1E. Therefore, the GST phase-gradient metasurface, as designed here, functions as a programmable waveguide mode converter controlled by the tunable material phase of the GST.

Figure 2E:
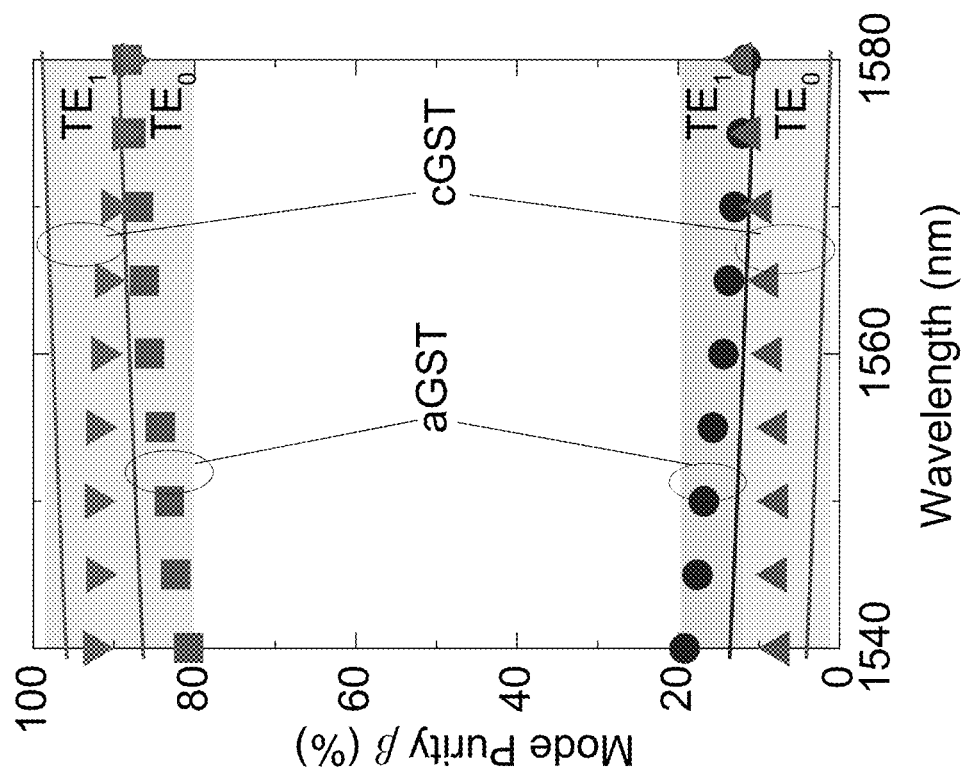
FIG. 2E illustrates how mode purity is controlled by the phase-change metasurface waveguide mode converter to >80% for both modes, in accordance with an embodiment of the present disclosure.
Figure 2D:
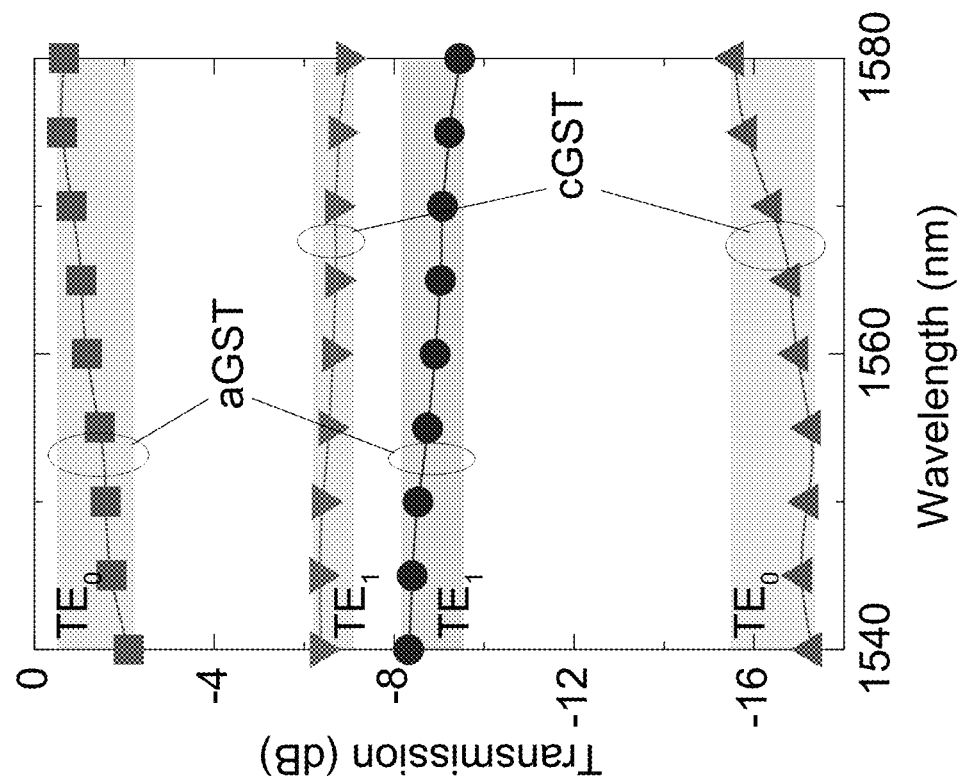
FIG. 2D illustrates the transmission coefficient (insertion loss) of the photonic computing system of FIG. 2A for $TE_0$ and $TE_1$ modes and amorphous and crystalline phases, where the transmission for the $TE_0$ mode is switched with a high extinction ratio >16 dB or 4000%, in accordance in an embodiment of the present disclosure.

FIGS. 2A-2C shows the scanning electron microscope images of the complete PMMC device. The 30 nm thick GST film is deposited by sputtering on $Si_3N_4$ on an oxided silicon substrate. It is then patterned into metasurface with electron beam lithography and plasma etching, and conformally encapsulated with a 218 nm thick layer of $Al_2O_3$ deposited by atomic layer deposition. The photonic circuits of $Si_3N_4$, including multimode waveguides, directional couplers and grating couplers, are then patterned with standard processes. A pair of asymmetric directional couplers (FIG. 2C) is designed to function as mode selectors to selectively couple only the $TE_1$ mode component in the multimode waveguide with the $TE_0$ mode component in the single-mode waveguide. FIG. 2A depicts the measurement and control scheme. To program the PMMC, we use optical pulses to control the phase of the GST film for simplicity. Previously, electrical control using integrated micro-heaters has been previously demonstrated by a number of groups, including us. When operating the PMMC, an optical signal is input in the $TE_0$ mode to the PMMC and converted to $TE_1$ mode with a proportion controlled by the state of the GST metasurface. At the output of the PMMC, the $TE_1$ component is separated by the mode selector and coupled out at the second port while the $TE_0$ component remains in and outputs from the multimode waveguide. The output powers of both modes are then measured to determine their respective transmission coefficients. FIG. 2D shows the transmission spectrum of the PMMC when the metasurface is set to be either in fully aGST or cGST phases. The insertion losses of the input and output fibers and grating couplers have been accounted for by calibration measurements. In the aGST phase, the device is in the on-state for the $TE_0$ mode with a high transmission $T^{on}$ over a broad wavelength range (1540 to 1580 nm). The lowest insertion loss is 0.9 dB at 1575 nm wavelength. A small portion (<-10 dB) of the $TE_1$ mode is generated due to the asymmetric perturbation induced by the metasurface even though the aGST phase has a low refractive index. The situation changes dramatically when the metasurface is transitioned to the cGST phase and converts the $TE_0$ mode to the $TE_1$ mode effectively. In this off-state for the $TE_0$ mode, its transmission $T^{off}$ is lower than −15 dB over the entire measured bandwidth. The corresponding switching extinction ratio, defined as $\Delta T/T^{off}=(T^{on}-T^{off})/T^{off}$, is ~16 dB or 4000%, which is more than 10-fold improvement compared to previously reported switch devices using GST. This large switching ratio stems from the phase engineering approach to effectively use GST's large refractive index change during its phase-transition, as opposed to only using the absorption coefficient change, to facilitate scattering into a different mode that is filtered. The total area of the GST in the metasurface is only 1.3 μm², significantly smaller than that in prior devices, and thus in principle, our device consumes less energy to switch. As expected from energy conservation, the $TE_1$ mode is switched in the opposite way to the $TE_0$ mode. From aGST to cGST phase, the $TE_1$ transmission increases from ~−10 dB to ~−6.5 dB, with the insertion loss due to cGST's absorption. Another important parameter to quantify a mode converter's performance is the mode purity in the multimode waveguide, defined as $\beta_{TE0}$ (TE1)=$P_{TE0(TE1)}/(P_{TE0}+P_{TE1})$, where $P_{TE0}$ ($P_{TE1}$) is the power in the $TE_0$ ($TE_1$) mode. The PMMC shows very high performance in controlling mode purity. As shown in FIG. 2E, when switching the GST from aGST to cGST phase, the PMMC efficiently converts $TE_0$ mode to $TE_1$ mode, changing the mode purity from $\beta_{TE0}>80\%$ to $\beta_{TE1}>85\%$ over a broad bandwidth, showing an excellent agreement with the numerical simulation results.

PMMC Photonic Kernel.

Figure 2F:
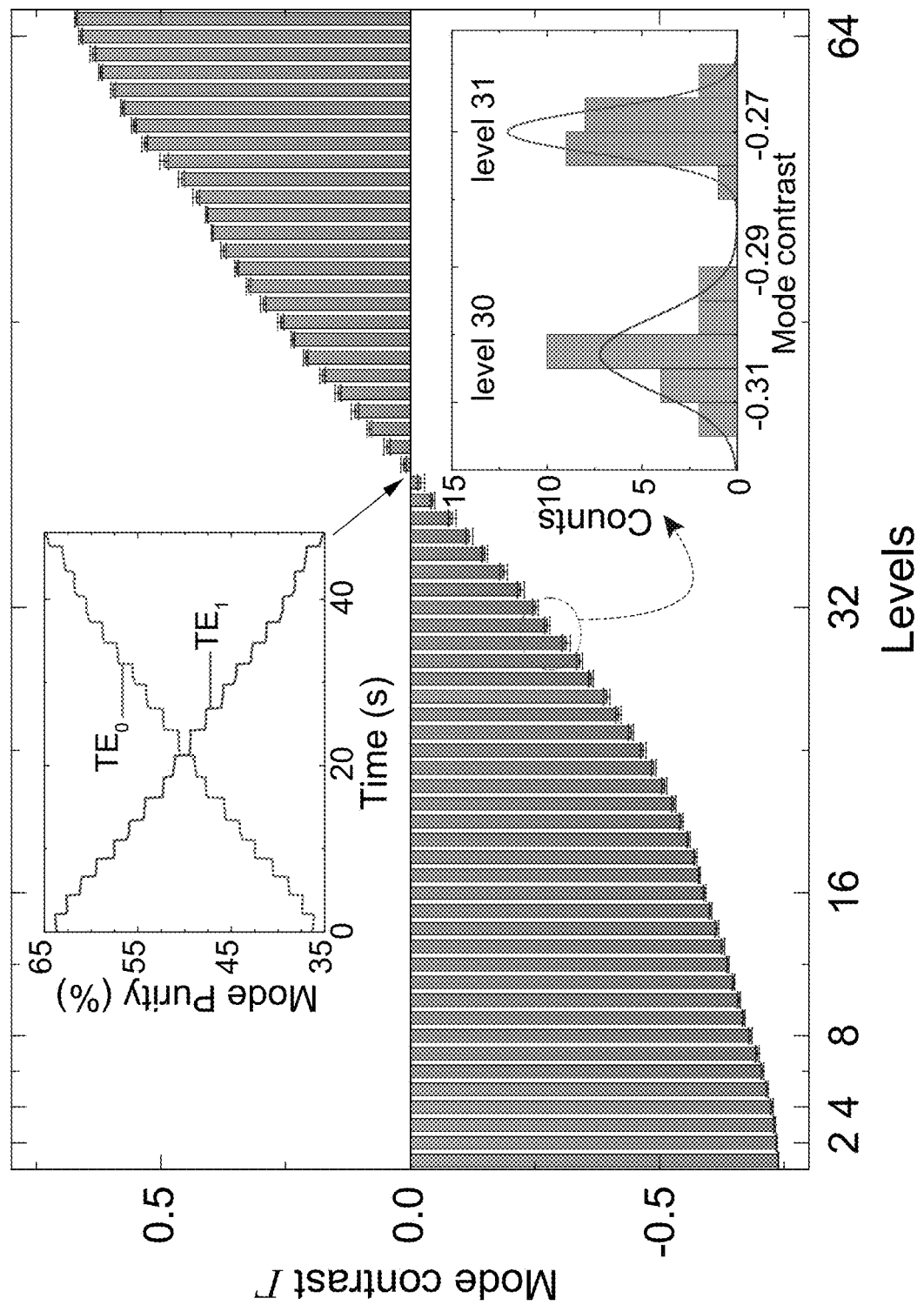
FIG. 2F illustrates mode contrast, Γ, at 64 distinct levels, corresponding 6-bit programming resolution, where the upper inset provides a zoomed-in view of the contrast levels and the lower inset provides histograms of 20 programming operations to set the contrast two adjacent levels (30 and 31), with well-separated histograms demonstrating the programming, repeatability, and accuracy, in accordance with an embodiment of the present disclosure.

The phase composition of the GST in the metasurface can be continuously tuned by partial phase transition so that the PMMC can be continuously programmed to multiple intermediate levels of phase purity values. We program the PMMC with a sequence of 50 ns-long control pulses to "quench" the GST progressively from the fully cGST phase toward the fully aGST phase. As a result, the $TE_1$ mode purity $\beta_{TE1}$ increases stepwise. Since the mode selector separates the two modes, we can measure their power and calculate the difference to determine the mode contrast $\Gamma=\beta_{TE0}-P_{TE1}$, which is used as a programming parameter. FIG. 2F demonstrates the multi-level programmability of the PMMC, in which Γ is sequentially set to 64 distinguishable levels between −0.73 to +0.67 at 1555 nm. Since the theoretical range of Γ is (−1,1), it is an ideal parameter to represent the elements in the matrix w, with both positive and negative values, in multiply-accumulate (MAC) operation: $x \rightarrow x \cdot w+b$, where b is the bias parameter. MAC is the constitutional step of matrix-vector multiplication (MVM) in all neural network algorithms. The PMMC allows storing w by programming Γ' in the GST metasurface as a nonvolatile memory. In-memory MAC computing can be performed with the PMMC by a measurement of the transmitted power when the input data x is encoded in the power of the input optical signal. The lower inset of FIG. 2F shows the histograms of 20 repeated programming operations to set the PMMC mode contrast at two adjacent levels (levels 30 and 31), respectively. The well separated histograms clearly demonstrate the device's programming resolution and accuracy. The demonstrated 64-level programmability of the PMMC—the highest to the best of our knowledge for phase-change photonic devices_ENREF_43-corresponds to 6-bit resolution in setting w, which is critical to the training and inference precision of the neural network.

We harness the PMMC's high-precision programmability and in-memory computing capability to demonstrate an optical convolutional neural network (OCNN). A typical CNN includes of an input layer and an output layer, which are connected by multiple hidden layers in between. The hidden layers usually consist of a series of convolutional layers followed by pooling layers and fully connected layers at the end. We design a prototype optical CNN using a small network of PMMCs to implement patch-kernel matrix multiplication to compute convolution. FIG. 3A illustrates the operation principle of the OCNN for image processing, where an input grayscale image of dimensions n×n is convolved with a kernel of dimensions k×k to compute an activation map of dimension (n−k+1)×(n−k+1), assuming the convolution stride is 1. When operating the OCNN, we group the input image into $(n-k+1)^2$ patches (the shaded area in the upper panel of FIG. 3A) with the same dimensions as the convolution kernel, $k^2$. Each patch corresponds to the receptive field of an element in the activation map accordingly. Thus, a convolution operation requires $(n-k+1)^2 \times k^2$ MAC operations in total, which is a high load of computation and can most benefit from optical computing's speed and energy advantages.

To compute the convolution, $(n-k+1)^2$ patch matrices of the input image are optically fed into the photonic kernel sequentially while the kernel elements, that is, the PMMCs, are programmed to fixed values. At each timeframe of the computation, the corresponding patch matrix is reshaped into a single column of data with the length $k^2$. The data is input into the optical system in $k^2$ channels as sequences of incoherent optical pulses, whose power amplitude is controlled by a variable optical attenuator (VOA) to encode the value of each pixel value $X^{ij}$ in the greyscale image. The corresponding element $W^{ij}$ of the kernel matrix is programmed as the mode contrast $\Gamma$ of each PMMC. The resulting transmitted power of $TE_0$ and $TE_1$ modes are then summed incoherently using two photodetectors. Their difference is calculated electronically and used in post-processing steps. As a result, the output will correspond to a time series of patch-kernel MVM with the amplitude encoding the values of the computation results, which is the activation map of convolution. Since the modal contrast $\Gamma$ of our PMMCs can assume both positive and negative values, it can represent the kernel matrix elements without the need of an additional offset, which otherwise would take additional steps to set in each computation cycle.

Convolutional Edge Detection with PMMC Core.

Figure 3C:
FIG. 3C is a greyscale image used as the input image.
Figure 3F:
FIG. 3F is a combined image of horizontal and vertical edge detection from FIGS. 3D and 3E, highlighting all the sharp edges in the original image, in accordance with an embodiment of the present disclosure.

Experimentally, we build a small-scale, four-channel system with four PMMCs to represent a 2×2 kernel matrix, as shown in the optical images in FIG. 3B. As a demonstration, we perform the convolution of a 256×256 8-bit grayscale image of a cameraman (FIG. 3C) to detect its edge features. As shown in FIG. 3B, the $TE_0$ mode output coming from all the PMMCs is combined using on-chip Y-junctions, while the $TE_1$ mode output power is combined off-chip because the same ports are used to program the PMMCs optically. Because combining four incoherent sources using Y-junctions will inherently reduce the power by a factor of 4, we rescale the measured $TE_0$ mode power by this factor when calculating the power differences between two modes. To detect vertical and horizontal edges, kernel matrices as in the right column of FIGS. 3D and 3E are used, and so are the PMMCs programmed. Take the vertical edge detection for example, the kernel is set to be $$\begin{bmatrix} -1 & 1 \\ -1 & 1 \end{bmatrix}$$

so to compute the discrete first-order derivative, $X_{i+1,j}+X_{i+1,j+1}-X_{i,j}-X_{i,j+1}$, where i, j are the indices of the input image matrix. Each kernel element $W_{ij}$ is stored as the mode contrast value $\Gamma$ in the corresponding PMMC, with $W_{ij}=1$ (−1) corresponds to the fully aGST (cGST) phase. The computed images after convolution without any post-processing are shown in the left column of FIGS. 3D and 3E, for horizontal and vertical edge detection, respectively, which are shown combined in FIG. 3F. The two images are then added to produce the right image in FIG. 3B, which highlights silhouettes of the objects with sharp edges such as the cameraman and the buildings in the original image, while suppressing smooth features such as the sky and the water. The optically computed edge detection image also agrees very well with the calculated result using conventional image processing algorithms (see FIGS. 20A-20E). This result verifies the capacity and fidelity of optical convolution performed with the PMMC-based photonic kernel, which is a prerequisite for an OCNN.

OCNN for Image Recognition.

Figure 4A:
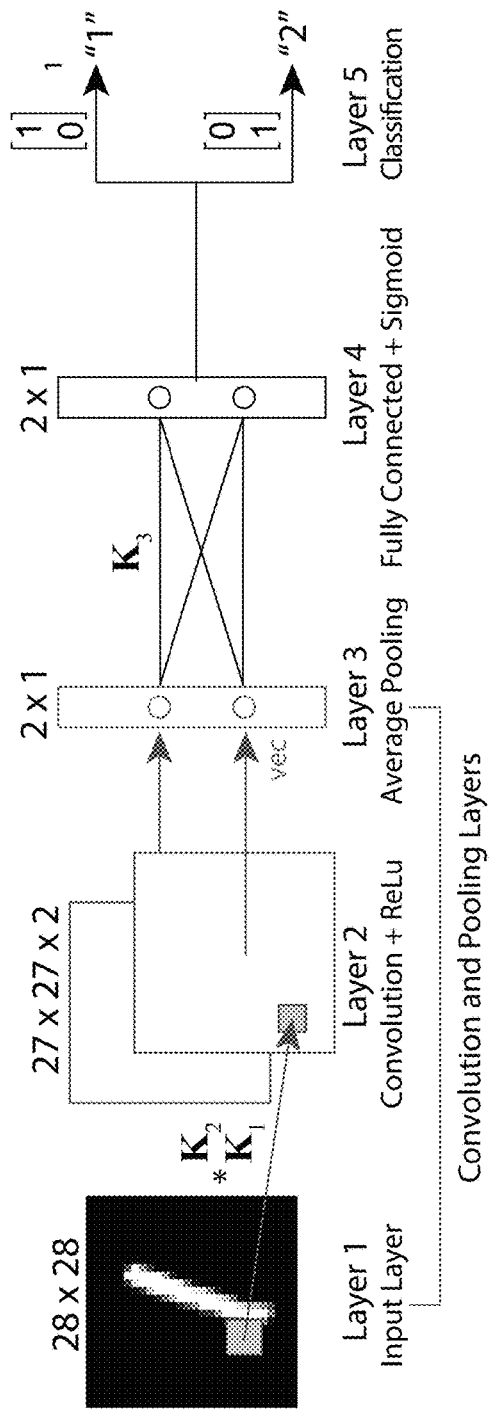
FIG. 4A schematically illustrates building an optical convolutional neural network (CNN) for imaging recognition including an operation procedure of using the optical CNN to recognize handwriting numbers from the MNIST database, where the optical CNN includes a convolution layer with two kernels, a pooling and a fully connected layer, and the output gives the answer whether the input image is "1" or "2," in accordance with an embodiment of the present disclosure.

Beyond the convolution layer, the MAC computation performed with optical signals and the PMMC network can also be applied to the pooling (average pooling) and fully connected layers, where the PMMCs are used as weight banks instead, to realize a complete OCNN. In our experiment, we sequentially reuse the PMMC array in both convolution and fully connected layers to demonstrate an OCNN and perform proof-of-concept imaging recognition tasks of distinguishing handwritten numbers "1" and "2" from the MNIST database. FIG. 4A illustrates the architecture and processes of the OCNN. The 28×28 pixels, 8-bit grayscale images of number "1" or "2" are fed into the input layer as optical signals. The data is then convolved with two 2×2 photonic kernels $K_1$ and $K_2$ to generate two 27×27 images of activation maps. After adding a bias $b_1$ and applying the nonlinear ReLu function, the output images are sent to an average pooling layer with a subsampling factor of 27, which reduces the images a 2×1 vector. This vector is then fed into the fully connected layer with a 2×2 photonic weight bank $K_3$ programmed in the PMMC array, added with a bias $b_2$ and applied the standard sigmoid function. The final output is a vector that gives the identified class of the input image, that is, $[1\ 0]^T$ corresponds to the number "1" and $[0\ 1]^T$ corresponds to the number "2". In this OCNN, the MVM computations such as the convolution and the fully connected layers are all performed optically with the PMMCs, whereas bias and nonlinear functions are realized electronically.

Figure 4B:
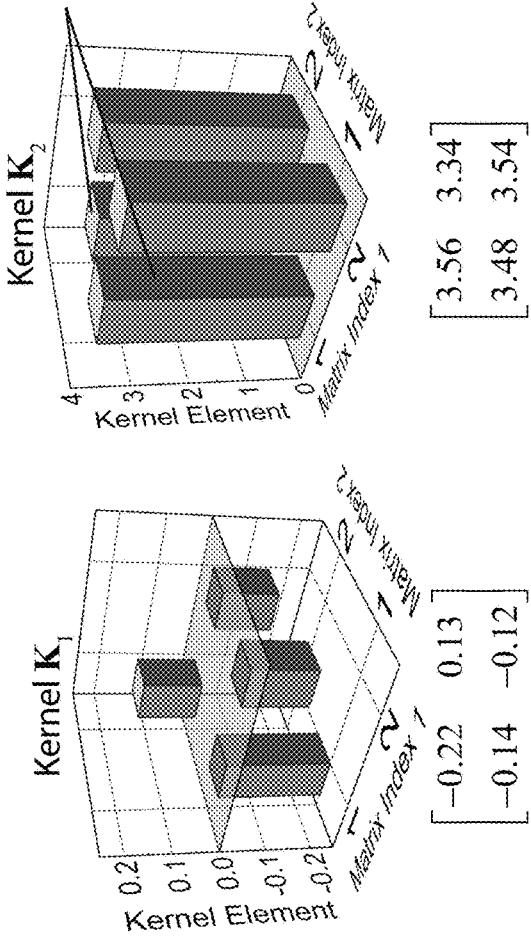
FIG. 4B illustrates the convolution kernel matrices $K_1$ and $K_2$ generated by training the CNN, in accordance with an embodiment of the present disclosure.

Before using the OCNN, we first train all the parameters in the layers with the standard back-propagation algorithm using the gradient descent method. The training set includes of 11000 images of the handwritten number "1" or "2" from MNIST training images. The training yields values for each element in the convolutional kernels and the weight bank, as shown in FIGS. 4B and 4D. We then program the PMMC array to represent these elements. In FIG. 4C, we show the raw data of the convolutional activation maps encoded in time series of optical signals, which is the output from the PMMC array after the input image convolves with the photonic kernel $K_1$ and $K_2$. Since each photonic processing layer results in electrical signals output from the photodetectors, electronic post-processing is performed to add bias and apply nonlinear function and pooling. The resultant data is re-coded into optical signals and fed to the next photonic layer. We evaluate the system's performance after training on a recognition test set, which includes of 100 randomly chosen "1" or "2" images (55 number "1" and 45 number "2") from the MNIST testing image database. FIG. 4E shows the result that our OCNN correctly identified 91 out of 100 cases (9% error rate), which compares squarely with the result of a computer (10% error rate). The slight difference is mainly caused by the small deviation of the experimentally programmed values in the matrices ($K_1$, $K_2$ and $K_3$) from the trained values, which occurs when the system's conditions drift during operation. This result successfully demonstrates the OCNN's viability and accuracy in performing standard neural network algorithms.

We have demonstrated a compact programmable waveguide mode converter using GST-based phase-gradient metasurface with high programming resolution, efficiency and broadband operation. We have built a photonic kernel based on an array of such PMMC devices and implemented an optical convolutional neural network to perform image processing and recognition tasks. Our results show that phase-change photonic devices, such as the PMMC demonstrated here, can enable robust and flexible programmability and realize a plethora of unique optical functionalities that are scalable for large-scale optical computing and neuromorphic photonics. Although optical computation in this work is performed at a low speed of ~1 kHz by using low-speed VOAs to encode data into optical signals, state-of-the-art integrated photonic transmitters and photodetectors can drive the system at a speed of many 10 s of Gbits/sec. Using wavelength division multiplexing (WDM) can further increase the number of parallel computation. The 2×2 array prototype system demonstrated in this work performs optical computation incoherently in a broadband. It can be scaled up toward a large network using a photonic crossbar array architecture, and compares favorably with other photonic computing schemes using coherent methods or optical resonators. The feasible size (n×m) of such crossbar arrays will not be limited by the insertion loss of the PMMC (~7 dB for $TE_1$ mode, FIG. 2D); rather it will be limited by the directional couplers with coupling efficiency of 1/n, as is needed to equally combine signals from n units. Scaling up to a large network thus faces the challenge of diminishing optical power unless with on-chip optical amplification, which is not yet available. Still, an OCNN system using the PMMC device can afford an extremely high areal computing density (defined as MAC operations per time per unit area) because of its compact footprint of ~80×20 μm (FIG. 2A, including the mode selector). For example, assuming a moderate datarate of 10 Gbits/sec and 4 WDM wavelengths in parallel per channel, the computing density will reach an upperbound value of 25 TOPS/mm$^2$ (Tera-Operations per second per mm$^2$), which is significantly higher than that of digital electronic accelerators such as GPUs_ENREF_60 and tensor processing units (TPUs)_ENREF_61. Using silicon instead of silicon nitride can further reduce the device footprint to increase the computing density. Besides MAC operation, the equally important computing processes of applying nonlinear functions and pooling can also be achieved optically by using elements such as nonlinear optical resonators, modulators, and amplifiers_ENREF_47. Alternatively, a hybrid photonic-electronic system may optimally balance energy-efficiency and speed advantages of photonic systems, while realizing flexible non-linearity, connectivity, and training precision using microelectronics. With these advances and after overcoming the scaling challenge, the photonic neural network accelerator will be very promising for AI in data centers where massive optical interconnects have already been deployed.

The present disclosure provides the following embodiments:

1. A phase-change metasurface waveguide mode converter comprising:
   a plurality of phase-change antennas comprising a phase-change material and protruding from a surface, wherein each phase-change antenna of the plurality of phase-change antennas is configured to scatter an optical waveguide mode and cause a phase shift of light travelling through an optical waveguide optically coupled thereto.

2. The phase-change metasurface waveguide mode converter of Embodiment 1, wherein the plurality of phase-change antennas comprise a phase-change material selected from the group consisting of Ge2Se2Te5 (GST), GeSb2Te4, GeSbSeTe, GeTe, TiSbTe, and combinations thereof.

3. The phase-change metasurface waveguide mode converter of Embodiment 1, wherein the plurality of phase-change antennas is configured to alternate between a crystalline phase and an amorphous phase.

4. The phase-change metasurface waveguide mode converter of Embodiment 1, wherein the plurality of phase-change antennas defines a longitudinal axis, and wherein widths of the plurality of phase-change antennas change along the longitudinal axis.

5. The phase-change metasurface waveguide mode converter of Embodiment 1, wherein the phase-change metasurface waveguide mode converter is configured to produce a spatial gradient of scattering phases defining a wavevector.

6. The phase-change metasurface waveguide mode converter of Embodiment 1, wherein a periodicity of adjacent phase-change antennas of the plurality of phase-change antennas is in a range of about 0.1 μm to about 2.0 μm, about 0.2 μm to about 1.5 μm, or about 0.2 μm to about 0.9 μm.

7. The phase-change metasurface waveguide mode converter of Embodiment 1, wherein a length of the phase-change antennas of the plurality of phase-change antennas is in a range of about 0.1 μm to about 1.0 μm, about 0.1 μm to about 0.8 μm, or about 0.1 μm to about 0.4 μm.

8. The phase-change metasurface waveguide mode converter of Embodiment 1, wherein a number of the phase-change antennas of the plurality of phase-change antennas is in a range of about 2 to about 100, about 5 to about 75, about 10 to about 50, or about 20 to about 40.

9. The phase-change metasurface waveguide mode converter Embodiment 1, further comprising an encapsulating layer disposed over the plurality of phase-change antennas.

10. A photonic computing system comprising:
    the phase-change metasurface waveguide mode converter according to any one of Embodiments 1-9;
    an optical waveguide optically coupled to the plurality of phase-change antennas;
    an input light source configured to emit signal light into a first end of a first portion of the optical waveguide;
    a variable optical attenuator disposed between the input light source and the first end of the first portion; and
    a signal photodetector configured to receive the signal light from a second end of the first portion of the optical waveguide and generate a modulated signal based upon the received signal light.

11. The photonic computing system of Embodiment 10, wherein the optical waveguide supports a first transverse optical mode and a second transverse optical mode, and wherein a wavevector difference between the first transverse optical mode and the second transverse optical mode is equal to a wavevector produced by the plurality of phase-change antennas in a crystalline phase.

12. The photonic computing system of Embodiment 10, wherein the system is configured to convert light in the first transverse optical mode to the second transverse optical mode upon passing through the phase-change metasurface waveguide mode converter.

13. The photonic computing system of Embodiment 10, wherein a wavevector produced by the plurality of phase-change antennas is not equal to the wavevector difference between the first transverse optical mode to the second transverse optical mode when the plurality of phase-change antennas is in an amorphous phase.

14. The photonic computing system of Embodiment 10, further comprising a controller operatively coupled to the signal photodetector and configured to receive the modulated signal.

15. The photonic computing system of Embodiment 10, further comprising:
    a control light source configured to emit control light into a first end of a second portion of the optical waveguide; and
    a control photodetector configured to receive control light from a second end of the second portion of the optical waveguide and configured to generate a control signal based upon the received control light.

16. The photonic computing system of Embodiment 15, wherein the control light emitted from the control light source is configured to transition the plurality of phase-change antennas from a first phase state to a second phase state.

17. The photonic computing system of Embodiment 10, wherein the phase-change metasurface waveguide mode converter is one of an array of phase-change metasurface waveguide mode converters optically coupled to an array of optical waveguides.

18. The photonic computing system of Embodiment 10, further comprising an antenna phase control module configured to modulate a phase state of the plurality of phase-change antennas between a first phase state to a second phase state different from the first phase state.

19. The photonic computing system of Embodiment 18, wherein the antenna phase control module is configured to modulate the phase state of the plurality of phase-change antennas electrically or optically.

20. The photonic computing system of Embodiment 10, wherein a periodicity of phase-change antennas of the plurality of phase-change antennas is less than a wavelength of the signal light.

In some embodiment, the processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

While illustrative embodiments have been illustrated and described, it will be appreciated that various changes can be made therein without departing from the spirit and scope of the invention.

The embodiments of the invention in which an exclusive property or privilege is claimed are defined as follows:

1. A photonic computing system comprising:
   a phase-change metasurface waveguide mode converter comprising a plurality of phase-change antennas comprising a phase-change material and protruding from a surface, wherein each phase-change antenna of the plurality of phase-change antennas is configured to scatter an optical waveguide mode and cause a phase shift of light travelling through an optical waveguide optically coupled thereto, and wherein the plurality of phase-change antennas defines a longitudinal axis, and wherein widths of the plurality of phase-change antennas change along the longitudinal axis;
   an optical waveguide optically coupled to the plurality of phase-change antennas;
   an input light source configured to emit signal light into a first end of a first portion of the optical waveguide;
   a variable optical attenuator disposed between the input light source and the first end of the first portion; and
   a signal photodetector configured to receive the signal light from a second end of the first portion of the optical waveguide and generate a modulated signal based upon the received signal light,
   wherein the optical waveguide supports a first transverse optical mode and a second transverse optical mode, and wherein a wavevector difference between the first transverse optical mode and the second transverse optical mode is equal to a wavevector produced by the plurality of phase-change antennas in a crystalline phase.

2. The photonic computing system of claim 1, wherein the system is configured to convert light in the first transverse optical mode to the second transverse optical mode upon passing through the phase-change metasurface waveguide mode converter.

3. The photonic computing system of claim 1, wherein a wavevector produced by the plurality of phase-change antennas is not equal to the wavevector difference between the first transverse optical mode to the second transverse optical mode when the plurality of phase-change antennas is in an amorphous phase.

4. The photonic computing system of claim 1, further comprising a controller operatively coupled to the signal photodetector and configured to receive the modulated signal.

5. The photonic computing system of claim 1, further comprising:
   a control light source configured to emit control light into a first end of a second portion of the optical waveguide; and
   a control photodetector configured to receive control light from a second end of the second portion of the optical waveguide and configured to generate a control signal based upon the received control light.

6. The photonic computing system of claim 5, wherein the control light emitted from the control light source is configured to transition the plurality of phase-change antennas from a first phase state to a second phase state.

7. The photonic computing system of claim 1, wherein the phase-change metasurface waveguide mode converter is one of an array of phase-change metasurface waveguide mode converters optically coupled to an array of optical waveguides.

8. The photonic computing system of claim 1, further comprising an antenna phase control module configured to modulate a phase state of the plurality of phase-change antennas between a first phase state to a second phase state different from the first phase state.

9. The photonic computing system of claim 8, wherein the antenna phase control module is configured to modulate the phase state of the plurality of phase-change antennas electrically or optically.

10. The photonic computing system of claim 1, wherein a periodicity of phase-change antennas of the plurality of phase-change antennas is less than a wavelength of the signal light.

11. A photonic computing system comprising:
- a phase-change metasurface waveguide mode converter comprising a plurality of phase-change antennas comprising a phase-change material and protruding from a surface, wherein each phase-change antenna of the plurality of phase-change antennas is configured to scatter an optical waveguide mode and cause a phase shift of light travelling through an optical waveguide optically coupled thereto, and wherein the plurality of phase-change antennas defines a longitudinal axis, and wherein widths of the plurality of phase-change antennas change along the longitudinal axis;
- an optical waveguide optically coupled to the plurality of phase-change antennas;
- an input light source configured to emit signal light into a first end of a first portion of the optical waveguide;
- a variable optical attenuator disposed between the input light source and the first end of the first portion; and
- a signal photodetector configured to receive the signal light from a second end of the first portion of the optical waveguide and generate a modulated signal based upon the received signal light,
- wherein a periodicity of phase-change antennas of the plurality of phase-change antennas is less than a wavelength of the signal light.

* * * * *